United States Patent
Kim et al.

(10) Patent No.: US 12,166,512 B2
(45) Date of Patent: Dec. 10, 2024

(54) VEHICLE-MOUNTED ANTENNA SYSTEM

(71) Applicant: LG ELECTRONICS INC., Seoul (KR)

(72) Inventors: Changil Kim, Seoul (KR); Sunin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 17/923,738

(22) PCT Filed: May 6, 2020

(86) PCT No.: PCT/KR2020/005933
§ 371 (c)(1),
(2) Date: Nov. 7, 2022

(87) PCT Pub. No.: WO2021/225187
PCT Pub. Date: Nov. 11, 2021

(65) Prior Publication Data
US 2023/0198553 A1 Jun. 22, 2023

(51) Int. Cl.
| | | |
|---|---|---|
| *H01Q 5/307* | (2015.01) | |
| *H01Q 1/02* | (2006.01) | |
| *H01Q 1/32* | (2006.01) | |
| *H01Q 1/48* | (2006.01) | |
| *H01Q 9/04* | (2006.01) | |
| *H04B 1/00* | (2006.01) | |
| *H04W 72/232* | (2023.01) | |

(52) U.S. Cl.
CPC ............. *H04B 1/0064* (2013.01); *H01Q 1/02* (2013.01); *H01Q 1/3275* (2013.01); *H01Q 1/48* (2013.01); *H01Q 5/307* (2015.01); *H01Q 9/045* (2013.01); *H04W 72/232* (2023.01)

(58) Field of Classification Search
CPC ...... H04B 1/0064; H01Q 1/02; H01Q 1/3275; H01Q 1/48; H01Q 5/307; H01Q 9/045
See application file for complete search history.

(56) References Cited

U.S. PATENT DOCUMENTS

| | | | |
|---|---|---|---|
| 6,392,600 B1 * | 5/2002 | Carson | H01Q 1/246 343/846 |
| 2009/0237311 A1 | 9/2009 | Wu et al. | |
| 2012/0256796 A1 * | 10/2012 | Leiba | H01Q 9/38 343/781 R |

(Continued)

FOREIGN PATENT DOCUMENTS

| | | |
|---|---|---|
| JP | 2000-357914 | 12/2000 |
| JP | 2006-245869 | 9/2006 |
| KR | 10-1302580 | 9/2013 |

OTHER PUBLICATIONS

PCT International Application No. PCT/KR2020/005933, International Search Report dated Jan. 26, 2021, 5 pages.

*Primary Examiner* — Kathy W Wang-Hurst
(74) *Attorney, Agent, or Firm* — LEE, HONG, DEGERMAN, KANG & WAIMEY

(57) ABSTRACT

Provided according to an embodiment is a vehicle-mounted antenna system. The antenna system may comprise: a circuit board; a heat sink configured to have an aperture region above the circuit board and be fixed to the circuit board through a fixing portion; and a coupling feed portion configured to be connected to the circuit board and radiate a signal to the aperture region.

20 Claims, 38 Drawing Sheets

(56) References Cited

U.S. PATENT DOCUMENTS

| | | | | |
|---|---|---|---|---|
| 2013/0207274 A1* | 8/2013 | Liu | ......................... | H01L 23/66 |
| | | | | 257/774 |
| 2022/0384955 A1* | 12/2022 | Kim | ....................... | H01Q 5/307 |
| 2023/0163471 A1* | 5/2023 | Kim | ......................... | H01Q 9/42 |
| | | | | 343/713 |

* cited by examiner (a) scenario 1

(b) scenario 2

(c) scenario 3

(d) scenario 4

(e) scenario 5

(f) scenario 6

(a)

(b)

(a)

(b)

(a)

(b)

(a)

Case study @ Short size (b)

(a)

(b)

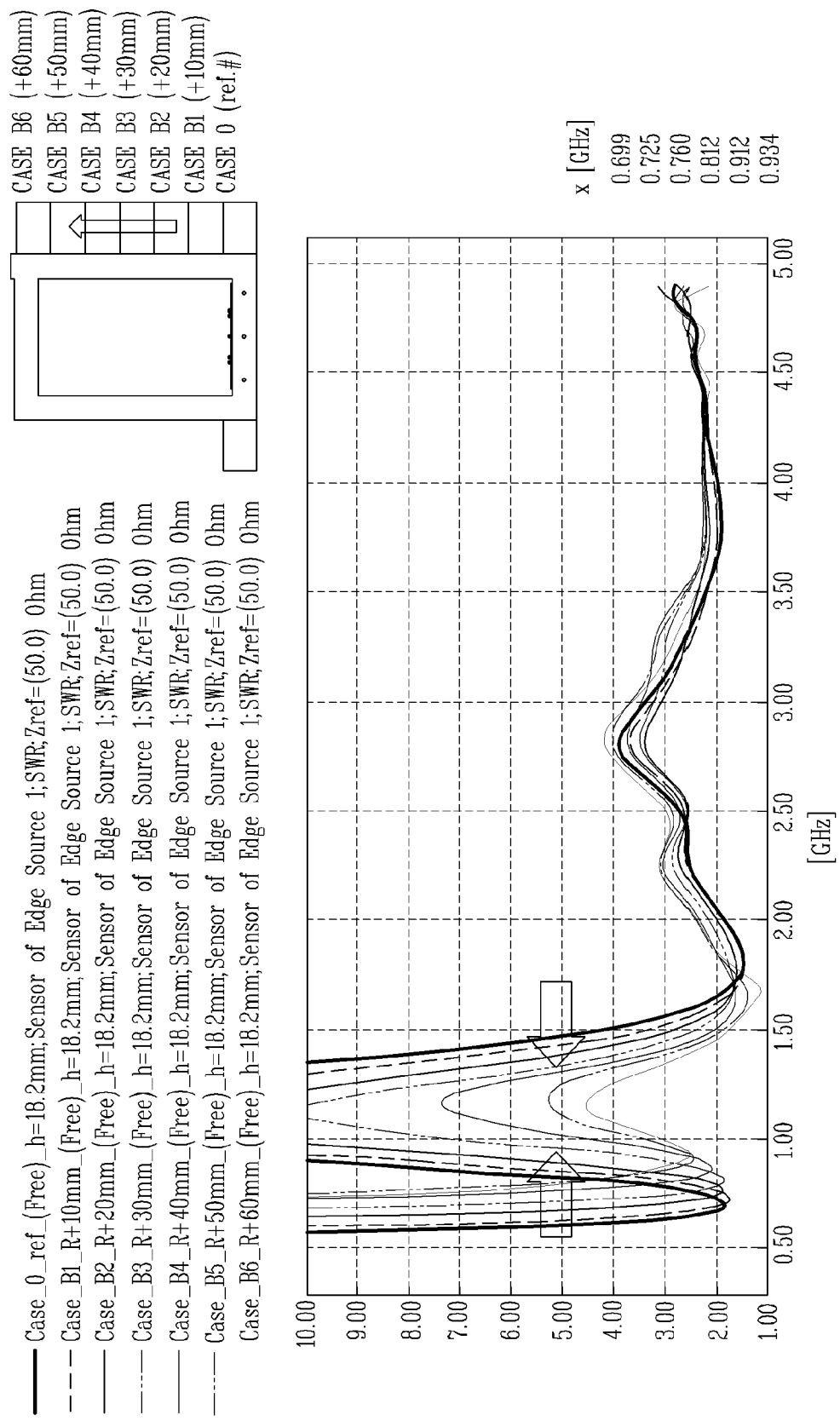

VEHICLE-MOUNTED ANTENNA SYSTEM

CROSS-REFERENCE TO RELATED APPLICATIONS

This application is the National Stage filing under 35 U.S.C. 371 of International Application No. PCT/KR2020/005933, filed on May 6, 2020, the contents of which are hereby incorporated by reference herein in their entirety.

TECHNICAL FIELD

The present disclosure relates to an antenna system for vehicle-mounting. More particularly, the present disclosure relates to an antenna system including a broadband antenna capable of operating in various communication systems and a vehicle in which the antenna system is mounted.

BACKGROUND ART

Electronic devices may be categorized into mobile/portable terminals and stationary terminals in terms of mobility. With commercialization of wireless communication systems that use LTE communication technologies, in recent years, the electronic devices have provided various services. In addition, in the near future, with commercialization of wireless communication systems that use 5G communication technologies, the electronic devices will be expected to provide various services associated with these systems. One portion of an LTE frequency band may be allocated for 5G communication services.

In this regard, the mobile terminal may be configured to provide the 5G communication services in various frequency bands. In recent years, attempts have been made to provide the 5G communication services using a Sub-6 band that is a band of 6 GHz or less. However, in the near future, for a faster data speed, the mobile terminals are expected to provide the 5G communication services using a mmWave band other than the Sub-6 band.

In recent years, the need to provide these communication services through a vehicle has been increased. Regarding communication services, there has also appeared a need for 5G communication services that are next-generation services, as well as for existing communication services, such as Long-Term Evolution (LTE) services.

Accordingly, there is a need to mount a broadband antenna operating in both an LTE frequency band and a 5G Sub-6 frequency band in the vehicle, as well as in the electronic device. In this regard, a vehicle antenna needs to operate in a broad band of approximately 600 MHz to approximately 5.9 GHz. However, the antenna mounted in the vehicle has a low-profile structure, and thus has a problem of being difficult to operate in a broad band.

In addition, a problem with a vehicle antenna system is that the temperature thereof increases due to heat generated by various electronic components and heat dissipating into a roof of the vehicle. A heat sink may be provided in order to solve the problem of heat generation in the vehicle antenna system. However, there occurs a problem in that a space for mounting the antenna system in the vehicle is insufficient because the weight of an antenna system increases with an increase in the size of the heat sink.

DISCLOSURE OF INVENTION

Technical Problem

An object of the present disclosure is to solve the above-mentioned problems and other problems. Another object of the present disclosure is to improve antenna performance while keeping the height of an antenna system mounted in a vehicle at or below a predetermined level.

Still another object of the present disclosure is to provide a structure for mounting an antenna system, operable in a broad band, in a vehicle in order to support various communication systems.

Still another object of the present disclosure is to provide an antenna, having various structures, that is operable in a low band (LB).

Still another object of the present disclosure is to provide various structures of a low-profile antenna that operates in a broad band, as a planar antenna structure.

Still another object of the present disclosure is to provide a structure of an antenna that operates in a broad band and, at the same time, has an improved heat dissipation characteristic.

Solution to Problem

In order to accomplish the above-mentioned objects and other objects, according to an aspect of the present disclosure, there is provided an antenna system for vehicle-mounting. The antenna system includes: a circuit board; a heat sink having an aperture region over the circuit board and configured to be fixed to the circuit board, with a fixation portion in between; and a coupling feed portion connected to the circuit board and configured to radiate a signal to the aperture region.

In the antenna system, the coupling feed portion may be configured as a metal patch arranged on at least one surface of a dielectric carrier vertically connected to the circuit board.

In the antenna system, the coupling feed portion may include a first radiation path arranged on a front surface of the dielectric carrier. Moreover, the coupling feed portion may include a second radiation path arranged on a side surface of the dielectric carrier and vertically connected to the first radiation path.

In the antenna system, the first radiation patch may be arranged, in the shape of a semi-circle, the front surface of the dielectric carrier, and the second radiation patch may be arranged, in the shape of a rectangle, on the side surface of the dielectric carrier.

In the antenna system, the second radiation patch arranged on the side surface of the dielectric carrier may be fastened, by a screw, to one of conductive members of the heat sink.

The antenna system may further include a coupling ground portion arranged to be coupled with the second conductive member facing a conductive member of the heat sink. Moreover, the antenna system may further include: a transceiver circuit operatively combined with the coupling feed portion; and a processor operatively combined with a transceiver circuit. Moreover, the coupling feed portion and the coupling ground portion may enable the antenna system to operate as a single antenna.

In the antenna system, the coupling ground portion may include: a vertical connection portion vertically connected to the circuit board; and a horizontal extension portion formed in a manner that extends in one direction and the other direction from the vertical connection portion.

In the antenna system, the horizontal extension portion of the coupling ground portion may be arranged under the second conductive member in a manner that is spaced a predetermined distance away from the second conductive member.

In the antenna system, the coupling feed portion and the coupling ground portion may enable the antenna system to operate, as the single antenna, in a first band, a second band, and a third band that correspond to a low band (LB), a mid band (MB), and a high band (HB), respectively. Moreover, the processor may determine a resource domain allocated through Physical Downlink Control Channel (PDCCH). Moreover, the processor may control the transceiver circuit on the basis of the allocated resource domain to perform carrier aggregation in two or more of the first to third bands.

The antenna system may further include a second coupling feed portion arranged to be coupled with a second conductive member facing a conductive member of the heat sink on which the coupling feed portion is arranged. Moreover, the antenna system may further include a transceiver circuit operatively combined with the coupling feed portion and the second coupling feed portion; and a processor operatively combined with the transceiver circuit. Moreover, the processor may control the transceiver circuit in such a manner that the coupling feed portion and the second coupling feed portion enable the antenna system to perform Multi-Input Multi-Output (MIMO) in a mid band (MB).

The antenna system may further include a lower heat sink arranged to be brought into the circuit board and configured to absorb heat that is generated in the circuit board.

In the antenna system, the lower heat sink may include: a plate portion formed in the shape of a plate and configured in such a manner that a heat dissipation fan is arranged thereon; and an extension portion extending toward one side or the other side and configured to be fastened to a vertical fastening portion of the heat sink. Moreover, the vertical fastening portion and the extension portion may be electrically connected to a ground region formed on a front surface of the circuit board, and thus, an antenna that is formed with the coupling feed portion, a coupling ground portion, and the aperture region in the heat sink may be configured to operate in a broad band.

In the antenna system, a ground region may be arranged on a front surface of the circuit board, and a region of the circuit board that is connected to the coupling feed portion may be formed as a slot region from which a ground pattern is removed.

In the antenna system, a ground region may be arranged on a front surface of the circuit board, and a first region of the circuit board that is connected to the coupling feed portion and a second region thereof that is connected to the second coupling feed portion may be formed as slot regions, respectively, from which a ground pattern is removed.

In the antenna system, a feeding pattern that is electrically connected to the coupling feed portion may be arranged on a rear surface of the circuit board. The antenna system may further include a transceiver circuit operatively combined with the coupling feed portion and configured to control a signal that is transferred to the coupling feed portion through the feeding pattern. The antenna system may further include a processor operatively combined with the transceiver circuit and configured to control the transceiver circuit. Moreover, the processor may compute a fan rotation speed of a dissipation fan that is arranged inside the aperture region in the heat sink, or an amount of electric power consumed by the transceiver circuit.

In the antenna system, when the fan rotation speed of the dissipation fan is at or above a first threshold and quality of a signal received through the antenna is at or above a second threshold, the processor may control the transceiver circuit to decrease a magnitude of a signal that is applied to the coupling feed portion.

According to another aspect of the present disclosure, there is provided a vehicle in which an antenna system is mounted. The vehicle includes an antenna system. The antenna system includes: a circuit board arranged on a metal frame arranged on a roof of the vehicle or inside a roof frame; a heat sink having an aperture region over the circuit board and configured to be fixed to the circuit board with a fixation portion in between; and a coupling feed portion connected to the circuit board and configured to radiate a signal to the aperture region. Moreover, the antenna system further includes; a transceiver circuit controlling a signal transferred through the coupling feed portion to be radiated through the aperture region in the heat sink; and a processor configured to communicate with at least one of a nearby vehicle, a road side unit (RSU), and a base station through the transceiver circuit.

In the vehicle, the antenna system may further include a coupling ground portion arranged to be coupled with a second conductive member facing a conductive member of the heat sink on which the coupling feed portion is arranged. Moreover, the coupling feed portion and the coupling ground portion may enable the antenna system to operate, as a single antenna, in a first band, a second band, and a third band that correspond to a low band (LB), a mid band (MB), and a high band (HB), respectively.

Moreover, the processor may determine a resource domain allocated through Physical Downlink Control Channel (PDCCH). Moreover, the processor may control the transceiver circuit on the basis of the allocated resource domain to perform carrier aggregation in two or more of the first to third bands.

In the vehicle, the antenna system may further include a second coupling feed portion arranged to be coupled with a second conductive member facing a conductive member of the heat sink on which the coupling feed portion is arranged. Moreover, the processor may control the transceiver circuit in such a manner that the coupling feed portion and the second coupling feed portion enable the antenna system to perform Multi-Input Multi-Output (MIMO) in a mid band (MB).

An additional scope of applicability of the present disclosure would be apparent from a description detailed below. However, it would be understandable to a person of ordinary skill in the art that various modifications and alterations are possibly made within the scope of the technical idea of the present disclosure, and therefore, it should be understood that detailed descriptions of specific embodiments of the present disclosure, such as preferred embodiments, are provided only in an exemplary manner.

Advantageous Effects of Invention

Technical effects of an antenna system for vehicle-mounting and a vehicle in which the antenna system is mounted are described as follows.

According to the present disclosure, there is provided the advantage that antenna performance can be improved while the height of the antenna system can be kept at or below a predetermined level.

In addition, according to the present disclosure, there is provided the advantage that an antenna in a low band (LB) and other antennas can be integrated into one antenna module and thus that various communication systems can be supported.

According to the present disclosure, there is provided the advantage that a heat sink is made to operate as a loop antenna and thus that a structure of an antenna that operates in a broad band can be employed.

In addition, according to the present disclosure, there is provided the advantage that the antenna system is optimized using different antennas in the low band (LB) and a band other than the low band (LB) and thus that the antenna system can be arranged inside a roof frame of a vehicle to have an optimal configuration and performance.

In addition, according to the present disclosure, there is the advantage that Multi-Input Multi-Output (MIMO) and a diversity operation can be performed in the antenna system mounted in the vehicle using a multiplicity of antennas in a specific band.

In addition, according to the present disclosure, there is provided the advantage that various structures of a low-profile antenna that operates in a broad band can be employed, as a planar antenna structure, by optimizing a coupling feed portion, a short-circuit portion, and a branch line pattern.

Further scope of applicability of the present disclosure will become apparent from the following detailed description. It should be understood, however, that the detailed description and specific examples, such as the preferred implementation of the present disclosure, are given by way of illustration only, since various changes and modifications within the spirit and scope of the disclosure will be apparent to those skilled in the art.

BRIEF DESCRIPTION OF DRAWINGS

FIG. 26B shows that the resonance frequency is changed in a case where a right-side short-circuit metal pattern is positioned to be spaced a predetermined distance away from the coupling feed portion.

MODE FOR THE INVENTION

Figure 1A:
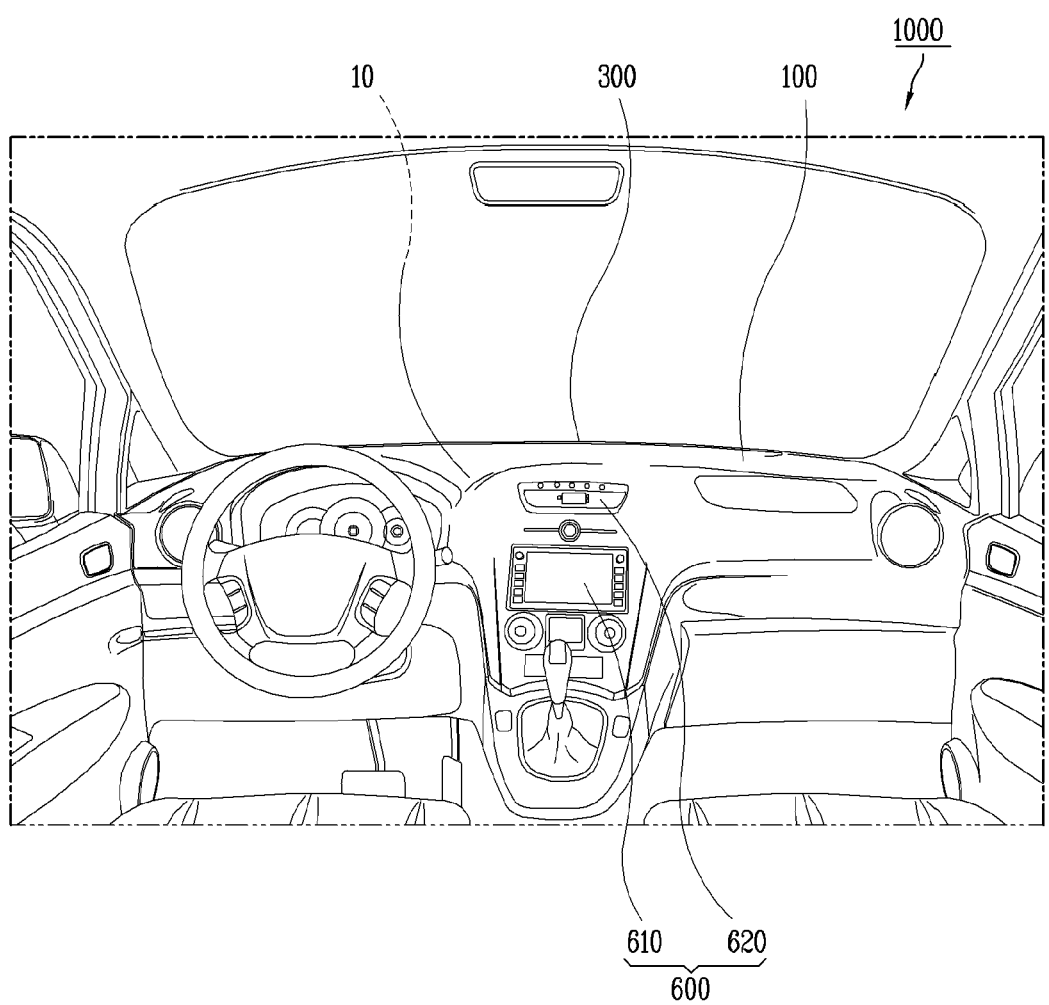
FIG. 1A is a configuration view that is referred to for description of an internal configuration of a vehicle in a practical example of the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

An electronic device described herein may include a vehicle in addition to a mobile terminal. Therefore, wireless communication through the electronic device described herein may include wireless communication through the vehicle in addition to wireless communication through the mobile terminal.

Configuration and operations according to implementations described herein may also be applied to the vehicle in addition to the mobile terminal. Configurations and operations according to implementations may also be applied to a communication system, namely, an antenna system, mounted in the vehicle. In this regard, the antenna system mounted in the vehicle may include a plurality of antennas, and a transceiver circuit and a processor that control the plurality of antennas.

The antenna system for vehicle-mounting that is mentioned in the present disclosure mostly refers to an antenna system mounted on the outside of the vehicle, but examples of the antenna system may include a mobile terminal (electronic device) mounted inside the vehicle or carried by a user who gets in the vehicle.

Figure 1B:
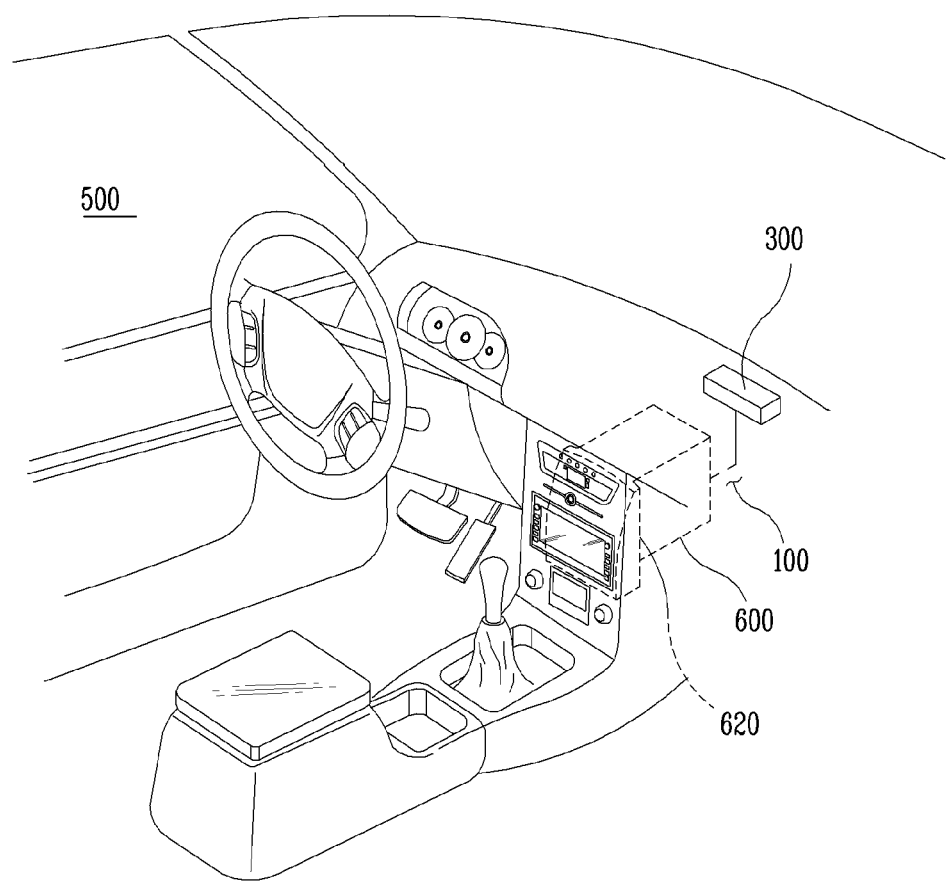
FIG. 1B is a configuration view illustrating the inside of the vehicle in the practical example of the present disclosure, when viewed from the side.

FIG. 1A is a configuration view that is referred to for description of an internal configuration of the vehicle in a practical example of the present disclosure. FIG. 1B is a configuration view illustrating the inside of the vehicle in the practical example of the present disclosure, when viewed from the side.

With reference to FIGS. 1A and 1B, the present disclosure relates to an antenna unit (that is, an internal antenna system) 300 capable of transmitting and receiving a signal through a GPS, 4G wireless communication, 5G wireless communication, Bluetooth, a wireless LAN, or the like. Therefore, this antenna unit (that is, the antenna system) 300 capable of supporting various communication protocols may be referred to as an integrated antenna module 300.

In addition, the present disclosure relates to a vehicle 500 in which the antenna unit 300 is mounted. The vehicle 500 may include a housing including a dashboard, the antenna unit 300, and the like. In addition, the vehicle 500 may include a mounting bracket for mounting the antenna unit 300.

The vehicle 500 according to the present disclosure includes the antenna module 300 corresponding to the antenna unit 300 and a telematics module (TCU) 600 configured to be connected to the antenna module 300. In a practical example of the present disclosure, the telematics module 600 may include the antenna module 300. The telematics module 600 may include a display 610 and an audio unit 620.

<V2X (Vehicle-to-Everything)>

Vehicle-to-everything (V2X) communication includes communication between a vehicle and each of all entities, such as vehicle-to-vehicle (V2V) communication which refers to communication between vehicles, vehicle-to-Infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, or the like.

V2X communication may have the same meaning as V2X sidelink or NR V2X or may have, in a broader sense, a meaning including V2X sidelink or NR V2X.

V2X communication possibly finds application in various services, for example, such as forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communication between the vehicle and each of all entities may be present in a wireless communication system that supports V2X communication. Examples of the network object may include a base station (eNB), a road side unit (RSU), a terminal, and an application server (for example, a traffic safety server).

In addition, a user terminal that performs V2X communication may mean not only a normal hand-held UE, but also a vehicle UE, a pedestrian UE, an eNB type RSU or a UE type RSU, a robot including a communication module, or the like.

V2X communication may be directly performed between terminals or may be performed through the network entities. A V2X operation mode may be distinguished from another according to how V2X communication is performed.

Terms that are used in association with V2X communication are defined as follows.

A Road Side Unit (RSU) is a V2X service-enabled device capable of transmitting and receive a signal to and from a traveling vehicle, using a V2I service. The RSU also serves as a stationary infrastructure entity that supports V2X application programs, and may exchange messages with other entities that support V2X application programs. The RSU is a term that is frequently used in existing ITS specifications. The reason for employing the term RSU in association with the 3GPP specifications is to read relevant documents in an easier manner in the ITS industry. The RSU is a logical entity that combines a V2X application logic with the functionality of an eNB (referred as to an eNB-type RSU) or a UE (referred to as a UE-type RSU).

A V2I Service is a type of V2X service, where one party is a vehicle whereas the other party is an entity belonging to an infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

A V2X-enabled UE is a UE that supports the V2X service. The V2V service is a type of V2X service, and two partners, one at one side and the other at the other side, which are involved in communication for the V2V service, are vehicles. A V2V communication range is a range where two vehicles involved in the V2V service can communicate with each other.

Figure 2A:
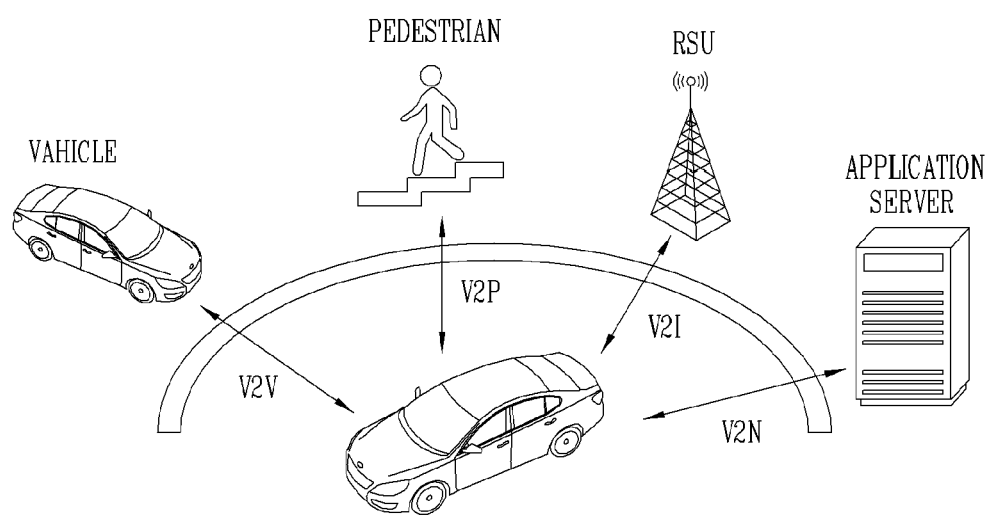
FIG. 2A is a view illustrating types of V2X application.

Four types of V2X applications called Vehicle-to-Everything (V2X), as described above, include (1) vehicle-to-vehicle (V2V), (2) vehicle-to-infrastructure (V2I), (3) vehicle-to-network (V2N), and (4) vehicle-to-pedestrian (V2P). In this regard, FIG. 2A illustrates types of V2X applications. Referring to FIG. 2A, the four types of V2X applications may use "cooperative awareness" to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

In 3GPP Releases 14 and 15, support of the V2V and V2X services in LTE has been introduced in order to extend the 3GPP platform to the automotive industry.

Requirements for support of the enhanced V2X use case are largely organized into four use case groups.

(1) Vehicle platooning is to dynamically form a platoon of vehicles that travel together. All vehicles in the platoon obtain information from a leading vehicle in order to manage the platoon. With this information, the vehicles drive more harmoniously than in their normal directions and travel together in the same direction.

(2) Extended sensors enable the exchange of raw or processed data collected through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced driving serves to make semi- or fully-automatic driving possible. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are requirements for the remote driving.

The following descriptions are all applicable to NR side link (SL) or LTE SL. When the term radio access technology (RAT) is not used together, NR SL is meant. Six operational scenarios for NR V2X may be considered as follows. In this regard, FIG. 3B illustrates a standalone scenario supporting V2X SL communication and an MR-DC scenario supporting the V2X SL communication.

1) Particularly, in Scenario 1, gNB provides control/configuration for the V2X communication by the terminal in both LTE SL and NR SL. 2) In Scenario 2, ng-eNB provides control/configuration for the V2X communication by the terminal in both LTE SL and NR SL. 3) In Scenario 3, eNB provides control/configuration for the V2X communication by the terminal in both LTE SL and NR SL. 4) In Scenario 4, the V2X communication by the terminal in LTE SL and NR SL is controlled/configured by Uu while the terminal is set for EN-DC. 5) In Scenario 5, the V2X communication by the terminal in LTE SL and NR SL is controlled/configured by Uu while the terminal is set for NE-DC. 6) In addition, in Scenarios 6, the V2X communication by the terminal in LTE SL and NR SL is controlled/configured by Uu while the terminal is set for NGEN-DC.

Figure 2B:
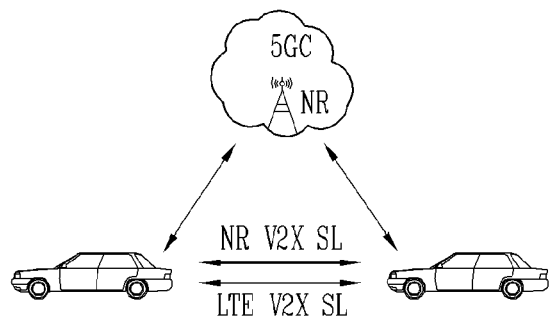
FIG. 2B is a view illustrating a standalone scenario supporting V2X SL communication and an MR-DC scenario supporting the V2X SL communication.
Figure 2B:
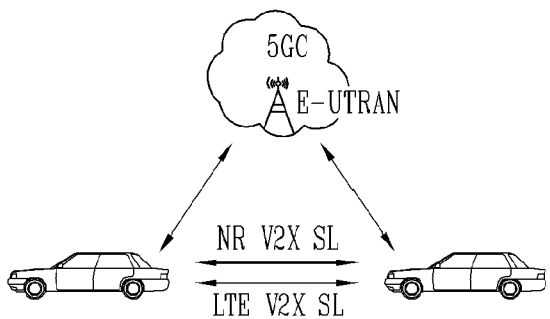
Figure 2B:
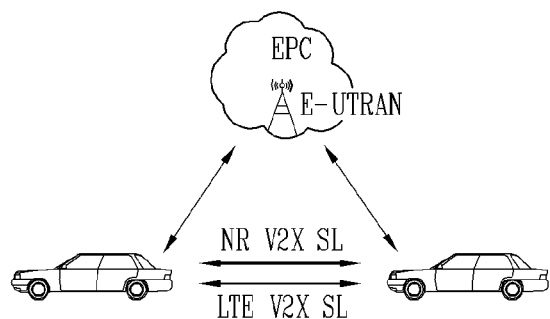
Figure 2B:
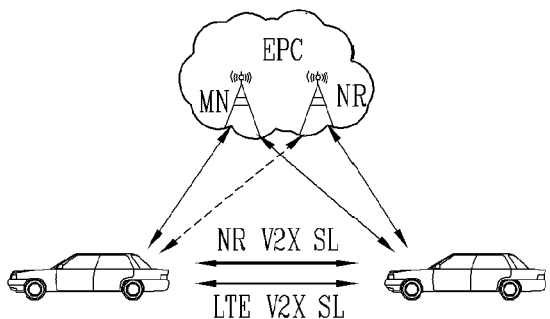
Figure 2B:
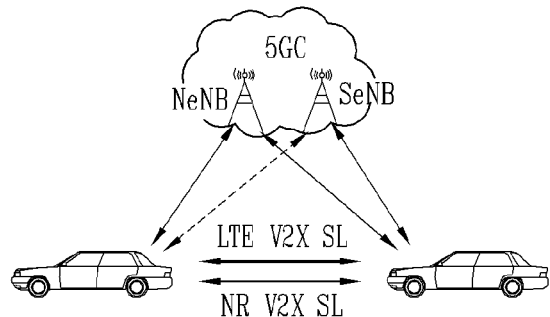
Figure 2B:
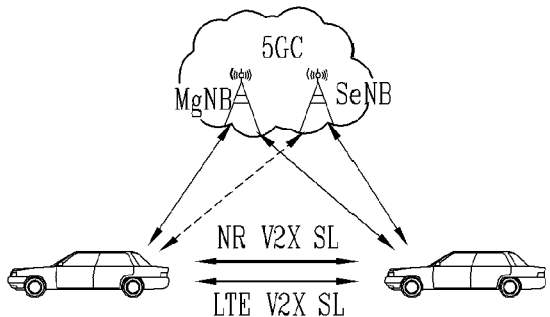

As illustrated in FIGS. 2A and 2B, in order to support the V2X communication, the vehicle may perform wireless communication with eNB and/or gNB through the antenna system.

Figure 3A:
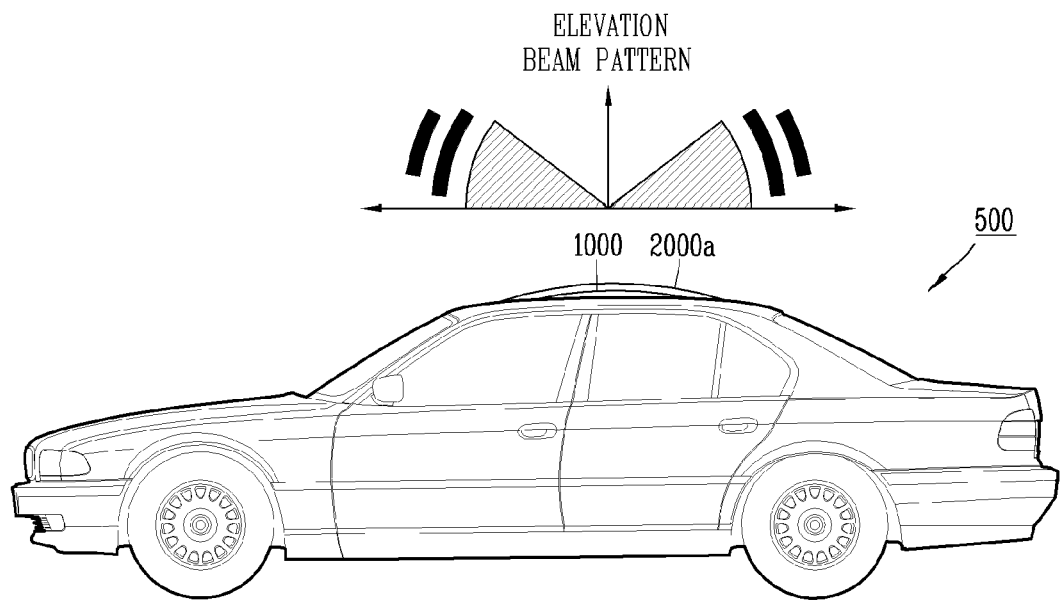
FIGS. 3A to 3C are views each illustrating a structure where an antenna system is mounted inside a vehicle that includes an antenna system for vehicle-mounting according to the present disclosure.
Figure 3B:
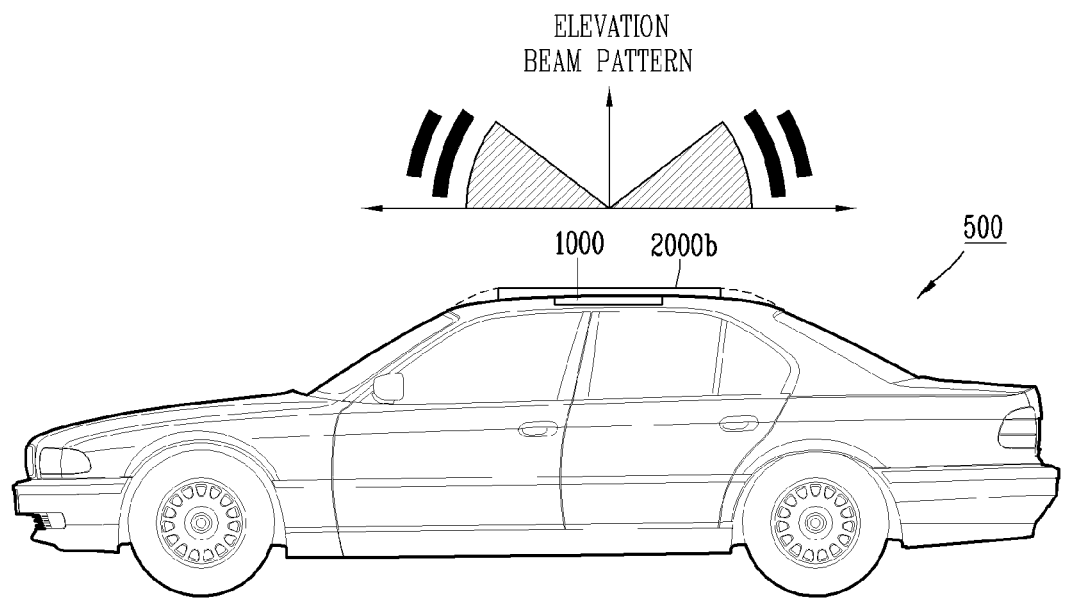
Figure 3C:
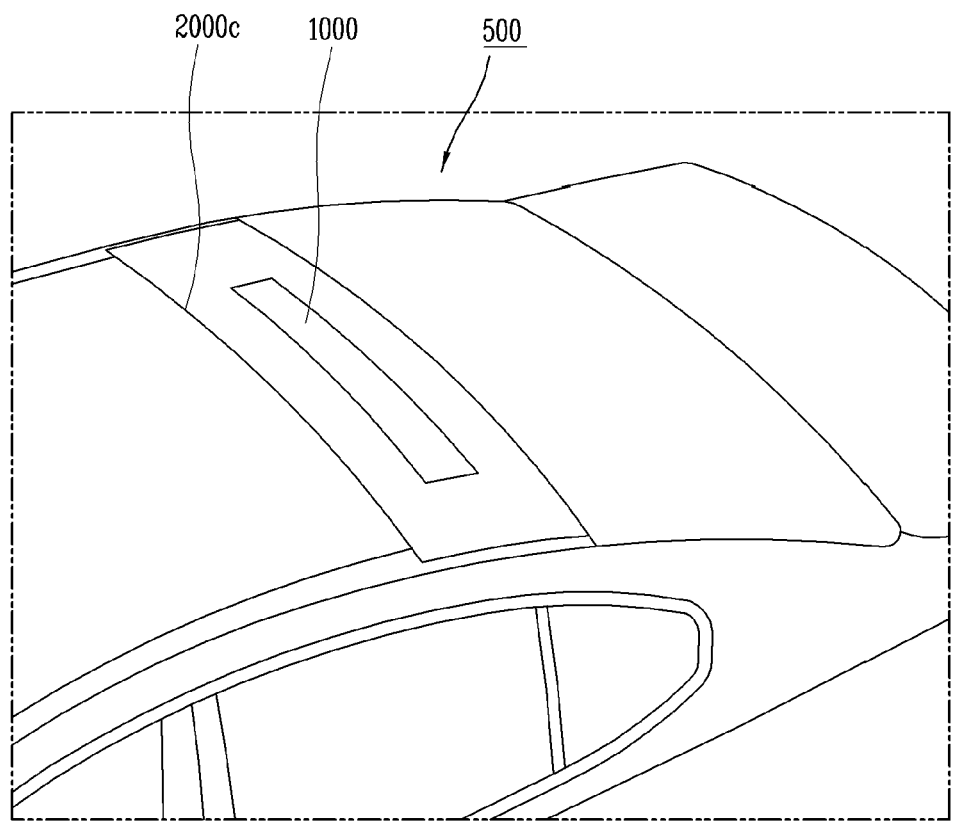

FIGS. 3A to 3C each illustrate a structure where the antenna system is mounted inside the vehicle 500 that includes an antenna system for vehicle-mounting according to the present disclosure. In this regard, FIGS. 3A and 3B each illustrate a state where an antenna system 1000 is mounted on a roof of the vehicle 500 or inside the roof thereof. FIG. 3C illustrates a structure where the antenna system 1000 is mounted inside the roof of the vehicle 500 and a roof frame of a rear-side glass pane.

With reference to FIGS. 3A to 3C, according to the present disclosure, an existing shark-fin antenna is proposed to be replaced with a non-protruding flat-type antenna in order to improve an exterior appearance of the vehicle 500 and to preserve telematics performance when a collision takes place. In addition, according to the present disclosure, an antenna into which an LTE antenna and a 5G antenna are integrally shaped, taking into consideration 5-th generation communication, is proposed, as well as an existing mobile communication (LTE).

With reference to FIG. 3A, the antenna system 1000 is disposed on the roof of the vehicle 500. In FIG. 3A, a radome 2000a for protecting the antenna system 1000 from an external environment and from external shock that occurs while driving the vehicle 500 may cover the antenna system 1000. The radome 2000a may be made of a dielectric material transmitting a radio signal transmitted/received between the antenna system 1000 and a base station.

With reference to FIG. 3B, the antenna system 1000 may be arranged inside a roof structure of the vehicle 500, and at least one portion of the roof structure may be made of a non-metal material. In this case, at least one portion of a roof structure 2000b of the vehicle 500 may be made of a non-metal material and thus may be made of a dielectric material transmitting the radio signal transmitted/received between the antenna system 1000 and the base station.

In addition, with reference to FIG. 3C, the antenna system 1000 may be arranged inside the roof frame of the vehicle 500, and at least one portion of a roof frame 2000c may be made of a non-metal material. In this case, at least one portion of the roof structure 2000c of the vehicle 500 may be made of a non-metal material and thus may be made of a dielectric material transmitting the radio signal transmitted/received between the antenna system 1000 and the base station.

With reference to FIGS. 3A to 3C, a beam pattern by an antenna provided in the antenna system 1000 for vehicle-mounting needs to be formed on an upper region at a predetermined angle with respect to a horizontal region.

In this regard, a peak of an elevation beam pattern of the antenna provided in the antenna system 1000 does not need to be formed at boresight. Therefore, the peak of the elevation beam pattern of the antenna needs to be formed on an upper region at a predetermined angle with respect to the horizontal region. As an example, the elevation beam pattern of the antenna may be formed in the shape of a hemisphere as illustrated in FIGS. 2A to 2C.

As described above, the antenna system 1000 may be installed on a front or rear surface of the vehicle 500 other than the roof structure or the roof frame of the vehicle 500, depending on applications. In this regard, the antenna system 1000 corresponds to an external antenna.

The vehicle 500 may include an antenna unit (that is, an internal antenna system) 300 corresponding to an internal antenna, instead of including the antenna system 1000 corresponding to an external antenna. In addition, the vehicle 500 may include both the antenna system 1000 corresponding to the external antenna and the antenna unit (that is, the internal antenna system) 300 corresponding to the internal antenna.

Figure 4A:
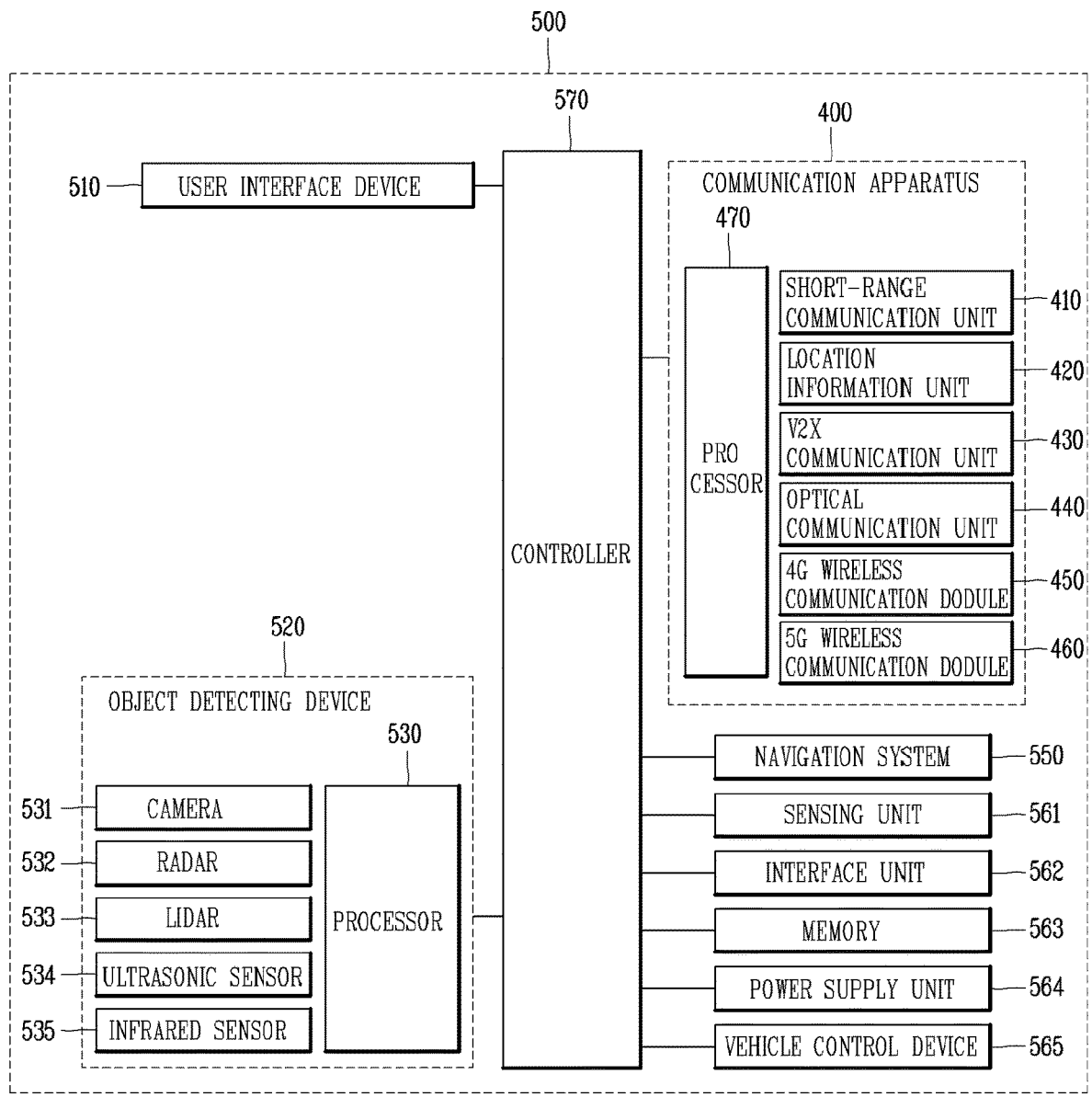
FIG. 4A is a block diagram that is referred to for description of a vehicle and an antenna system for vehicle-mounting according to an embodiment of the present disclosure.

FIG. 4A is a block diagram that is referred to for description of a vehicle and an antenna system for vehicle-mounting according to an embodiment of the present disclosure.

The vehicle 500 may be an autonomous (driving) vehicle. The vehicle 500 may switch to a manual mode (a pseudo-driving mode) or an autonomous mode on the basis of a user input. For example, the vehicle 500 may switch from the manual mode to the autonomous mode or from the autonomous mode to the manual mode on the basis of the user input that is received through a user interface device 510.

Object detection, wireless communication, and operation of each of a navigation device, a vehicle sensor, and an interface, which are associated with the manual mode and the autonomous mode, may be performed by the telematics module mounted in the vehicle 500. Specifically, the telematics module mounted in the vehicle 500 may perform the corresponding operation in cooperation with the antenna module 300, an object detection device 520, and another interface. A communication device 400 may be arranged inside the telematics module separately from an antenna system 300 or may be arranged in the antenna system 300.

The vehicle 500 may switch to the autonomous driving mode or the manual mode on the basis of driving situation information. The driving situation information may be generated on the basis of object information provided by the object detection device 520. For example, the vehicle 500 may switch from the manual mode to the autonomous mode or from the autonomous mode to the manual mode on the basis of the driving situation information generated by the object detection device 520.

For example, the vehicle 500 may switch from the manual mode to the autonomous mode or from the autonomous mode to the manual mode on the basis of the driving situation information that is received through the communication device 400. The vehicle 500 may switch from the manual mode to the autonomous mode or from the autonomous mode to the manual mode on the basis of information, data, and a signal provided by an external device.

In a case where the vehicle 500 that is the autonomous vehicle 500 travels in the autonomous mode, the autonomous driving vehicle 500 may drive under the control of an operation system. For example, the autonomous vehicle 500 may travel on the basis of information, data, or signals that are generated in a vehicle driving system, a parking-lot leaving vehicle system, and a vehicle parking system. In a case where the vehicle 500 that is the autonomous driving vehicle 500 drives in the manual mode, the autonomous driving vehicle 500 may receive a user input for driving through a driving control device. The vehicle 500 may travel on the basis of the user input received through the driving control device.

The vehicle 500 may include a user interface device 510, an object detection device 520, a navigation system 550, and a communication device 400. The vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained herein or may not include some of those components to be explained herein.

The user interface device 510 is a device for performing communication between the vehicle 500 and the user. The user interface device 510 may receive a user input and may provide the user with information generated in the vehicle 500. The vehicle 500 may realize a user interface (UI) or user experience (UX) through the user interface device 510.

The object detection device 520 is a device for detecting an object located outside the vehicle 500. The object may be a variety of things associated with driving (operation) of the vehicle 500. In some examples, objects may be classified into moving objects and fixed (stationary) objects. For example, the moving objects may conceptually include a vehicle other than the vehicle 500 and pedestrians. For example, the stationary objects may conceptually include traffic signals, roads, and structures. The object detection device 520 may include a camera 521, a radar 522, a lidar 523, an ultrasonic sensor 524, an infrared sensor 525, and a processor 530. In some implementations, the object detection device 520 may further include other components in addition to the components described, or may not include some of the components described.

The processor 530 may control an overall operation of each constituent element of the object detection device 520. The processor 530 may detect and track the object on the basis of an image acquired. The processor 530 may perform operations, such as computing of a distance to the object and computing of a relative speed with respect to the object, through an image processing algorithm.

In some implementations, the object detection device 520 may include a plurality of processors 530 or may not include any processor 530. For example, each of the camera 521, the radar 522, the lidar 523, the ultrasonic sensor 524, and the infrared sensor 525 may individually include the processor 530.

In a case where the processor 530 is not included in the object detection device 520, the object detection device 520 may operate under the control of a processor of an apparatus inside the vehicle 500 or under the control of a controller 570.

The navigation system 550 may provide location information of the vehicle 500 on the basis of information acquired through the communication device 400, particularly through a location information unit 420. In addition, the navigation system 550 may provide a service for driving directions to a destination on the basis of current location information of the vehicle 500. In addition, the navigation system 550 may provide guidance information on a nearby location on the basis of information acquired through the object detection device 520 and/or a V2X communication unit 430. In some examples, guidance information, an autonomous driving service, and the like may be provided on the basis of V2V information, V2I information, and V2X information that are acquired through a wireless communication unit 460 that operates along with the antenna system 1000 according to the present.

The communication device 400 is a device for performing communication with an external device. The external device may be another vehicle other than the vehicle 500, a mobile terminal, or a server. The communication device 400 may include at least one of a transmission antenna for performing communication, a reception antenna for performing communication, a radio frequency (RF) circuit in which various communication protocols are executable, and an RF element which various communication protocols are executable. The communication device 400 may include a short-range communication unit 410, the location information unit 420, the V2X communication unit 430, an optical communication unit 440, a broadcast transceiver 450, and a processor 470. In some implementations, the communication device 400 may further include other components in addition to the components described, or may not include some of the components described.

The short-range communication unit 410 is a unit for performing short-range communication. The short-range communication unit 410 may perform short-range communication between the vehicle 500 and at least one external device over a short-range wireless communication network. The location information unit 420 is a unit for acquiring location information of the vehicle 500. For example, the location information unit 420 may include a global positioning system (GPS) module or a differential global positioning system (DGPS) module.

The V2X communication unit 430 is a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 is a unit for performing communication with an external device using light as a medium. The optical communication unit 440 may include an optical transmission part that converts an electrical signal to an optical signal and transmits the resulting optical signal to the outside, and an optical reception part that converts the received optical signal into the electrical signal. According to an embodiment of the present disclosure, the optical transmission part may be formed integrally with lamps included in the vehicle 500.

The wireless communication unit 460 is a unit for performing wireless communication with one or more communication systems through one or more antenna systems. The wireless communication unit 460 may transmit and/or receive a signal to and from equipment inside a first communication system through a first antenna system. In addition, the wireless communication unit 460 may transmit and/or receive a signal to and from equipment inside a second communication system through a second antenna system. In this case, the first communication system and the second communication system may be an LTE communication system and a 5G communication system, respectively. However, the first communication system and the second communication system are not limited thereto, respectively, and are expandable to correspond to arbitrary different communication systems, respectively.

The antenna module 300 arranged inside the vehicle 500 may include a wireless communication unit. In this regard, the vehicle 500 may be an electric vehicle (EV) or a vehicle capable of making a connection to a communication system independently of an external electronic device. In this regard, the communication device 400 may include at least one of the short-range communication unit 410, the location information module 420, the V2X communication unit 430, the optical communication unit 440, a 4G wireless communication module 450, and a 5G wireless communication module 460.

The 4G wireless communication module 450 may transmit and receive a 4G signal to and from a 4G base station through a 4G mobile communication network. At this point, the 4G wireless communication module 450 may transmit one or more 4G transmission signals to the 4G base station. In addition, the 4G wireless communication module 450 may receive one or more 4G reception signals from the 4G base station. In this regard, Uplink (UL) Multi-Input Multi-Output (MIMO) may be performed with a plurality of 4G transmission signals that are transmitted to the 4G base station. In addition, Downlink (DL) Multi-Input Multi-Output (MIMO) may be performed with a plurality of 4G reception signals that are received from the 4G base station.

The 5G wireless communication module 460 may transmit and receive a 5G signal to and from a 5G base station through a 5G mobile communication network. At this point, the 4G base station and the 5G base station may use a Non-Standalone (NSA) architecture. For example, the 4G base station and the 5G base station may be built to employ the Non-Standalone (NSA) architecture. Alternatively, the 5G base station may be built at a different location than the 4G base station to employ a Standalone (SA) architecture. The 5G wireless communication module 460 may transmit and receive the 5G signal to and from the 5G bast station through the 5G mobile communication network. At this point, the 5G wireless communication module 460 may transmit one or more 5G transmission signals to the 5G base station. In addition, the 5G wireless communication module 460 may receive one or more 5G reception signals from the 5G base station. At this point, a 5G frequency band that is the same as a 4G frequency band may be used, and this may be referred to as LTE re-farming. A Sub-6 band that is a band of 6 GHz or less may be used as the 5G frequency band. In contrast, in order to perform broadband high-speed communication, a mmWave band may be used as the 5G frequency band. In a case where the mmWave band is used, the electronic device may perform beamforming for coverage expansion of an area where communication with a base station is possible.

Regardless of the 5G frequency band, in the 5G communication system, Multi-Input Multi-Output (MIMO) may be supported to be performed multiple times in order to improve a transmission rate. In this regard, Uplink (UL) Multi-Input Multi-Output (MIMO) may be performed with a plurality of 5G transmission signals that are transmitted to the 5G base station. In addition, Downlink (DL) Multi-Input Multi-Output (MIMO) may be performed with a plurality of 5G reception signals that are received from the 5G base station.

A state of dual connectivity (DC) to both the 4G base station and the 5G base station may be attained through the 4G wireless communication module 450 and the 5G wireless communication module 460. This dual connectivity to the 4G base station and the 5G base station may be referred to as EUTRAN NR DC (EN-DC). When the 4G base station and the 5G base station have a co-located structure, an improvement in throughput is possible through inter-carrier aggregation (inter-CA). Therefore, when the 4G base station and the 5G base station are in an EN-DC state, the 4G reception signal and the 5G reception signal may be received at the same time through the 4G wireless communication module 450 and the 5G wireless communication module 460, respectively. Short-range communication may be performed between the electronic devices (for example, vehicles) using the 4G wireless communication module 450 and the 5G wireless communication module 460. According to an embodiment of the present disclosure, wireless communication may be performed between vehicles using a V2V scheme after a resource is allocated, without involvement of the base station.

For an improvement in the transmission speed and for communication system convergence, the carrier aggregation (CA) may be performed using at least one of the 4G wireless communication module 450 and the 5G wireless communication module 460, and a Wi-Fi communication module 113. In this regard, 4G+WiFi carrier aggregation (CA) may be performed using the 4G wireless communication module 450 and the Wi-Fi communication module 113. In addition, 5G+WiFi carrier aggregation (CA) may be performed using the 5G wireless communication module 460 and the Wi-Fi communication module 113.

The communication device 400, along with the user interface device 510, may realize a vehicle display device. In this case, the vehicle display device may be named a telematics device or an audio video navigation (AVN) device.

Figure 4B:
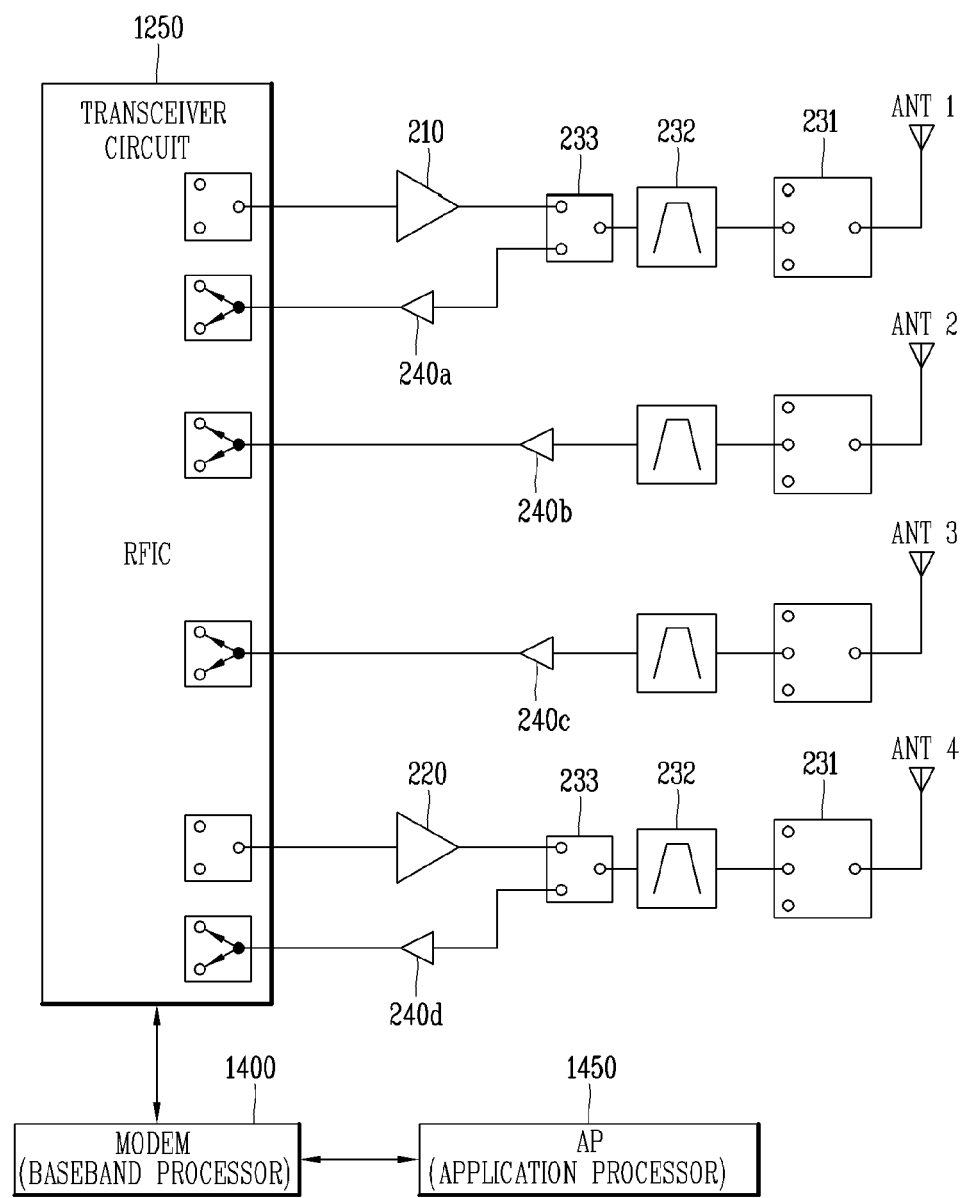
FIG. 4B is a view illustrating a configuration of a wireless communication unit of the vehicle that operates a plurality of wireless communication systems according to the present disclosure.

FIG. 4B illustrates a configuration of the wireless communication unit 460 of the vehicle 500 that operates a plurality of wireless communication systems according to the present disclosure. With reference to FIG. 4B, the vehicle 500 includes a first power amplifier 210, a second power amplifier 220, and an RFIC 1250. The vehicle 500 may further include a modem 1400 and an application processor (AP) 1450. In this case, the modem 1400 and the application processor (AP) 1450 may be integrated physically into one chip, but to be separated logically and functionally from each other. However, the modem 1400 and the AP 1450 are not limited thereto and may be realized in the form of chips that are separated physically from each other, depending on application.

The vehicle 500 includes a plurality of low noise amplifiers (LNAs) 210a to 240a in the reception unit thereof. In this case, it is possible that the first power amplifier 210, the second power amplifier 220, and the RFIC 1250, the plurality of low noise amplifiers 210a to 240a all operate in the first communication system and the second communication system. In this case, the first communication system and the second communication system may be the 4G communication system and the 5G communication system, respectively.

As illustrated in FIG. 4, the RFIC 1250 may be integrally configured to serve for 4G and 5G, but is not limited to this configuration. The RFIC 1250 may be configured to be separable into two parts, one for 4G and the other one for 5G, depending on application thereof. In a case where the RFIC 1250 is integrally configured to serve for 4G and 5G, this configuration is advantageous in terms of simplification of control signaling by the modem 1400, as well as synchronization between 4G and 5G circuits.

In contrast, in a case where the RFIC 1250 is configured to be separable into two parts, one for 4G and the other one for 5G, these two parts may be referred to as a 4G RFIC and a 5G RFIC, respectively. Particularly, in a case where a 5G band is configured to be the mmWave band and in a case where there is a big difference in size between the 5G band and the 4G band, the RFIC 1250 may be configured to be separable into two parts, one for 4G and the other one for 5G. Even in the case where the RFIC 1250 is configured to be separable into two parts, one for 4G and the other one for 5G, it is also possible that the 4G RFIC and the 5G RFIC are separated logically and functionally from each other and are integrated, as a system on a chip (SOC), physically into one chip. The application processor 1450 (AP) is configured to control the operation of each component of the electronic device. Specifically, the application processor (AP) 1450 may control the operation of each component of the electronic device through the modem 1400.

The first power amplifier 210 and the second power amplifier 220 may operate in at least one of first and second communication systems. In this regard, in a case where the 5G communication system operates in the 4G band or the Sub-6 band, the first and second amplifiers 210 and 220 can operate in both the first and second communication systems. In contrast, in a case where 5G communication system operates in the mmWave band, one of the first and second power amplifier 210 and 220 may operate in the 4G band, and the other may operate in the mmWave band.

Two different wireless communication systems may be realized with one antenna using an antenna that serves for both transmission and reception by integrating a transmission unit and a reception unit. In this case, as illustrated in FIG. 2, it is possible that 4×4 MIMO may be performed using four antennas. In this case, 4×4 MIMO may be performed through downlink (DL).

When the 5G band is the Sub-6 band, first to fourth antennas ANT1 to ANT4 may be all configured to operate in the 4G band and the 5G band. In contrast, when the 5G band is the mmWave band, the first to fourth antennas ANT1 to ANT4 may be configured to operate in one of the 4G band and the 5G band. At this point, when the 5G band is the mmWave band, each of the plurality of separate antennas may be configured as an array antenna in the mmWave band. Among four antennas, it is possible that 2×2 MIMO is performed using two antennas connected to the first power amplifier 210 and the second power amplifier 220, respectively. At this point, 2×2 UL MIMO (2 Tx) may be performed through uplink (UL).

In addition, the vehicle 500 that is operable in the plurality of the wireless communication systems according to the present disclosure may further include a duplexer 231, a filter 232, and a switch 233. The duplexer 231 is configured to separate signals into a signal in a transmission band and a signal in a reception band. At this point, the signals in the transmission band that are transmitted through the first and second power amplifiers 210 and 220 are applied to the first and fourth antennas ANT1 and ANT4, respectively, through a first output port of the duplexer 231. In contrast, the signals in the reception band that are received through the first and fourth antennas ANT1 and ANT4 are received into the low noise amplifiers 210a and 240a, respectively, through a second output portion of the duplexer 231. The filter 232 may be configured to allow a signal in the transmission band or the reception band to pass through and to block a signal in a band other than the transmission band and the reception band. The switch 233 may be configured to transfer only one of a transmission signal and a reception signal.

The vehicle 500 according to the present disclosure may further include a modem 1400 corresponding to the controller 570. In this case, the RFIC 1250 and the modem 1400 may be referred to as a first controller (or a first processor) and a second controller (or a second processor), respectively. The RFIC 1250 and the modem 1400 may be realized as circuits that are separated physically. In addition, the RFIC 1250 and the modem 1400 may be distinguished logically or functionally from each other in one circuit. The modem 1400 may perform control and signal processing for signal transmission and reception through different communication systems using the RFIC 1250. The modem 1400 may acquire control information received from the 4G base station and/or the 5G base station. At this point, the control information may be received through a Physical Downlink Control Channel (PDCCH), but is not limited thereto.

In terms of a specific time and frequency, the modem 1400 may control the RFIC 1250 to transmit and/or receive a signal through the first communication system and/or the second communication system. Accordingly, the vehicle 500 may be allocated a resource through eNB or gNB or may maintain a connected state. In addition, the vehicle 500 may perform at least one of V2V communication, V2I communication, and V2P communication with entities other than the vehicle 500 using the allocated resources.

With reference to FIGS. 1A to 4B, the antenna system for vehicle-mounting may be arranged inside the vehicle 500, on the roof of the vehicle 500, inside the roof, or inside the roof frame. In this regard, the antenna system disclosed in the present disclosure may be configured to operate in a low band (LB), a mid band (MB), and a high band (HB) for a 4G LTE system, and in a Sub-6 band for a 5G NR system.

Figure 5A:
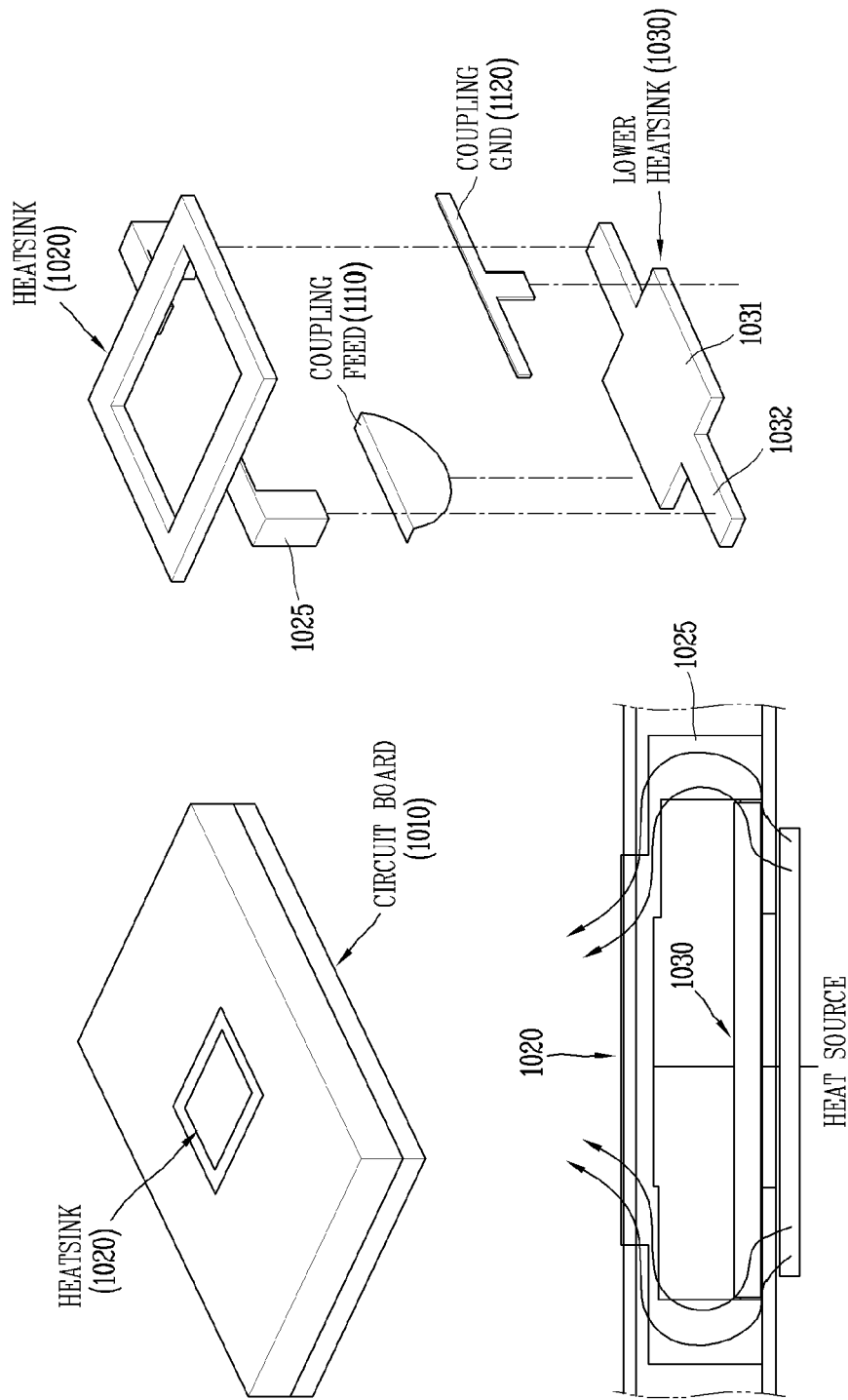
FIG. 5A is a view illustrating a configuration of an antenna system according to an embodiment of the present disclosure.
Figure 5B:
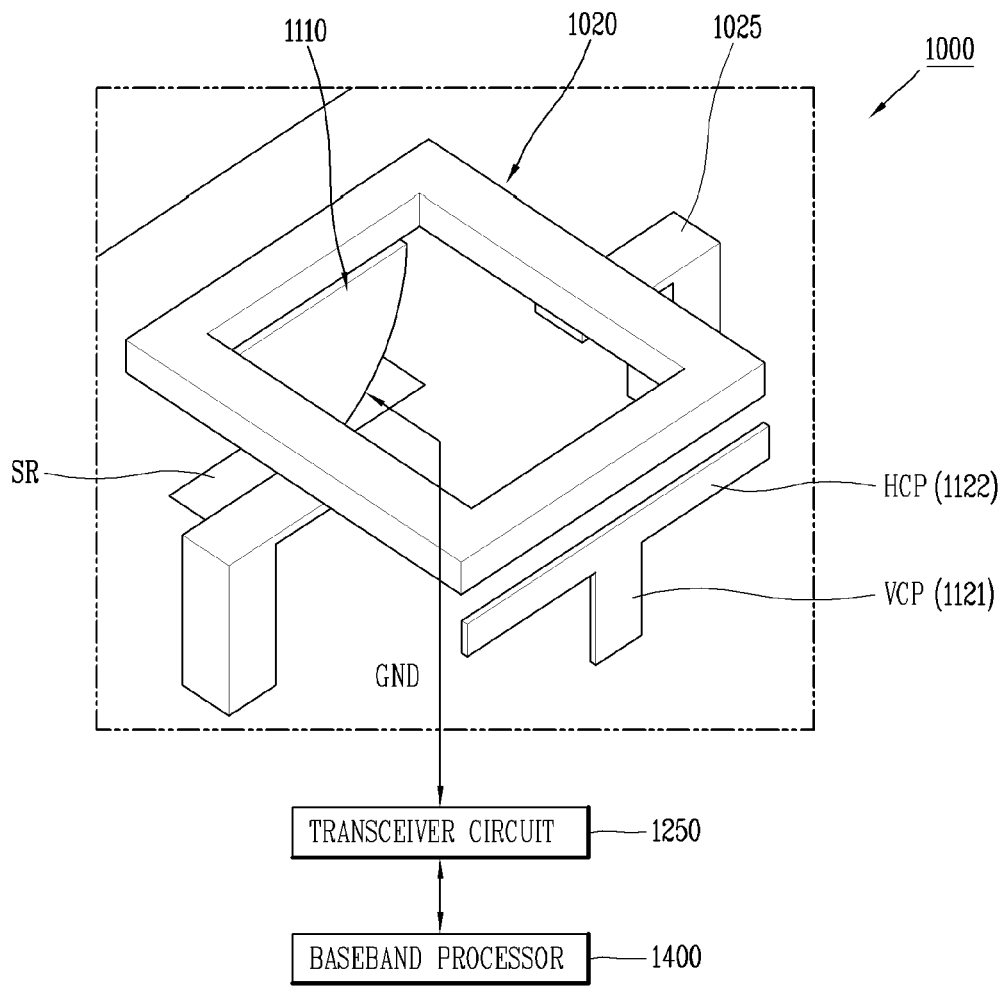
FIG. 5B is a view illustrating a feed structure and a ground structure of the antenna system in FIG. 5A.
Figure 6:
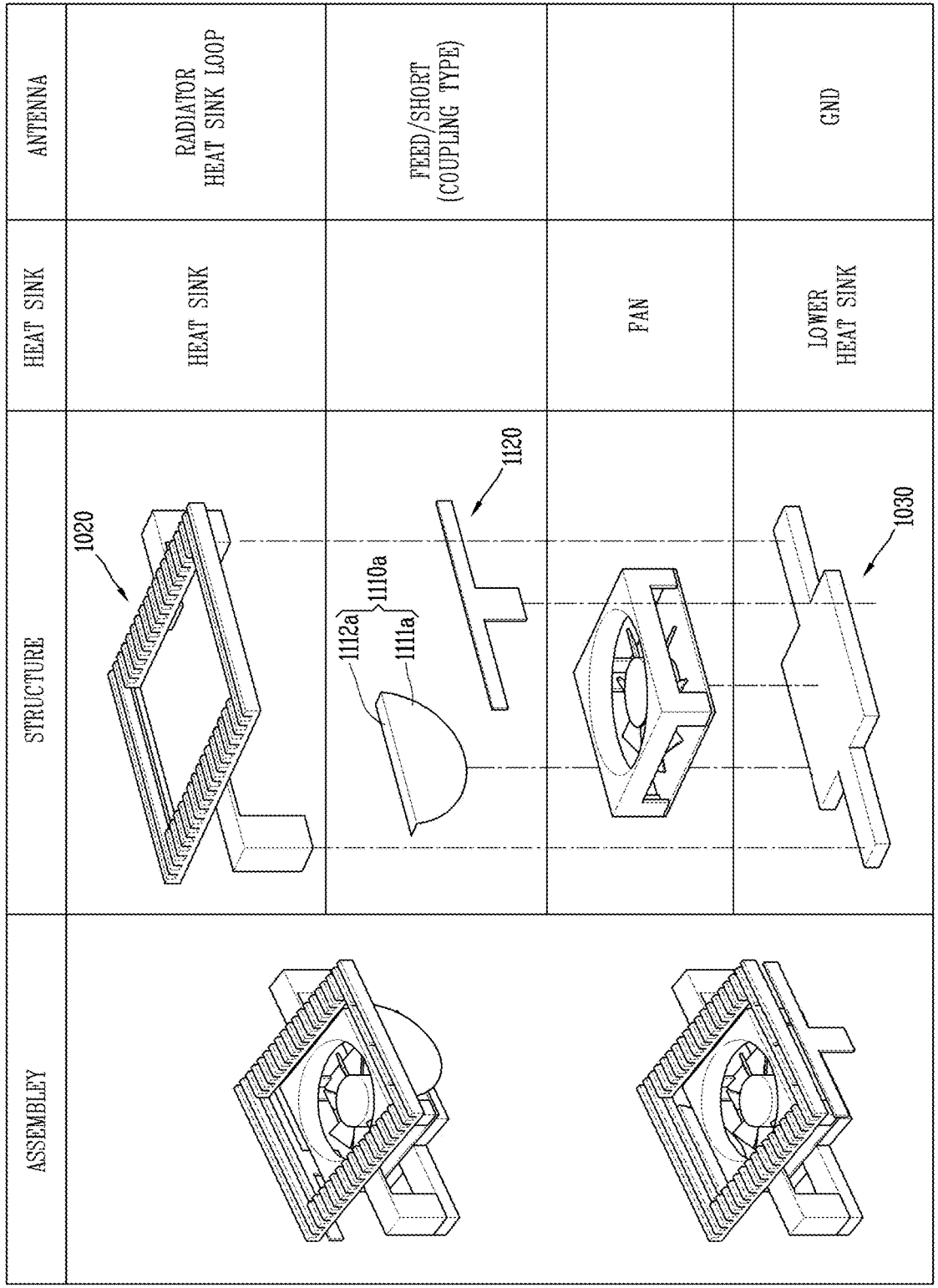
FIG. 6 is a configuration view illustrating the post-assembly antenna system according to the embodiment of the present disclosure that has a heat sink and a heat dissipation fan, a coupling feed portion, and a coupling ground portion and an exploded view illustrating the pre-assembly antenna system.

FIG. 5A illustrates a configuration of an antenna system according to an embodiment of the present disclosure. FIG. 5B illustrates a structure and a ground structure of the antenna system in FIG. 5A. FIG. 6 is a configuration view illustrating the post-assembly antenna system according to the embodiment of the present disclosure that has a heat sink and a heat dissipation fan, a coupling feed portion, and a coupling ground portion and an exploded view illustrating the pre-assembly antenna system.

Figure 5B:
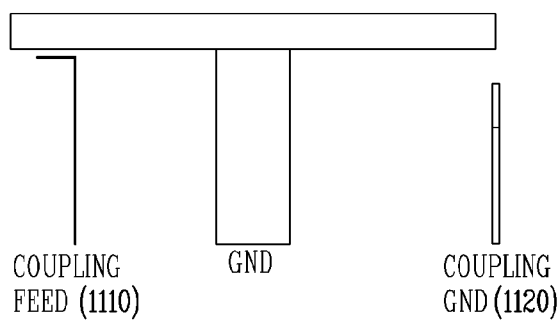

With reference to FIGS. 5A to 6, the antenna system 1000 may be configured to include a circuit board 1010, a heat sink 1020, and a coupling feed portion 1110. The circuit board 1010 may be arranged on a metal frame on the roof of the vehicle 500 or on a metal frame inside the roof frame, and various electronic components may be arranged on the circuit board 1010. Heat may occur because the electronic components arranged on the circuit board 1010 are driven and a heat source is transferred into the roof of the vehicle 500. The extent of rise in the temperature of the inside of the roof of the vehicle 500 due to the heat may be reduced by the heat sink 1020. In addition, the extent of rise in the temperature of the inside of the roof of the vehicle 500 due to the heat may be reduced by a lower heat sink 1030.

The heat sink 1020 may include an aperture region over the circuit board 1010 and may be configured to be fixed to the circuit board 1010 with a fixation portion 1025 in between. At this point, the fixation portion 1025 may be configured to connect the heat sink 1020 and the lower heat sink 1030 to each other.

The coupling feed portion 1110 may be configured to be electrically connected to the circuit board 1010 and to radiate a signal to the aperture region. In this regard, a ground region GND may be arranged on a front surface of the circuit board 1010. A region of the circuit board 1010 that is connected to the coupling feed portion 1110 may be formed as a slot region SR from which a ground pattern is removed.

Figure 7A:
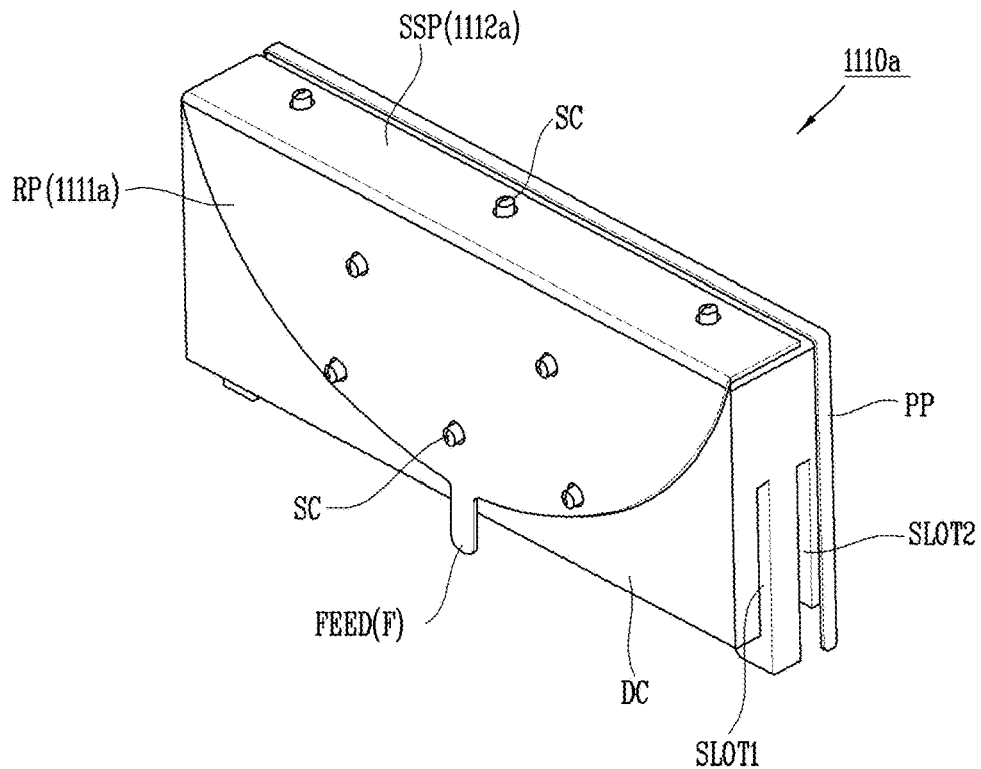
FIG. 7A is a view illustrating a first type antenna that is printed on top of a dielectric carrier DC in a practical example of the present disclosure.
Figure 7B:
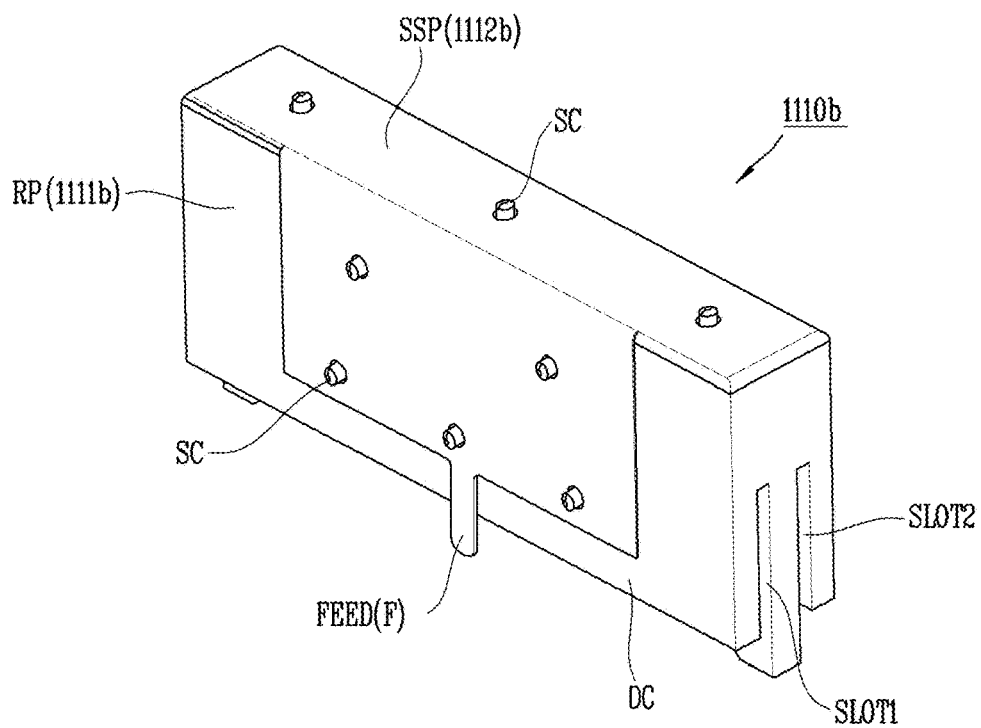
FIG. 7B is a view illustrating a second type antenna that is printed on top of the dielectric carrier DC in the practical example of the present disclosure.

The coupling feed portion 1110 may be formed in various shapes. In this regard, FIG. 7A illustrates a first type antenna that is printed on top of a dielectric carrier DC in a practical example of the present disclosure. FIG. 7B is a view illustrating a second type antenna that is printed on top of the dielectric carrier DC in the practical example of the present disclosure.

In association with a configuration of a radiation object, with reference to FIG. 7A, a first feed portion 1110a may include a radiation patch RP and a side surface patch SSP. In addition, the first feed portion 1110a may further include a parasitic patch PP. In this regard, a shape of the radiation patch RP of the first antenna ANT1 (1110a) is not limited to a circular patch, and the radiation pattern RP thereof is changeable to various shapes. For example, the first antenna ANT1 (1110a) may be realized in such a manner that the radiation patch RP thereof, as illustrated in FIG. 7B, has the same shape as a rectangular patch RP2.

With reference to FIGS. 5A to 7B, a second feed portion may be configured as a feed portion in the shape of the letter T that is configured in such a manner that signal coupling occurs toward the heat sink 1020. The first feed portion 1110a and the second feed portion may be referred to as a first coupling feed portion and a second coupling feed portion, respectively, because the signal coupling occurs toward the inside of the heat sink 1020 in the shape of a loop. For convenience, the first coupling feed portion may be referred to as a coupling feed portion 1110a.

The coupling feed portion 1110a may be configured as a metal patch that is arranged on at least one surface of the dielectric carrier DC that is vertically connected to the circuit board 1010. The metal patch may be configured with a plurality of radiation patches RPs in FIG. 7A or FIG. 7B.

With reference to FIG. 7A, the radiation patch RP may be configured to be arranged on a front surface of the dielectric carrier DC, and the side surface patch SSP may be configured to be arranged a side surface of the dielectric carrier DC. In this case, the side surface patch SSP may be configured to be connected to the radiation patch RP. However, the side surface patch SSP is not limited to this configuration, and may be spaced away from the radiation patch RP to be coupled therewith. In this regard, the radiation patch RP may be referred to as a first radiation patch 1111a, and the side surface patch SSP may be referred to as a second radiation patch 1112a.

Therefore, the first radiation patch 1111a may be configured to be arranged on the front surface of the dielectric carrier DC. The second radiation patch 1112a may be arranged on the side surface of the dielectric carrier DC to be substantially vertically connected to the first radiation patch RP1. The first radiation patch 1111a may be arranged, in the shape of a semi-circle, on the front surface of the dielectric carrier DC. The second radiation patch 1112a may be arranged, in the shape of a rectangle, on the side surface of the dielectric carrier DC.

In addition, the parasitic patch PP may be configured to be arranged on a rear surface of the dielectric carrier DC. Accordingly, a broadband antenna element according to the present disclosure may be referred to as a shaped monopole with parasitic element. Particularly, the broadband antenna element may be referred to as a half-circle shaped monopole with a parasitic element, considering the shape of the radiation patch RP that is arranged on the front surface of the dielectric carrier DC. However, the shape of the radiation patch RP that is arranged on the front surface of the dielectric carrier DC is not limited to a half-circle, and the radiation patch RP, as shown in FIG. 8B, may be formed in the shape of a rectangle.

In order to operate as a monopole antenna, the radiation patch RP (RP2) and the parasitic patch PP may be configured to be connected to each other. In this regard, a plurality of screws SCs may be arranged a predetermined distance apart on the radiation patch RP (RP2). One or several of the plurality of screws SCs may be fastened to connect the radiation patch RP (RP2) and the parasitic patch PP to each other. Several of the plurality of screws SC may not be fastened to be connected directly to the parasitic patch PP. In this case, the depth to which one or several of the plurality of screws SCs is inserted into the dielectric carrier DC may be adjusted, and thus impedance matching may be performed on a per-band basis.

With reference to FIG. 7B, the radiation patch RP2 may be configured to be arranged on the front surface of the dielectric carrier DC, and the side surface patch SSP may be configured to be arranged on the side surface of the dielectric carrier DC. In this case, the side surface patch SSP may be configured to be connected to the radiation patch RP2. However, the side surface patch SSP is not limited to this configuration and may be spaced away from the radiation patch RP2 to be coupled therewith. In this regard, the radiation patch RP may be referred to as a first radiation patch 1111b, and the side surface patch SSP may be referred to as a second radiation patch 1112b.

Therefore, the first radiation patch 1111b may be configured as to be arranged on the front surface of the dielectric carrier DC. The second radiation patch 1112b may be arranged on the side surface of the dielectric carrier DC to be connected substantially vertically to the first radiation patch 1111b. The first radiation patch 1111b may be arranged, in the shape of a rectangle, on the front surface of the dielectric carrier DC. The second radiation patch 1112b may be arranged in the shape of a rectangle, on the side surface of the dielectric carrier DC.

As an example, a plurality of screws SCs may also be arranged on the side surface of the dielectric carrier DC to be spaced a predetermined distance apart. In this case, the depth by which the plurality of screws SCs are inserted into the side surface of the dielectric carrier DC may be adjusted, and thus the impedance matching may be performed on a per-band basis.

As an example, the dielectric carrier DC may be configured in such a manner that a dielectric material of one portion thereof is removed. As illustrated in FIGS. 7A and 7B, slot regions slot1 and slot2, each with a predetermined thickness, from which the dielectric material is removed may be formed into the dielectric carrier DC to a predetermined depth. In this manner, with radiation efficiency of the antenna elements 1110a and 1110b can be improved by the slot regions slot1 and slot2 from which the dielectric material is removed. In this regard, dielectric loss that occurs due to electric current induced by the antenna elements

1110a and 1110b may be decreased by the slot regions slot1 and slot2 from which the dielectric material is removed.

A feeder F connected to the radiation patch RP (RP2) and formed to feed a signal may be disposed on the front surface of the dielectric carrier DC. In this regard, the feeder F of each of the antenna elements 1110a and 1110b may be connected to a signal line of a transceiver circuit 1250 in FIG. 5B. Accordingly, the transceiver circuit 1250 may transfer a signal to at least one of the plurality of antennas.

With reference to FIGS. 5A to 7B, the second radiation patches 1112a and 1112b that are arranged on the side surface of the dielectric carrier DC may be fastened with one of conductive members of the heat sink 1020 and with the screw SC.

With reference to FIGS. 5A to 6, the antenna system 1000 may be configured to further include a coupling ground portion 1120. The coupling ground portion 1120 may be arranged to be coupled with a second conductive member facing the conductive member of the heat sink 1020 on which the coupling feed portion 1110 is arranged.

In this regard, the ground region GND may be arranged on the front surface of the circuit board 1010, and a feeding pattern that is electrically connected to the coupling feed portion 1110 may be arranged on the rear surface of the circuit board 1010. As another example, a position at which the feeding pattern is arranged is not limited to the rear surface of the circuit board 1010, and the feeding pattern may be arranged on the front surface of the circuit board 1010 or on a front surface of another circuit board.

The coupling ground portion 1120 may include a vertical connection portion VCP that is substantially vertically connected to the circuit board 1010. The coupling ground portion 1120 may further include a horizontal extension portion HCP that is formed in a manner that extends in one direction and the other direction from the vertical connection portion. The horizontal extension portion HCP of the coupling ground portion 1120 may be arranged under the second conductive member in a manner that is spaced a predetermined distance away from the second conductive member. However, the horizontal extension portion HCP is not limited to this arrangement, and may be configured in such a manner that at least one portion thereof is connected to the second conductive member.

The antenna system 1000 may be configured to further include a lower heat sink 1030. The lower heat sink 1030 may be arranged in such a manner to be brought into contact with the circuit board 1010. As another example, the lower heat sink 1030 may be arranged under the circuit board 1010 to be spaced a predetermined away from the circuit board 1010. The lower heat sink 1030 may be configured to absorb heat that is generated in the circuit board 1010. In addition, the lower heat sink 1030 may be configured to transfer the heat generated in the circuit board 1010 to the heat sink 1020 through the fixation portion 1025.

The lower heat sink 1030 may be configured to include a plate portion 1031 and an extension portion 1032. The plate portion 1031 may be configured in such a manner that a heat dissipation fan FAN is arranged thereon. As an example, the heat dissipation fan FAN may be fastened to the plate portion 1031. The extension portion 1032 may be provided. The extension portion 1032 may extend from the plate portion 1031 toward one side or the other side and may be configured to be fastened to a vertical fastening portion VCP of the heat sink 1020.

The vertical fastening portion VCP and the extension portion 1032 may be electrically connected to the ground region GND formed on the front surface of the circuit board 1010. Accordingly, an antenna that is formed with the coupling feed portion 1110, the coupling ground portion 1120, and an aperture region in the heat sink 1020 may be configured to operate in a broad band.

The antenna system 1000 may further include a transceiver circuit 1250 and a processor 1400. In this regard, the transceiver circuit 1250 and the processor 1400 may be arranged on the rear surface or front surface of the circuit board 1010. As another example, the transceiver circuit 1250 and the processor 1400 may be arranged on top of another circuit board that is arranged under the circuit board 1010.

The transceiver circuit 1250 may be operatively combined with the coupling feed portion 1110. The processor 1400 may be operatively combined with the transceiver circuit 1250. The processor 1400 may be a baseband processor corresponding to a modem, but is not limited thereto. The processor 1400 may be an arbitrary processor that controls the transceiver circuit 1250. The antenna system 1000 may operate, as a single antenna, by the coupling feed portion 1110 and the coupling ground portion 1120.

The transceiver circuit 1250 may be operatively combined with the coupling feed portion 1110 and may be configured to control a signal that is transferred to the coupling feed portion 1110 through the feeding pattern. The transceiver circuit 1250 may include a front end module (FEM), such as an electric power amplifier or a reception amplifier. As another example, the front end module (FEM) may be arranged between the transceiver circuit 1250 and the antenna, separately from the transceiver circuit 1250. The transceiver circuit 1250 may control a magnitude and/or a phase of a signal that is transferred to the coupling feed portion 1110, by adjusting a gain or an input or output electric power of the electric power amplifier or the reception amplifier. At this point, as described above, the feeding pattern may be arranged on the rear surface of the circuit board 1010, but is not limited thereto.

The processor 1400 may be operatively combined with the transceiver circuit 1250 and may be configured to control the transceiver circuit 1250. The processor 1400 may control the magnitude and/or the phase of the signal that is transferred to the coupling feed portion 1110, by controlling the transceiver circuit 1250.

In this regard, the antenna system may operate as a single antenna in a first band, a second band, and a third band by the coupling feed portion 1110 and the coupling ground portion 1120. In this regard, the first band, the second band, and the third band may correspond to the low band (LB), the mid band (MB), and the high band (HB), respectively, for the 4G LTE system. The 5G NR system that uses a 5G Sub-6 band may operate in the LB, MB, and HB bands through LTE re-framing. In addition, the 5G NR system may operate in a band other than the low band (LB), the mid band (MB), and the high band (HB).

In this regard, the processor 1400 may receive control information including resource allocation information, from at least one of the road side unit (RSU) and a base station. As an example, the processor 1400 of the vehicle 500 may receive or detect the resource allocation information through the Physical Downlink Control Channel (PDCCH). The processor 1400 may determine a resource domain allocated through the Physical Downlink Control Channel (PDCCH).

The processor 1400 may control the transceiver circuit 1250 on the basis of the allocated resource domain to perform the carrier aggregation (CA) in two or more of the first to third bands.

As described above, the 5G NR system may also operate in a band other than the LB, the MB, and the HB. In this regard, FIGS. 8A and 8B show efficiency and a return loss characteristic, respectively, of the antenna system that is disclosed in the present disclosure.

Figure 8A:
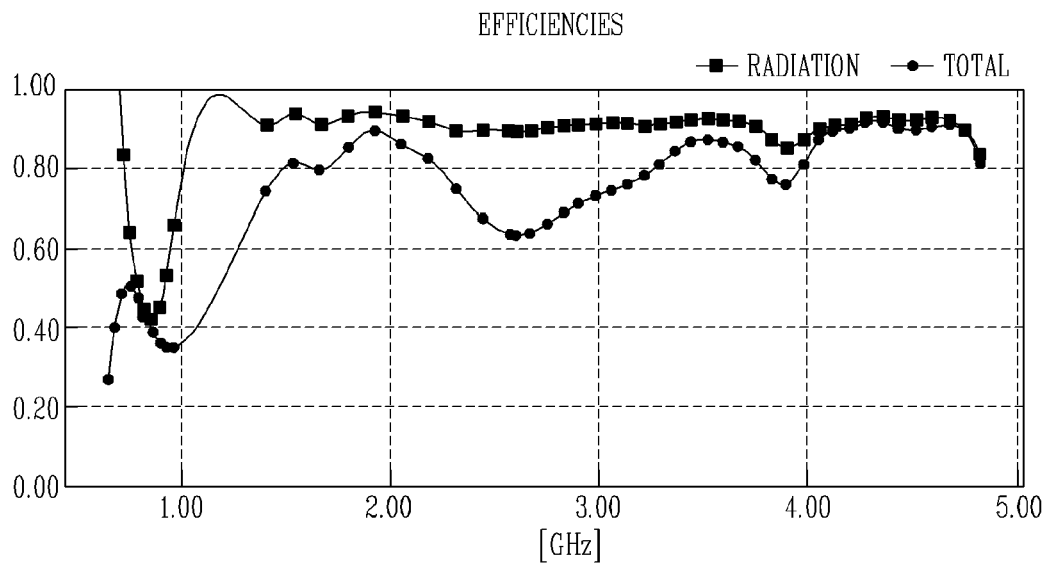
FIGS. 8A and 8B are graphs showing efficiency and a return loss characteristic, respectively, of the antenna system that is disclosed in the present disclosure.
Figure 8B:
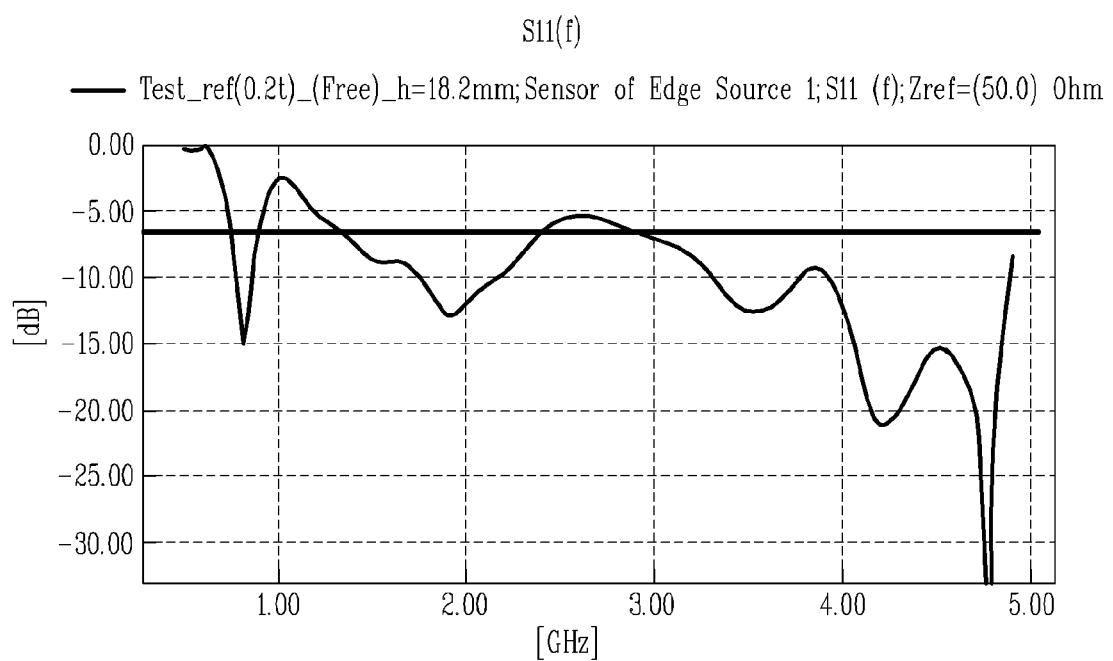

With reference to FIGS. 8A and 8B, the antenna system that is disclosed in the present disclosure may operate in a broad band of approximately 600 MHz to 6 GHz. More specifically, the antenna system that is disclosed in the present disclosure may operate in a broad band of approximately 617 MHz to 5900 MHz.

With reference to FIG. 8A, (i) radiation efficiency of the antenna corresponds to a high efficiency of 50% or more in a full band. (ii) Total efficiency of the antenna corresponds to a high efficiency of 50% or more in an almost full band, except for one portion of the low band (LB).

With reference to FIG. 8B, a return loss characteristic of the antenna represents a high efficiency of 50% or more in an almost full band, except for one portion of each of the low band (LB) and the mid band (MB). Therefore, when the return loss characteristic in one portion of each of the low band (LB) and the mid band (MB) is further improved, the antenna system is possibly configured in such a manner that (ii) the total efficiency of the antenna represents a high efficiency of 50% or more.

Therefore, as described above, the antenna system that is disclosed in the present disclosure may operate in a broad band of approximately 600 MHz to 6 GHz. More specifically, the antenna system that is disclosed in the present disclosure may operate in a broad band of approximately 617 MHz to 5900 MHz.

In another practical example of the present disclosure, the processor 1400 may be configured to compute a fan rotation speed of the heat dissipation fan FAN. As an example, the processor 1400 may be configured to compute the fan rotation speed of the dissipation fan FAN that is arranged inside the aperture region in the heat sink 1020, or an amount of electric power consumed by the transceiver circuit 1250.

The processor 1400 may determine whether or not the fan rotation speed of the heat dissipation fan FAN is at or above a first threshold and/or whether or not quality of a signal received by the antenna is at or above a second threshold. When the fan rotation speed of the heat dissipation fan FAN is at or above the first threshold and the quality of the signal received by the antenna is at or above the second threshold, the processor 1400 may control the transceiver circuit 1250 to decrease a magnitude of a signal that is applied to the coupling feed portion 1110. When a distance to a base station is increased, a terminal in which the antenna system is mounted, for example, the vehicle 500, may transmit to a nearby vehicle located closer to the base station or to the road side unit (RSU) a message for requesting a connection state change. That is, when a larger magnitude of a signal is required because a temperature of the inside of the vehicle 500 is increased and the distance to the base station is increased, the vehicle 500 may make a change request for connection to a nearby entity.

According to another embodiment of the present disclosure, an antenna system that is disclosed in the present disclosure may operate as a plurality of antennas. In this regard, FIG. 9 illustrates a configuration of an antenna system according to an embodiment of the present disclosure that has a plurality of feed structures.

Figure 9:
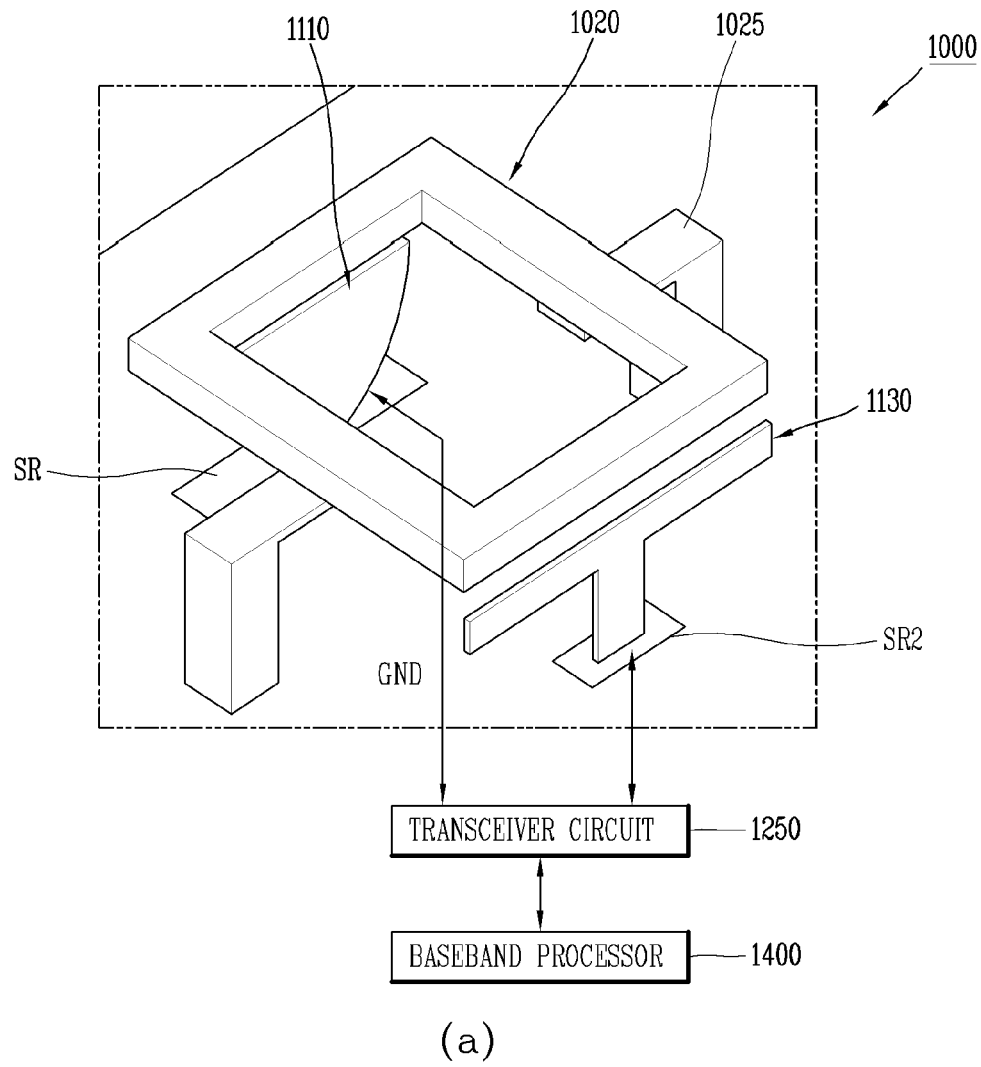
FIG. 9 is views each illustrating a configuration of an antenna system according to an embodiment of the present disclosure that has a plurality of feed structures.
Figure 9:
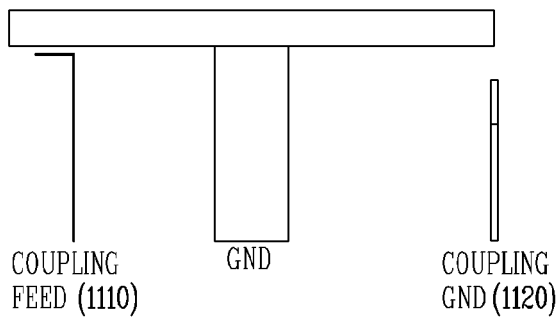

With reference to FIG. 9, the antenna system 1000 may further include a second coupling feed portion 1130 that is arranged to be coupled with the second conductive member facing a conductive member of the heat sink 1020 on which the coupling feed portion 1110 is arranged. In this regard, the ground region GND may be arranged on the front surface of the circuit board 1010. A first region of the circuit board 1010 that is connected to the coupling feed portion 1110 and a second region thereof that is connected to the second coupling feed portion 1130 may be formed as slot regions SR1 and SR2, respectively, from which the ground pattern is removed.

As described above, the antenna system 1000 may be configured to further include the transceiver circuit 1250 and the processor 1400. In this regard, the transceiver circuit 1250 and the processor 1400 may be arranged on the rear surface or front surface of the circuit board 1010. As another example, the transceiver circuit 1250 and the processor 1400 may be arranged on top of another circuit board arranged under the circuit board 1010.

The transceiver circuit 1250 may be operatively combined with the coupling feed portion 1110 and the second coupling feed portion 1130. The processor 1400 may be operatively combined with the transceiver circuit 1250. The processor 1400 may be a baseband processor corresponding to a modem, but is not limited thereto. The processor 1400 may be an arbitrary processor that controls the transceiver circuit 1250. The processor 1400 may control the transceiver circuit 1250 in such a manner that the antenna system performs Multi-Input Multi-Out (MIMO) in the mid band (MB) using the coupling feed portion 1110 and the second coupling feed portion 1130.

Figure 10:
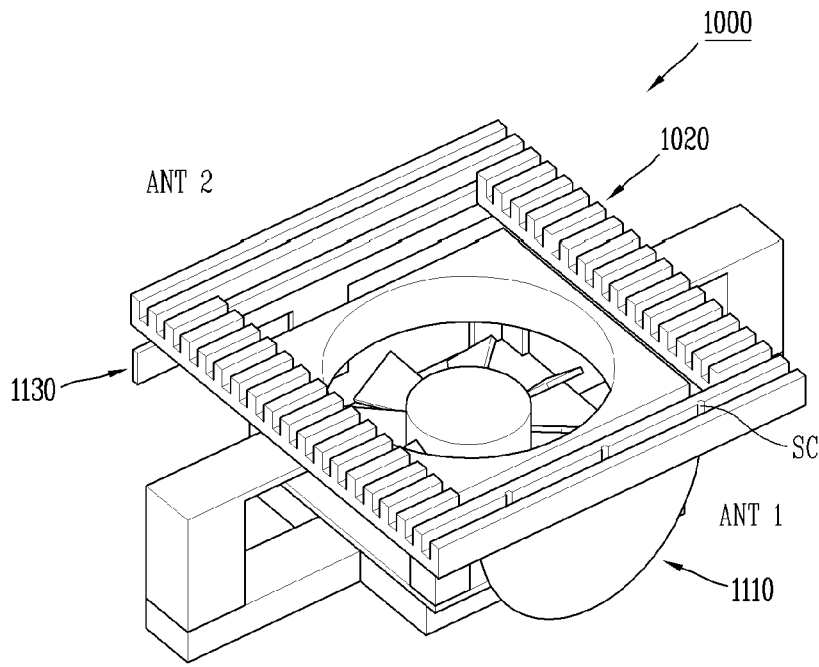
FIG. 10 is views illustrating antenna systems according to different embodiments, respectively, of the present disclosure, each of which includes a heat sink through a plurality of coupling feed portions.
Figure 10:
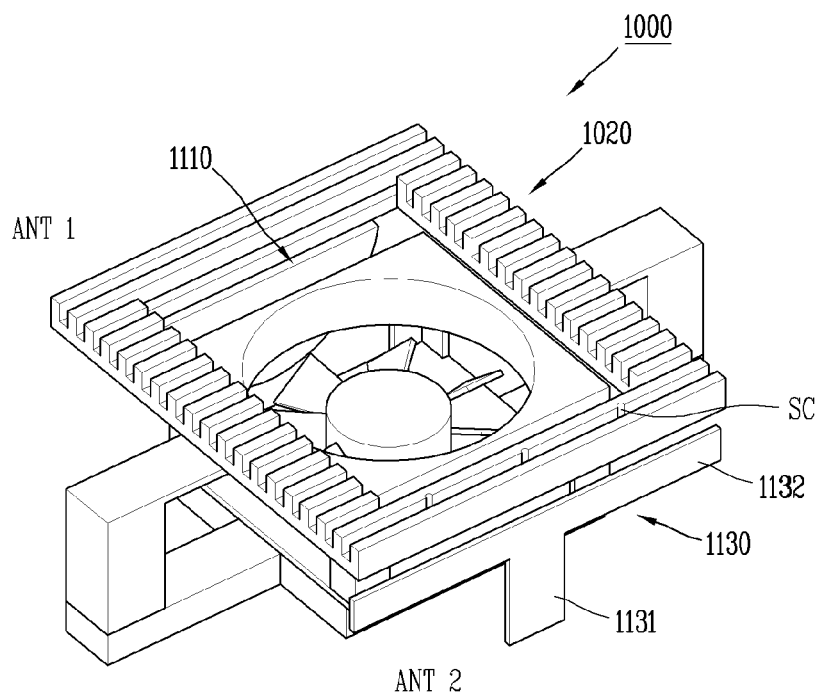
Figure 11:
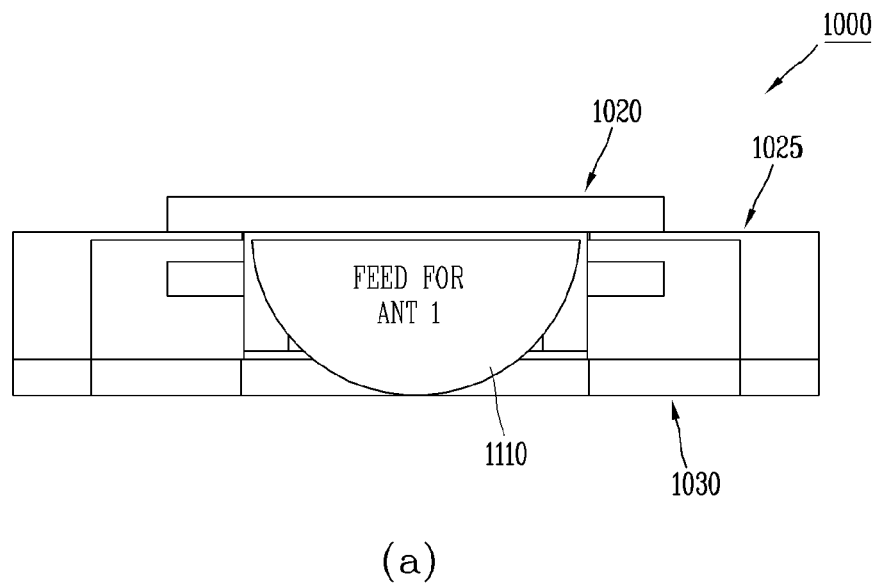
FIG. 11 are side views each illustrating the antenna system in FIG. 10.
Figure 11:
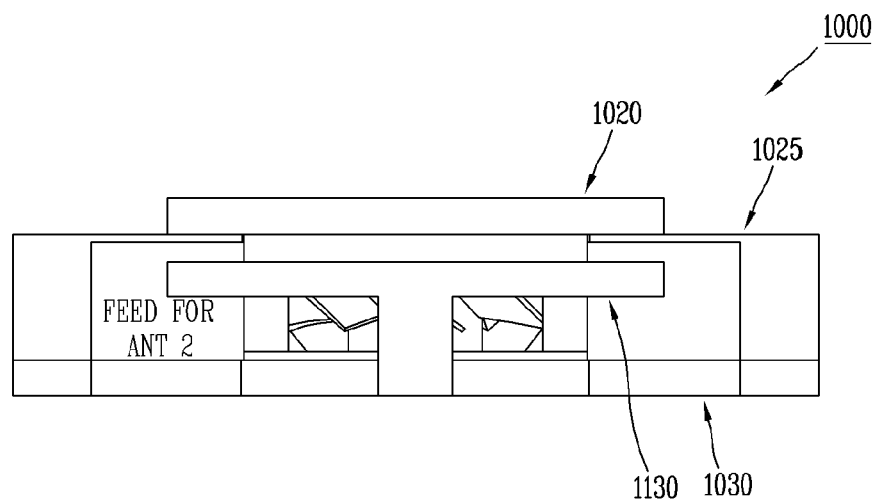

In the antenna system that is disclosed in the present disclosure, one heat sink 1020 may functionally operate as a plurality of antennas through a plurality of feed portions. Through the plurality of feed portions, the antenna system may perform Multi-Input Multi-Out (MIMO). In this regard, FIG. 10 illustrates antenna systems according to different embodiments, respectively, of the present disclosure, each of which includes the heat sink 1020 through the plurality of coupling feed portions. FIG. 11 are side views each illustrating the antenna system in FIG. 10.

With reference to FIG. 10A, the first coupling feed portion 1110 is connected, by the screw SC, to the heat sink 1020. In contrast, the second coupling feed portion 1110 may be arranged to be spaced a predetermined distance away from the heat sink 1020.

With reference to FIG. 10B, the first coupling feed portion 1110 may be arranged to be spaced a predetermined distance away from the heat sink 1020. In addition, the second coupling feed portion 1130 may also be arranged to be spaced a predetermined distance away from the heat sink 1020.

With reference to FIG. 10, a first feed portion 1110 may be configured with a front surface patch in the shape of a semi-circle and a side surface patch. In contrast, a second feed portion 1130 may be configured to include a vertical connection portion 1131 and a horizontal connection portion 1132. The vertical connection portion 1131 may be arranged under the heat sink 1020 in a direction vertical to the heat sink 1020. The horizontal connection portion 1132 may be arranged to extend from the vertical connection portion 1121 in one direction and the other direction.

FIG. 11A is a side view illustrating one side of the first coupling feed portion 1110 when viewed from the antenna system 1000 side. FIG. 11B is a side view illustrating the other side of the second coupling feed portion 1130 when viewed from the antenna system 1000 side.

With reference to FIGS. 10A to 11A, the first coupling feed portion 1110 may be configured to be fastened by the screw SC to the heat sink 1020. As another example, with reference to FIGS. 10B and 11A, the first coupling feed portion 1110 may be configured to be arranged to be spaced a predetermined distance away from the heat sink 1020.

Figure 19A:
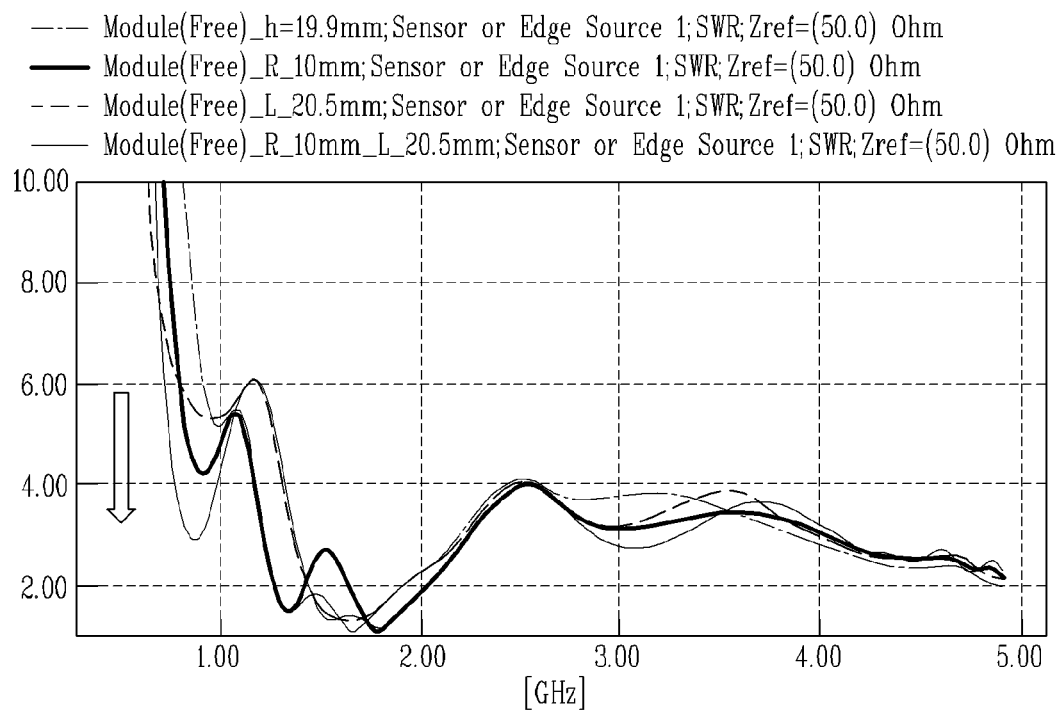
FIGS. 19A and 19B are graphs showing a VSWR characteristic and an antenna efficiency characteristic, respectively, that vary with different combinations of a first short-circuit portion and a second short-circuit portion.

With reference to FIGS. 19A, 10B, and 11B, the second coupling feed portion 1130 may be configured to be arranged to be spaced a predetermined distance away from the heat sink 1020. In FIGS. 11A and 11B, the second coupling feed portion 1130 may be replaced with the coupling ground 1120. The first coupling feed portion 1110 and the second coupling feed portion 1130 may be referred to as the first feed portion 1110 and the second feed portion 1130, respectively.

Shapes of the first feed portion 1110 and the second feed portion 1130 are not limited and are changeable, depending on application. The first feed portion 1110 and the second feed portion 1130 are formed to have the same shape, and thus the first antenna ANT1 and the second antenna ANT2 may maintain the same or similar electric characteristic. However, when the first feed portion 1110 and the second feed portion 1130 have the same shape, an interference characteristic between the first antenna ANT1 and the second antenna ANT2 may deteriorate.

Figure 12A:
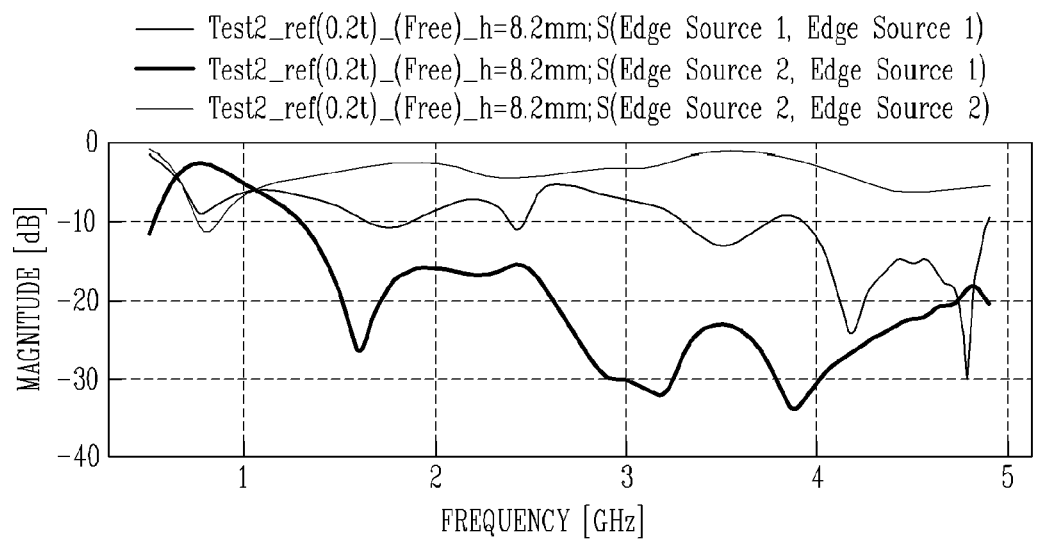
FIG. 12A is a graph showing a return coefficient and a separation characteristic of the antenna system that includes a first feed portion and a second feed portion.
Figure 12B:
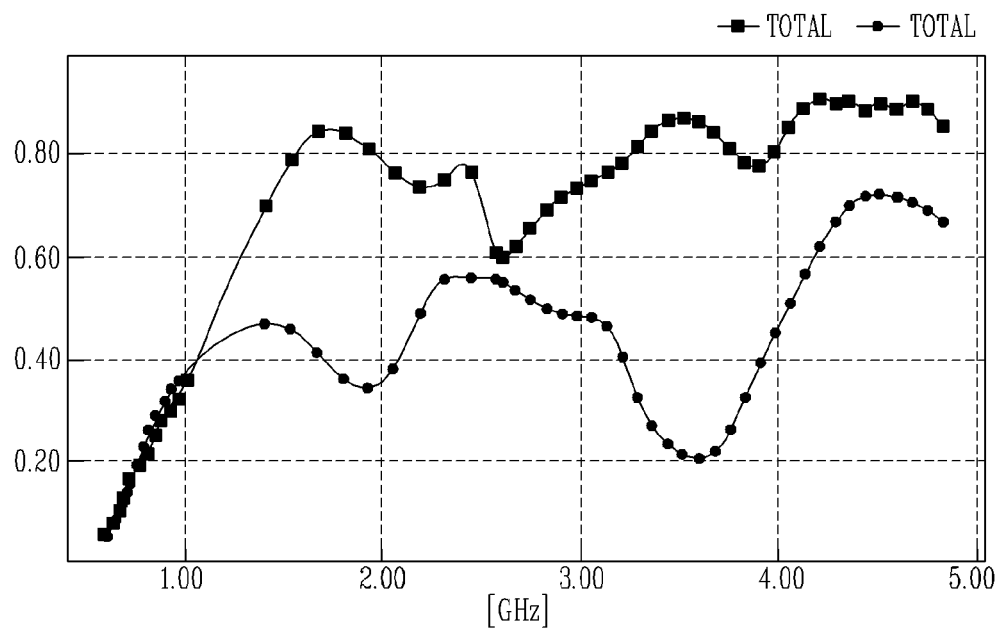
FIG. 12B is a graph showing an antenna efficiency characteristic of the antenna system that includes the first feed portion and the second feed portion.

Multi-Input Multi-Output (MIMO) may be performed using the antenna system that, as illustrated in FIG. 10, includes the plurality of feed portions. In this regard, FIG. 12A shows a return coefficient and a separation characteristic of the antenna system that includes the first feed portion and the second feed portion. FIG. 12B shows an antenna efficiency characteristic of the antenna system that includes the first feed portion and the second feed portion.

With reference to FIG. 12A, the return loss characteristics of the first antenna ANT1 and the second antenna ANT2 that result from the first feed portion and the second feed portion, respectively, are satisfactory in an almost full band. However, the isolation characteristic between the first antenna ANT1 and the second antenna ANT2 deteriorates in the low band (LB). Therefore, the heat sink-based antenna system, performing a MIMO operation, which is disclosed in the present disclosure, may operate in the mid band (MB), the high band (HB) and the 5G Sub-6 band, except in the low band (LB). Therefore, the heat sink-based antenna system, performing the MIMO operation, which is disclosed in the present disclosure, may be configured to operate in a band of 1410 MHz to 5900 MHz.

With reference to 12B, total efficiency characteristics of the first antenna ANT1 and the second antenna ANT2 that result from the first feed portion and the second feed portion, respectively, are satisfactory in the mid band (MB), the high band (HD), and the 5G Sub-6 band, except in the low band (LB). With reference to FIG. 12A, a return coefficient characteristic of the second antenna ANT2 deteriorates more than a return coefficient characteristic of the first antenna ANT1. Therefore, as shown in FIG. 12B, a total efficiency characteristic of the second antenna ANT2 deteriorates more than a total efficiency characteristic of the first ANT1.

Figure 13:
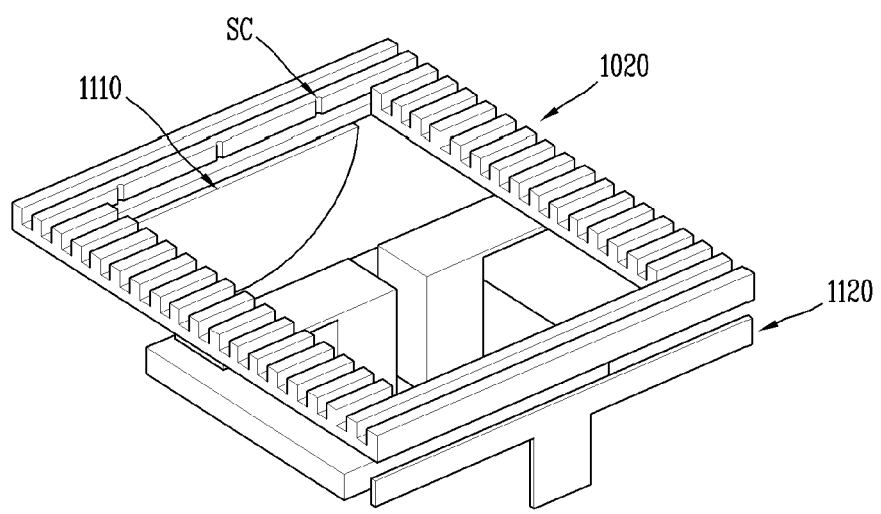
FIG. 13 is a view illustrating a configuration of an antenna according to another embodiment of the present disclosure in which a heat dissipation fan is not arranged inside a heat sink.
Figure 14A:
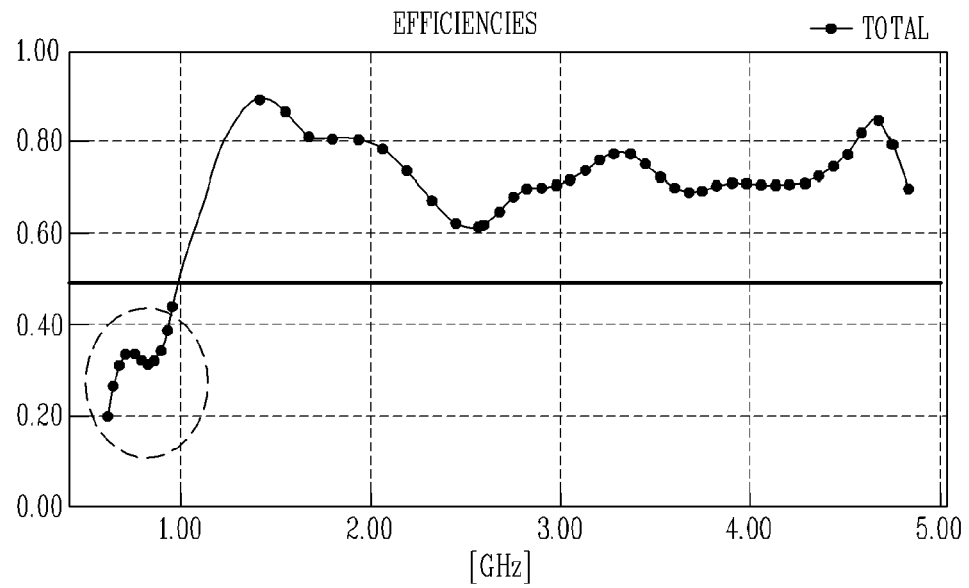
FIG. 14A is a graph showing an efficiency characteristic of the antenna in which the heat dissipation fan FAN is not arranged inside the heat sink.
Figure 14B:
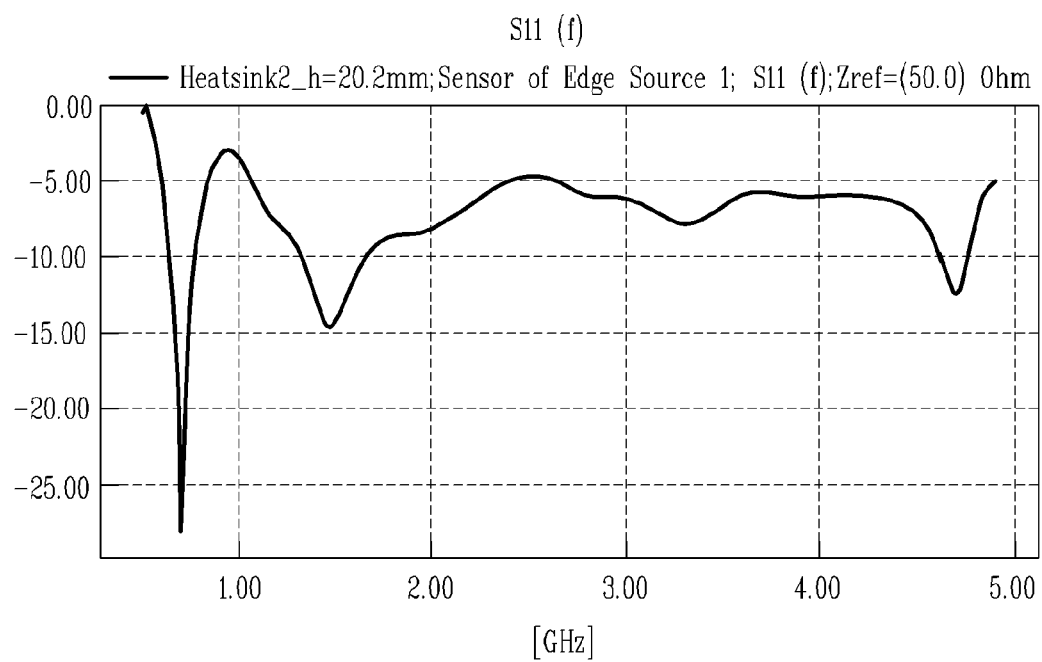
FIG. 14B is a graph showing a return loss characteristic of the antenna in which the heat dissipation fan FAN is not arranged inside the heat sink.

In the antenna system that is disclosed in the present disclosure, the heat dissipation fan FAN is arranged inside the heat sink 1020, and thus antenna performance can be improved. In this regard, FIG. 13 illustrates a configuration of an antenna according to another embodiment of the present disclosure in which the heat dissipation fan FAN is not arranged inside the heat sink 1020. FIG. 14A shows an efficiency characteristic of the antenna in which the heat dissipation fan FAN is not arranged inside the heat sink 1020. FIG. 14B shows a return loss characteristic of the antenna in which the heat dissipation fan FAN is not arranged inside the heat sink.

With reference to FIG. 13, the coupling feed portion 1110 may be arranged to be combined with the conductive member of the heat sink 1020. The coupling ground portion 1120 may be arranged to be spaced a predetermined distance away from the second conductive member facing the conductive member, to be coupled therewith. The configuration of the antenna in which the heat dissipation fan FAN is not arranged inside the heat sink 1020 is not limited to that described above. As an example, the antenna may be configured to perform Multi-Input Multi-Output (MIMO) by the plurality of coupling feed portions without the coupling ground portion.

With reference to FIG. 14A, an antenna efficiency of 50% or more is obtained in the mid band (MB), the high band (HB), and the 5G Sub-6 band. However, the antenna efficiency is decreased in the low band (LB). In contrast, from FIG. 8A, it can be seen that the antenna efficiency characteristic is also kept at a 50% level in the neighborhood 1 GHz and in the low band (LB) of less than 1 GHz. Therefore, in the antenna system that is disclosed in the present disclosure, the heat dissipation fan FAN is arranged inside the heat sink 1020, and thus the antenna efficiency characteristic can be improved. The reason for this is because a low band (LB) resonance mode is formed between a loop structure resulting from the heat sink 1020 and a metal structure surrounding the heat dissipation fan FAN that is arranged inside the heat sink.

With reference to FIG. 14B, the antenna characteristically has a return loss of −6 dB or less in the mid band (MB), the high band (HB), and the 5G Sub-6 band. The antenna also characteristically has a return loss of −6 dB or less in one portion of the low band (LB). With reference to FIG. 8B, the antenna that has the heat sink 1020 inside which the heat dissipation fan FAN, as illustrated in FIG. 14B, is not arranged has a similar return loss characteristic to the antenna that has the heat sink 1020 inside which the heat dissipation fan FAN is arranged. With reference to FIGS. 8A and 14A, the arranging of the heat dissipation fan (FAN) inside the heat sink 1020 can improve the antenna efficiency characteristic without a significant increase in the return loss characteristic. The low band (LB) resonance mode formed between the loop structure resulting from the heat sink 1020 and the metal structure surrounding the heat dissipation fan FAN enables the antenna system to also operate in the low band (LB).

Figure 15A:
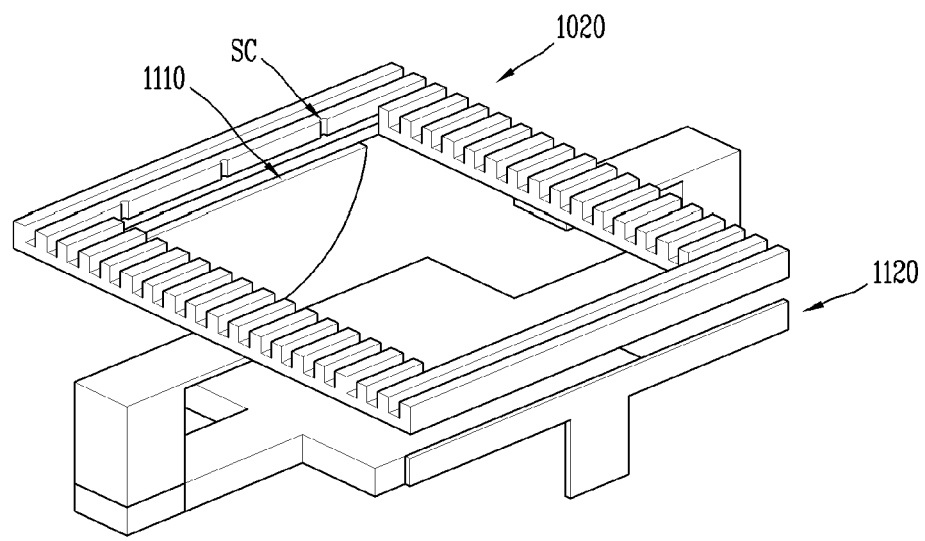
FIG. 15A is a view illustrating a structure in which the coupling ground portion of the heat sink-based antenna system is arranged under a conductive member of the heat sink.
Figure 15B:
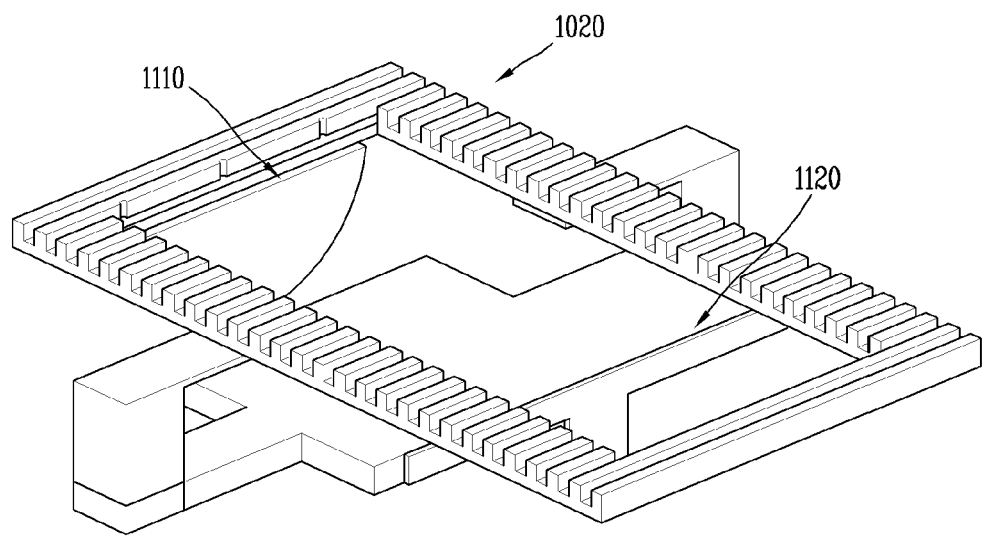
FIG. 15B is a view illustrating a structure in which the coupling ground portion of the heat sink-based antenna system is arranged inside the conductive member of the heat sink.
Figure 16A:
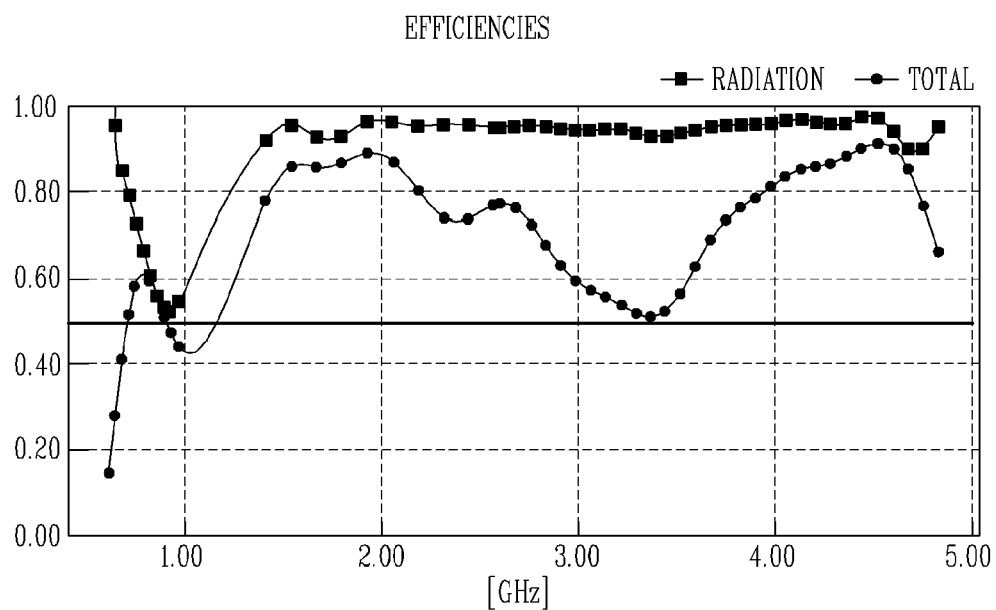
FIG. 16A is a graph showing antenna radiation efficiency and a total efficiency characteristic that vary with a position of the coupling ground portion in FIG. 15A.
Figure 16B:
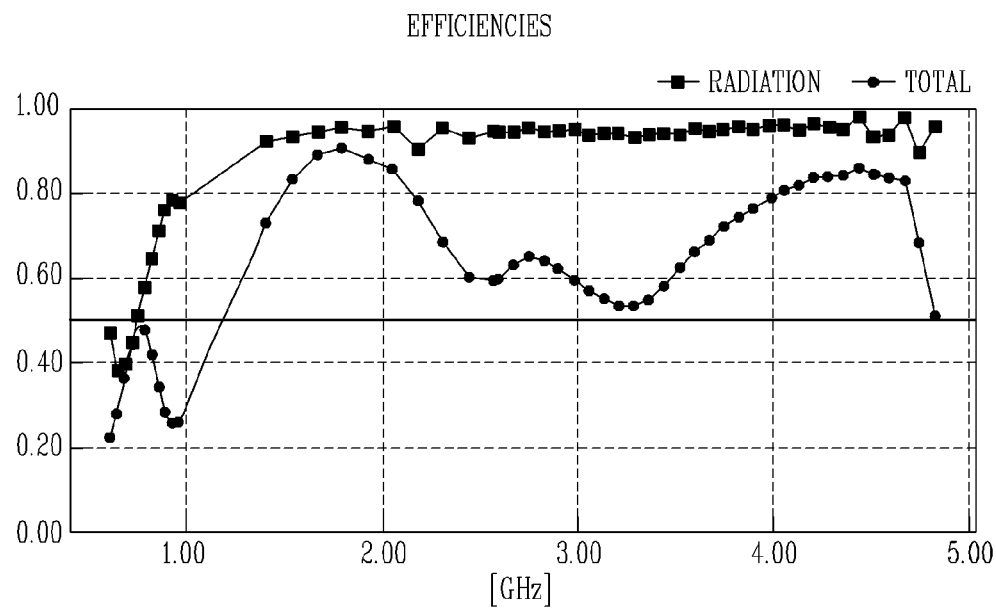
FIG. 16B is a graph showing the antenna radiation efficiency and the total efficiency characteristic that vary with the position of the coupling ground portion in FIG. 15B.

A position of the coupling ground portion of the heat sink-based antenna system that is disclosed in the present disclosure may be changed for an antenna band characteristic. In this regard, FIG. 15A illustrates a structure in which the coupling ground portion of the heat sink-based antenna system is arranged under a conductive member of the heat sink, and FIG. 15B illustrates a structure in which the coupling ground portion of the heat sink-based antenna system is arranged inside the conductive member of the heat sink. More specifically, FIG. 15A illustrates a case where the coupling ground portion of the heat sink-based antenna system is arranged under the conductive member of the heat sink. FIG. 15B illustrates the structure in which the coupling ground portion of the heat sink-based antenna system is arranged inside the heat sink. FIG. 16A shows antenna radiation efficiency and a total efficiency characteristic that vary with a position of the coupling ground portion in FIG. 15A. FIG. 16B shows the antenna radiation efficiency and the total efficiency characteristic that vary with the position of the coupling ground portion in FIG. 15B.

With reference to FIG. 15A, the coupling ground portion 1120 may be arranged under the second conductive member of the heat sink 1020. In this regard, the coupling feed portion 1110 may be connected to the conductive member of the heat sink 1020. The second conductive member of the heat sink 1020 may be arranged in a manner that faces the conductive member of the heat sink 1020.

With reference to FIG. 15B, the coupling ground portion 1120 may be arranged such that the coupling ground portion 1120 is offset by a predetermined distance from the second conductive member of the heat sink 1020 to be positioned inside the heat sink 1020. The coupling feed portion 1110 may be connected to a conductive member of the heat sink 1020. The second conductive member of the heat sink 1020 may be arranged in a manner that faces the conductive member of the heat sink 1020. In this regard, the coupling ground portions 1120 in FIGS. 15A and 15B may be configured in such a manner that respective positions thereof are the same, and the heat sink 1020 may be configured in such a manner that a length thereof is increased.

With reference to FIGS. 16A and 16B, the arranging of the coupling ground portion inside the heat sink decreases the antenna radiation efficiency and the total efficiency characteristic in the low band (LB). Therefore, the arranging of the coupling ground portion inside the heat sink decreases an antenna characteristic in the low band (LB). Therefore, it may be determined that the coupling feed portion needs to be suitably positioned under the second conductive member of the heat sink in order for the antenna system to operate in a broad band. However, in a case where, depending on the application, the antenna system operates only in the mid band (MB) or broader, the coupling ground portion may be arranged inside the heat sink. Accordingly, interference with another antenna that operates in the low band (LB) may be reduced.

The heat sink-based antenna system according to an aspect of the present disclosure is described above. An antenna system according to another aspect of the present disclosure that uses a loop-shaped metal pattern and a branch line pattern 1102 is described hereinafter.

Figure 17A:
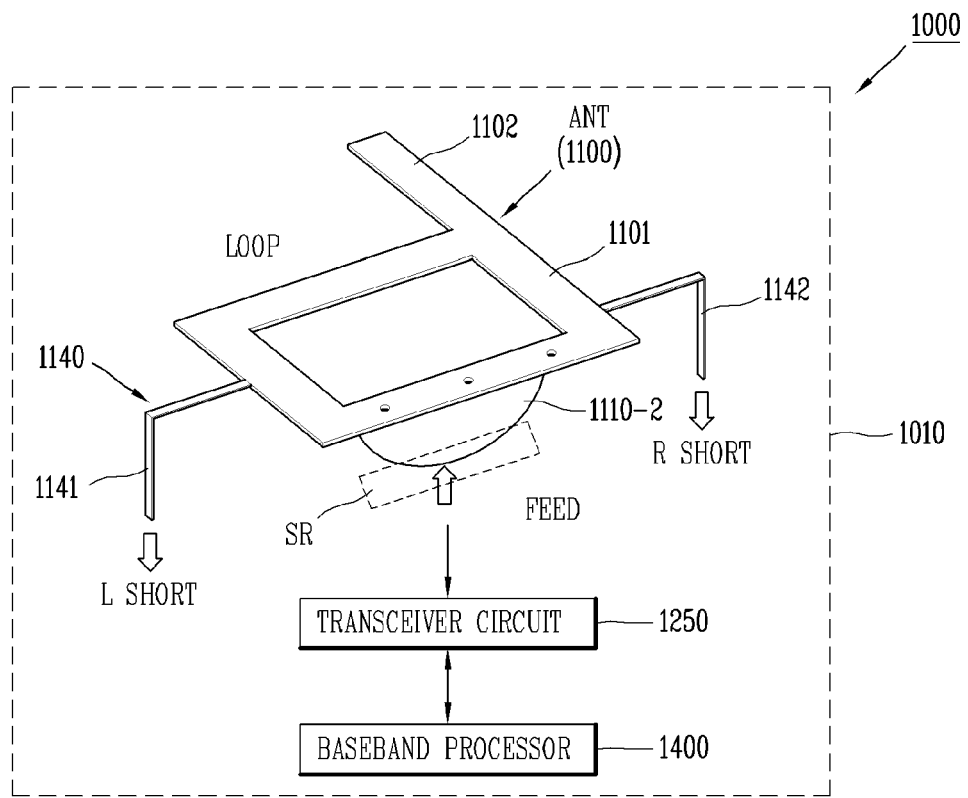
FIGS. 17A and 17B are views illustrates a shape of an antenna system according to an embodiment of the present disclosure that uses a loop-shaped metal pattern and a branch line pattern and an equivalent structure of the antenna system, respectively.
Figure 17B:
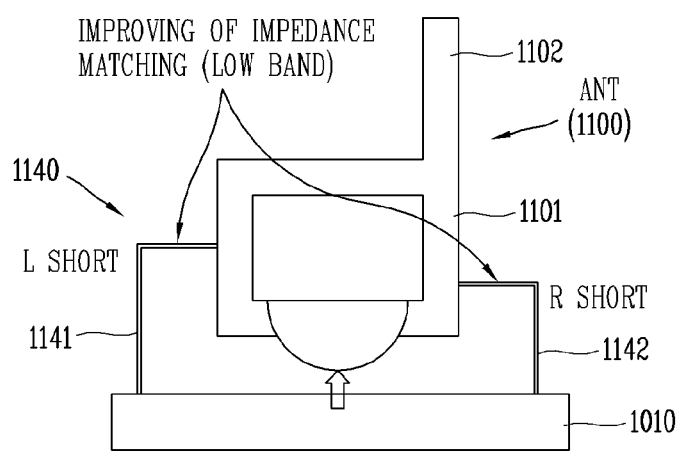

In this regard, FIGS. 17A and 17B illustrate a shape of an antenna system according to an embodiment of the present disclosure that uses the loop-shaped metal pattern and the branch line pattern 1102 and an equivalent structure of the antenna system, respectively.

Figure 18A:
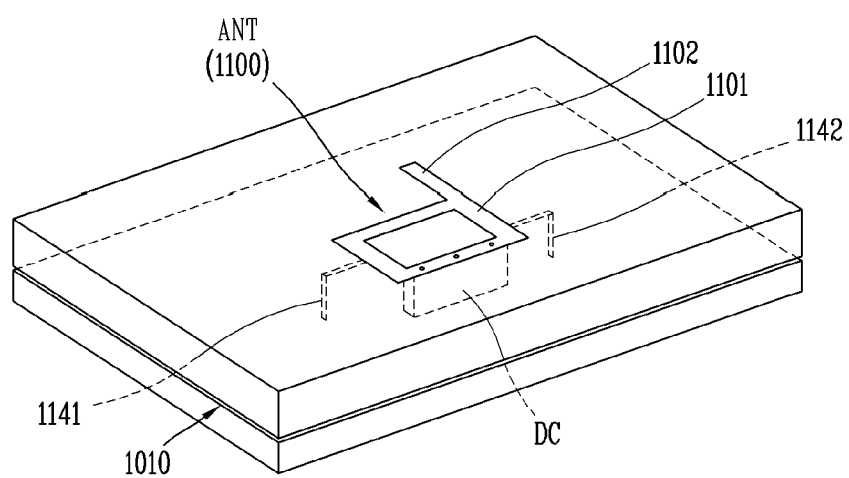
FIG. 18A is a view illustrating a PCB structure with which the antenna system according to the embodiment of the present disclosure that uses the loop-shaped metal pattern and the branch line pattern is realized.
Figure 18B:
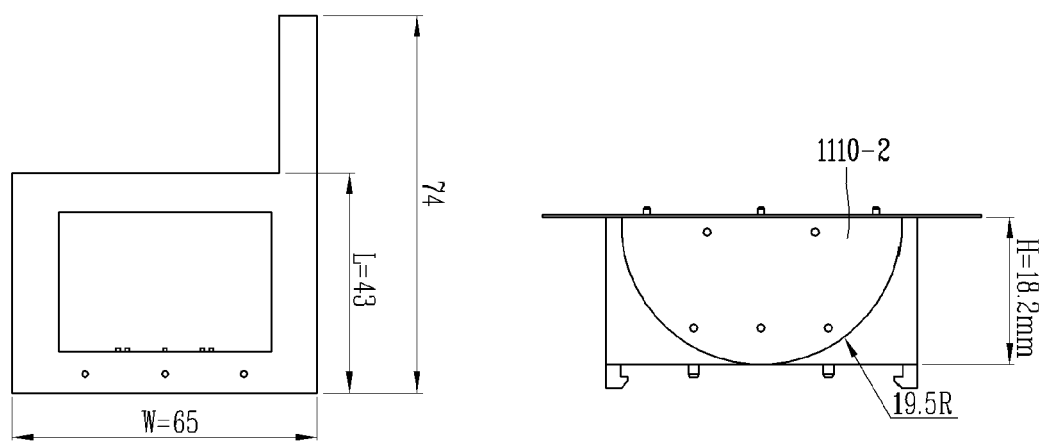
FIG. 18B is a view illustrating the loop-shaped metal pattern including the branch line pattern and a shape of the coupling feed portion in the antenna system according to the embodiment of the present disclosure.

FIG. 18A illustrates a PCB structure with which the antenna system according to the embodiment of the present disclosure that uses the loop-shaped metal pattern and the branch line pattern 1102 is realized. FIG. 18B illustrates the loop-shaped metal pattern including the branch line pattern 1102 and a shape of the coupling feed portion in the antenna system according to the embodiment of the present disclosure.

With respect to FIGS. 17A to 18B, the antenna system 1000 may be configured to include a circuit board 1010, an antenna ANT (1100), and a coupling feed portion 1110-2.

The circuit board 1010 may be arranged on the metal frame on the roof of the vehicle 500 or on the metal frame inside the roof frame, and various electronic components may be arranged on the circuit board 1010. The antenna ANT (1100) may be configured to include an aperture region, corresponding to the inside of the metal pattern, over the circuit board 1010.

The ground region GND may be arranged on the front surface of the circuit board 1010, and a region of the circuit board 1010 that is connected to the coupling feed portion 1110-2 may be formed as a slot region SR from which the ground pattern is removed. The feeding pattern that is electrically connected to the coupling feed portion 1110-2 may be arranged on the rear surface or front surface of the circuit board 1010.

The antenna system 1000 may be configured to further include a transceiver circuit 1250 and a processor 1400. The transceiver circuit 1250 may be operatively combined with the coupling feed portion 1110-2 and may be configured to control a signal that is transferred to the coupling feed portion 1110-2 through the feeding pattern.

The processor 1400 may be operatively combined with the transceiver circuit 1250 and may be configured to control the transceiver circuit 1250. The processor 1400 may be a baseband processor corresponding to a modem, but is not limited thereto. The processor 1400 may be an arbitrary processor. The processor 1400 may compute an amount of electric power consumed by the transceiver circuit 1250 and may determine whether or not quality of a signal received through the antenna is at or above a threshold. When the amount of electric power consumed by the transceiver circuit 1250 is at or above a first threshold and the quality of the signal received through the antenna is at or above a second threshold, the processor 1400 may control the transceiver circuit 1250 to decrease the magnitude of the signal. That is, the processor 1400 may control the transceiver circuit 1250 to decrease the magnitude of the signal that is applied to the coupling feed portion 1110-2.

The antenna ANT (1100) may be configured to be fixed to the circuit board 1010 with a short-circuit portion 1140 in between. The short-circuit portion 1140 may include a first short-circuit portion 1141 and a second short-circuit portion 1142 that are connected to one side and the other side, respectively, of a loop antenna 1101 and that are connected to the ground. Therefore, like a structure of each of the first short-circuit portion 1141 and the second short-circuit portion 1142, a structure that has a dual path to the ground may be referred to as a dual path to ground.

An impedance matching characteristic can be improved in the low band (LB) by the first short-circuit portion 1141 and the second short-circuit portion 1142. The antenna may have a broad band characteristic in the high band (HB) through the coupling feed portion 1110-2. In this regard, the antenna may operate in the broad band through a feed structure that has a wide surface and a feed structure that is tapered in a vertical direction.

A metal pattern other than metal patterns of the loop antenna 1101 to which a signal is transferred through the coupling feed portion 1110-2 may be connected to the ground region, with the first short-circuit portion 1141 and the second short-circuit portion 1142, respectively, in between. That is, the metal patterns on the one side and the other side of the loop antenna 1102 may be connected, at both side surfaces, respectively, of the loop antenna 1101, to the ground region of the circuit board 1010, with the first short-circuit portion 1141 and the second short-circuit portion 1142, respectively, in between. In this case, the loop antenna 1102 may be configured in such a manner that the metal patterns on the one side and the other side thereof are not connected to the coupling feed portion 1110-2. The first short-circuit portion 1141 and the second short-circuit portion 1142 that are connected to one side and the other side, respectively, of the loop antenna 1102 may be referred to as L-short and R-short, respectively.

The first short-circuit portion 1141 and the second short-circuit portion 1142 may be connected to the loop antenna 1102 to be positioned at different offset positions, respectively. A point at which the first short-circuit portion 1141 is connected to the loop antenna 1102 and a point at which the second short-circuit portion 1142 is connected to the loop antenna may be different from each other. As an example, the loop antenna 1102 may have a width W of 65 mm and a length L of 43 mm. In this case, a length L1 of the first short-circuit portion 1141 whose one end is connected to the loop antenna 1102 and a length R1 of the second short-circuit portion 1142 whose one end is connected the loop antenna may be different from each other. As an example, the length L1 of the first short-circuit portion 1141 whose one end is connected to the loop antenna 1102 may be 20.5 mm, but is not limited thereto. The length R1 of the second short-circuit portion 1142 whose one is connected to the loop antenna 1102 may be 10.0 mm, but is not limited thereto.

In this regard, because a branch line 1102 is formed only one side of the loop antenna 1101, points at which the first short-circuit portion 1141 and the second short-circuit portion 1142, respectively, are connected to the loop antenna 1101 may be made to be different from each other. The reason for this is because the branch line 1102 being offset makes a distribution of electric current formed on the loop antenna 1101 asymmetrical. In contrast, when the branch line 1102 is not formed or is symmetrically formed, the first short-circuit portion 1141 and the second short-circuit portion 1142 may be formed in such a manner that the points at which they, respectively, are connected to the loop antenna 1101 are the same. However, the first short-circuit portion 1141 and the second short-circuit portion 1142 are not limited to whether or not the branch line 1102 is formed and to whether or not the branch line 1102 is symmetrically formed. Regardless of whether or not the branch line 1102 is formed and of a length of the branch line 1102, the first short-circuit portion 1141 and the second short-circuit portion 1142 may be formed in such a manner that the points at which they, respectively, are connected to the loop antenna 1101 are the same.

Regardless of whether or not the branch line 1102 is offset, the points at which the first short-circuit portion 1141 and the second short-circuit portion 1142, respectively, are connected to the loop antenna 1101 may be made to be different from each other. Although the branch line 1102 is not formed or is symmetrically formed, the points at which the first short-circuit portion 1141 and the second short-circuit portion 1142, respectively, are connected to the loop antenna 1101 may be made to be different from each other. In this case, impedance values of matching circuits between the first short-circuit portion 1141 and the ground and between the second short-circuit portion 1142 and the ground may be set to be different from each other. Therefore, the degree of freedom to which the antenna characteristic may be optimized in a specific band may be increased. In addition, a bandwidth characteristic can be improved when the points at which the first short-circuit portion 1141 and the second short-circuit portion 1142, respectively, are connected to the loop antenna 1101 may be made to be different from each other. As an example, the point at which the first short-circuit portion 1141 is connected to the loop antenna 1101 may be set in such a manner that the antenna is optimized in a first frequency band that belongs to the low band (LB). In contrast, the point at which the first short-circuit portion 1141 is connected to the loop antenna 1101 may be set in such a manner that the antenna performance is optimized in a second frequency band that belongs to the low band (LB). Therefore, the points at which the first short-circuit portion 1141 and the second short-circuit portion 1142, respectively, are connected to the loop antenna 1101 may be made set to be somewhat different from each other, and thus the entire low band (LB) may be supported.

The antenna characteristic in the low band (LB) can be improved by the first short-circuit portion 1141 and the second short-circuit portion 1142. In this regard, FIGS. 19A and 19B show a VSWR characteristic and antenna efficiency, respectively, that vary with different combinations of the first short-circuit portion 1141 and the second short-circuit portion 1142.

Figure 19B:
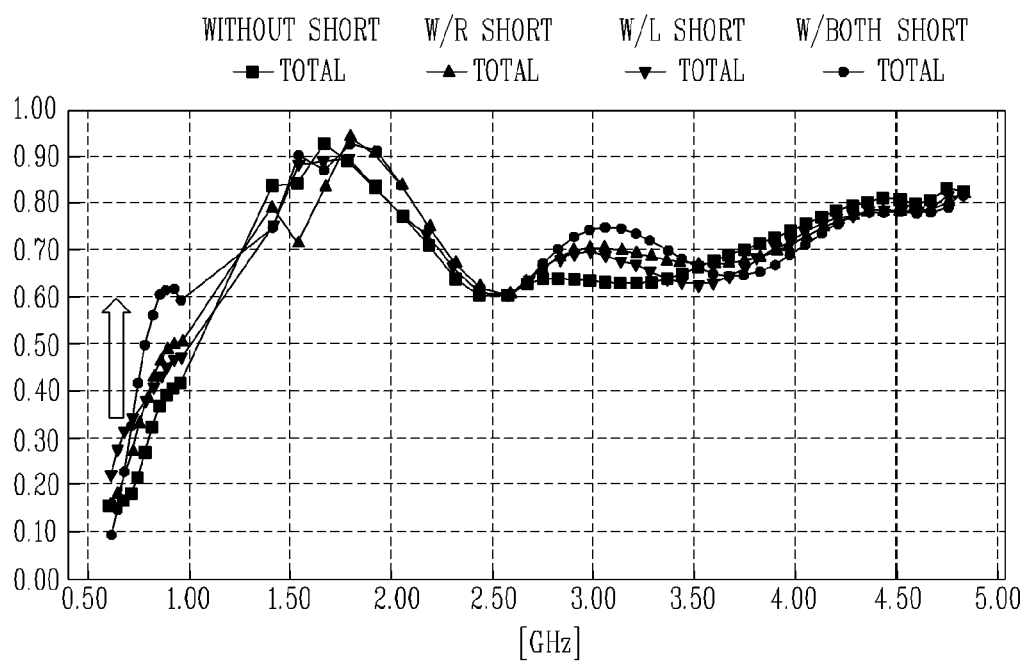

In association with FIGS. 19A and 19B, it may be assumed that the loop antenna 1101 has a width W of 65 mm and a length L of 43 mm. It may be assumed that the length L1 of the first short-circuit portion 1141 of which one end is connected the loop antenna 1101 is 20.5 mm. In addition, it may be assumed that the length R1 of the second short-circuit portion 1142 of which one end is connected to the loop antenna 1101 is 10.0 mm.

The following can be seen from FIG. 19A. (i) The VSWR characteristic deteriorates in a case where the first short-circuit portion 1141 and the second short-circuit portion 1142 are not present, (ii) The VSWR characteristic is more improved in the low band (LB) in a case where only the second short-circuit portion 1142, that is, only R-short is arranged than in the case where the first short-circuit portion 1141 and the second short-circuit portion 1142 are not present. (iii) The VSWR characteristic is more improved in the low band (LB) in a case where only the first short-circuit portion 1141, that is, only L-short is arranged than in the case where the first short-circuit portion 1141 and the second short-circuit portion 1142 are not present. (iv) The VSWR characteristic is most improved in the low band (LB) in a case where the first short-circuit portion 1141 and the second short-circuit portion 1142 are present.

The following can be seen from FIG. 19B. (i) The total efficiency characteristic of the antenna deteriorates in the case where the first short-circuit portion 1141 and the second short-circuit portion 1142 are not present. (ii) The total efficiency characteristic of the antenna is more improved in a case where only the second short-circuit portion 1142, that is, only R-short is arranged than in the case where the first short-circuit portion 1141 and the second short-circuit portion 1142 are not present. (iii) The total efficiency characteristic of the antenna is more improved in a case where only the first short-circuit portion 1141, that is, only L-short is arranged than in the case where the first short-circuit portion 1141 and the second short-circuit portion 1142 are not present. (iv) The total efficiency characteristic is most improved in the low band (LB) in a case where the first short-circuit portion 1141 and the second short-circuit portion 1142 are present.

From FIGS. 17A to 19B, it can be seen that the antenna that is formed with the coupling feed portion, the first and second short-circuit portions 1141 and 1142, an aperture region in the loop antenna 1101, and the branch line 1102 on the loop antenna 1101 operates in the broad band. Therefore, the antenna that is disclosed in the present disclosure may operate, as an antenna, in the low band (LB), the mid band (MB), and the high band (HB). With the branch line 1102 connected to the loop antenna 1101, the antenna ANT (1100) may operate in the broad band. In this regard, with the branch line 1102, the antenna characteristic can be more improved in the low band (LB) due to the branch line 1102 than in a structure that includes only the loop antenna 1101. In this regard, the inclusion of the branch line 1102 can improve the performance of the antenna at a specific frequency in the low band (LB) or can improve a bandwidth characteristic of the antenna in the low band (LB). With the branch line 1102, a length of the antenna can be increased, and thus a characteristic of the antenna in the low band (LB) can be improved. An improvement in the antenna performance due to the branch line 1102 will be described in detail below with reference to FIG. 20.

As described above, the length L1 of the first short-circuit portion 1141 whose one end is connected to the loop antenna and the length R1 of the second short-circuit portion 1142 whose one end is connected to the loop antenna 1101 may be different from each other. The antenna ANT (1100) may be the loop antenna 1101 that is configured to include the loop-shaped metal pattern. The antenna ANT (1100) may include the branch line pattern 1102 that results from at least one portion of the loop antenna 1101 extending.

The coupling feed portion 1110-2 may be electrically connected to the circuit board 1010 and may be configured to radiate a signal toward the aperture region. In this regard, the ground region GND may be arranged on the front surface of the circuit board 1010. The region of the circuit board 1010 that is connected to the coupling feed portion 1110 may be formed as a slot region from which the ground pattern is removed.

The coupling feed portion 1110-2 may be formed in various shapes. In this regard, as illustrated in FIGS. 7A and 7B, the coupling feed portion 1110-2 may be realized in the shape of a semi-circle or rectangle that is printed on the dielectric carrier DC. As illustrated in FIG. 18B, the coupling feed portion 1110-2 that is realized on the dielectric carrier DC may include a first radiation patch 1111-2 and a second radiation patch 1112-2.

The first radiation patch 1111-2 may be arranged on the front surface of the dielectric carrier DC. The first radiation patch 1111-2 may be in the shape of a semi-circle, but is not limited thereto. Therefore, the first radiation patch 1111-2 may be arranged, in the shape of a semi-circle, a rectangle, or a triangle, on the front surface of the dielectric carrier DC. In this regard, the first radiation patch 1111-2 may have the shape of a rectangle, an arbitrary polygon, an ellipse, or an arbitrary closed surface. The second radiation patch 1112-2 may be arranged on the side surface of the dielectric carrier DC and may be configured to be substantially vertically connected to the first radiation patch 1111-2.

Figure 20:
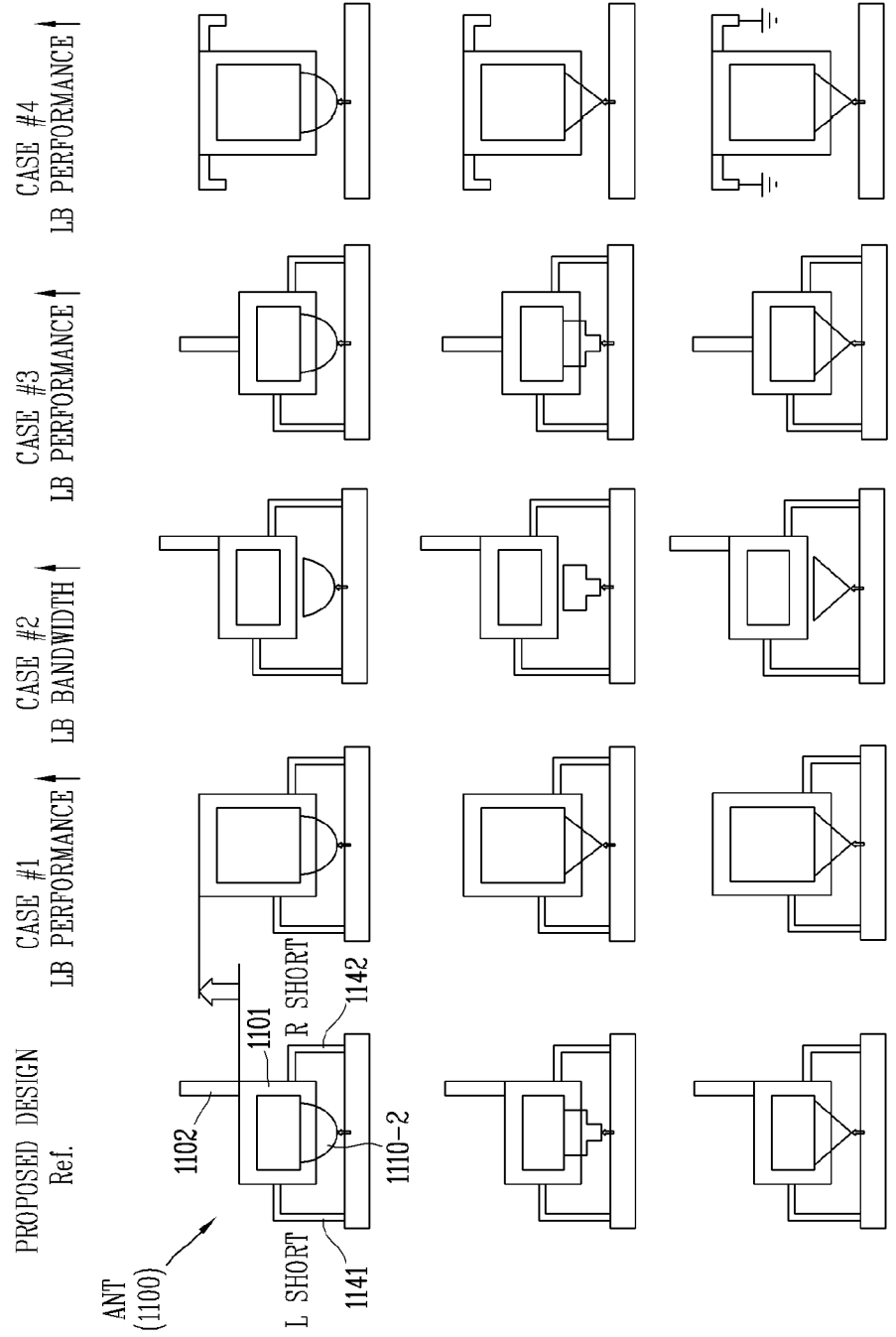
FIG. 20 are views illustrating loop antennas, respectively, in practical examples of the present disclosure in which an antenna characteristic is adjusted by adjusting a shape and a position of a feed structure, a size of a loop antenna, and a position of a short-circuit structure.

In the loop antenna 1101 that is disclosed in the present disclosure, the antenna characteristic may be optimized by adjusting a shape and a position of the feed structure, a size of the loop antenna 1101, and a position of a short-circuit structure. In this regard, FIG. 20 illustrates the loop antennas 1101 in practical examples of the present disclosure in which the antenna characteristic is adjusted by adjusting the shape and the position of the feed structure, the size of the loop antenna 1101, and the position of the short-circuit structure.

With reference to FIGS. 17A to 20, the feed structure may be changed in a proposed design structure for a loop antenna-based antenna system. In this regard, the shape of the coupling feed portion 1110-2 may be changed to a rectangle or a triangle other than a semi-circle.

With reference to Case 1, in order to improve performance in the low band (LB), the size of the loop antenna 1101 may be increased in a lengthwise direction. In this regard, the shape of the coupling feed portion 1110-2 may be changed to a rectangle or a triangle other than a semi-circle.

With reference to Case 2, in order to improve a bandwidth characteristic in the low band (LB), the coupling feed portion 1110-2 may be arranged on the side surface of the dielectric carrier DC. Specifically, in order to improve the bandwidth characteristic of the loop antenna 1101 in the low band (LB), the second radiation patch 1112-2 arranged on the side surface of the dielectric carrier DC may be arranged to be spaced a predetermined distance apart from one of the metal patterns of the loop antenna 1101. In this regard, the shape of the coupling feed portion 1110-2 may be changed to a rectangle or a triangle other than a semi-circle.

With reference to the proposed design structure and Case 3, the coupling feed portion 1110-2 may be connected to the metal pattern of the loop antenna 1101. In order to improve the antenna performance in a specific frequency in the low band (LB), the coupling feed portion 1110-2 that is arranged on the side surface of the dielectric carrier DC may be fastened, by a screw, to one of the metal patterns of the loop antenna 1101. In this regard, in order to improve antennas performance of the loop antenna 1101 at a specific frequency in the low band (LB), the second radiation patch 1112-2 may be fastened, by a screw, to one of the metal patterns of the loop antenna 1101.

With reference to Case 4, the point at which the first short-circuit portion 1141 is connected to the loop antenna 1101 and the point at which the second short-circuit portion 1142 is connected to the loop antenna 1101 may lie on ends, respectively, of the loop antenna 1101. In this regard, in order to improve the antenna performance of the loop antenna 1101 at a specific frequency in the low band (LB), the point at which the first short-circuit portion 1141 is connected to the loop antenna 1101 and the point at which he second short-circuit portion 1142 is connected to the loop antenna 1101 may be determined as lying on the ends, respectively, of the loop antenna 1101.

With the branch line 1102 connected to the loop antenna 1101, the antenna ANT (1100) may operate in the broad ban. In this regard, the antenna characteristic can be more improved in the low band (LB) due to the branch line 1102 than in a structure that includes only the loop antenna 1101. In this regard, the inclusion of the branch line 1102 can improve the antenna performance at a specific frequency in the low band (LB) or can improve the bandwidth characteristic of the antenna in the low band (LB). With the branch line 1102, the length of the antenna can be increased, and thus the characteristic of the antenna in the low band (LB) can be improved. With reference to Case 2, the bandwidth characteristic of the antenna in the low band (LB) can be improved with the branch line 1102 that is offset. In addition, with reference to Case 3, with the symmetrical branch line 1102, the antenna performance can be improved at a specific frequency in the low band (LB).

The branch line pattern 1102 may be provided to or omitted from the loop antenna 1101 that is connected to a plurality of short-circuit portions that are disclosed in the present disclosure. In the proposed design structure, the branch line pattern 1102 may be connected to a second metal pattern facing the metal pattern of the loop antenna 1101 coupled with the coupling feed portion 1110-2.

As an example, the branch line pattern 1102 may be connected to an end portion of the second metal pattern of the loop antenna 1101. With reference to Case 2, in order to improve the bandwidth characteristic in the low band (LB), the branch line pattern 1102 may be connected to the end portion of the second metal pattern of the loop antenna 1101. In order to improve the bandwidth characteristic in the low band (LB), the branch line pattern 1102 may be connected to the end portion of the second metal pattern of the loop antenna 1101, and the coupling feed portion 1110-2 may be arranged under the metal pattern of the loop antenna 1101 to be spaced a predetermined distance away from the metal pattern thereof.

With reference to Case 3, in order to improve the antenna performance of the loop antenna 1101 at a specific frequency in the low band (LB), the branch line pattern 1102 may be connected to a central point of the second metal pattern. In order to improve the antenna performance of the antenna in a specific frequency in the low band (LB), the branch line pattern 1102 may be connected to the central point of the second metal pattern of the loop antenna 1101, and the coupling feed portion 1110-2 may be connected to the metal pattern of the loop antenna 1101.

Figure 21A:
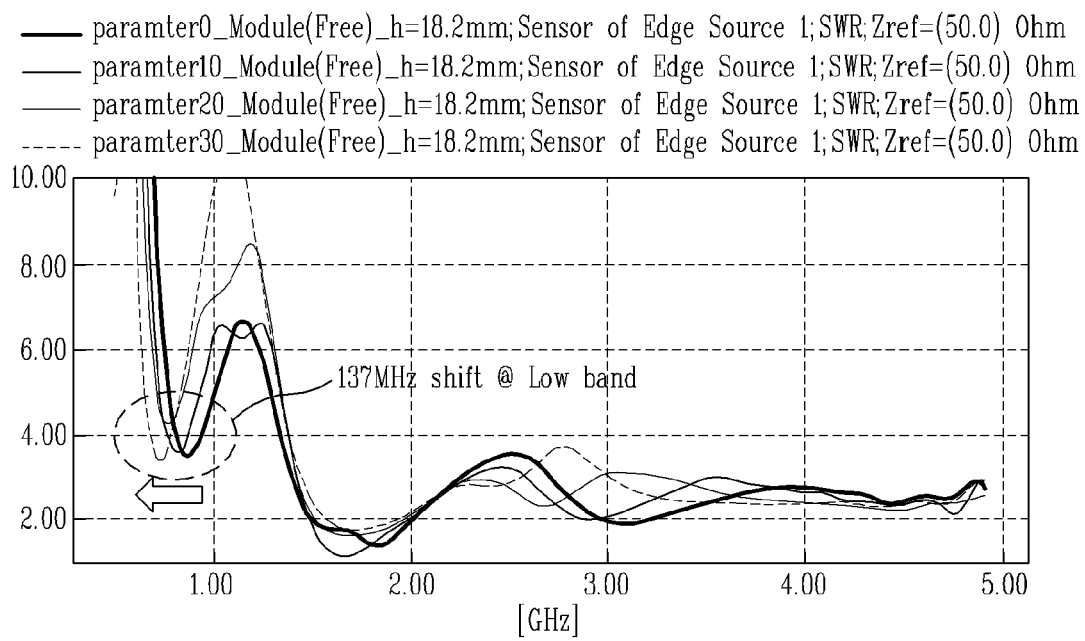
FIGS. 21A and 21B are graphs showing an antenna VSWR characteristic and an antenna efficiency characteristic, respectively, that result from increasing a length of the loop antenna by a predetermined size.
Figure 21B:
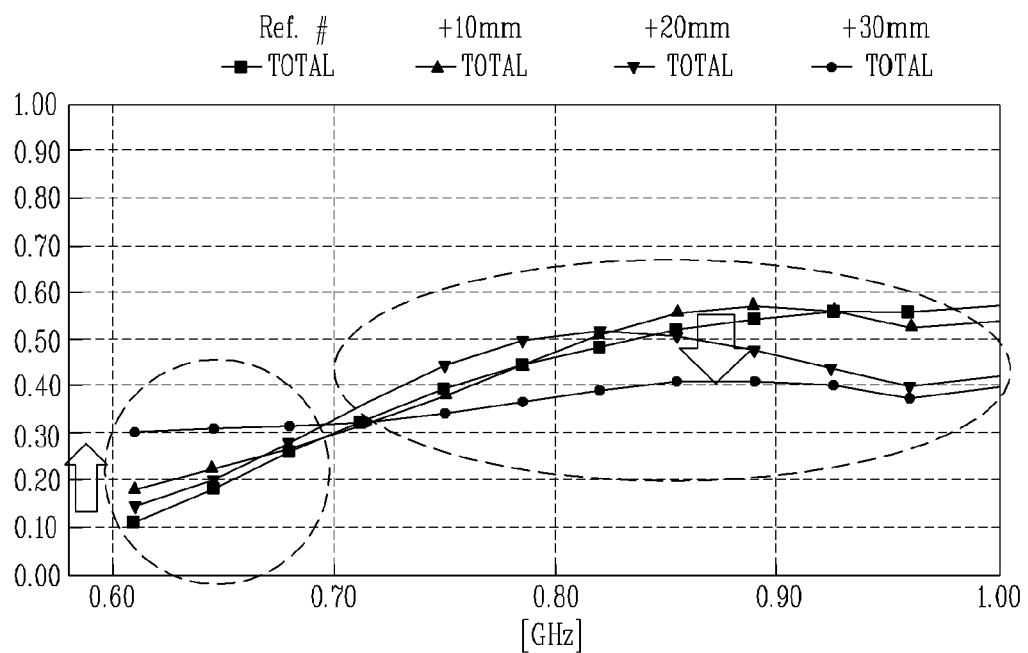

With reference to Case 1, the characteristic in the low band (LB) can be improved by increasing the size of the loop antenna 1101. In this regard, FIGS. 21A and 21B show an antenna VSWR characteristic and antenna efficiency, respectively, that result from increasing a length of the loop antenna 1101 by a predetermined size. In this regard, it may be assumed that the loop antennas 1101 has a width W of 65 mm and a length L of 43 mm. In this regard, with reference to FIGS. 17B, 18B, and 21A, the length L of the loop antenna 1101 may be increased by 10 mm from 43 mm. In this case, the entire length of the antenna ANT (1100) including the loop antenna 1101 and the branch line 1102 may be kept uniform.

From FIG. 21A, it can be seen that the length L of the loop antenna 1101 is increased by 10 mm, and thus a resonance frequency of the loop antenna 1101 is shifted to a low frequency. When the length L of the loop antenna 1101 is increased by 30 mm from 43 mm, the resonance frequency of the loop antenna 1101 is shifted by approximately 137 MHz. With reference to FIGS. 17B, 18B, and 21A, the antenna ANT (1100) including the loop antenna 1101 and the branch line 1102 may be configured in such a manner that the entire thereof is not changed. That is, the loop antenna 1101 may be configured in such a manner that the more increased an area of the loop antenna 1101, the more decreased a length of the branch line 1102. In this case, the more increased the length L of the loop antenna 1101, the more improved the antenna characteristic in the low band (LB). Therefore, the antenna characteristic can be improved at a low frequency, for example, 700 MHz or less, in the low band (LB) by increasing the length of the metal pattern of the loop antenna 1101 without increasing the entire length of the antenna.

In contrast, the antenna characteristic can be improved at a high frequency, for example, more than 700 MHz, in the low band (LB) by increasing the length of the branch line 1102 while maintaining the entire length of the antenna.

With reference to FIG. 21B, when the length L of the loop antenna 1101 in a 600 MHz frequency band is increased by 30 mm from 43 mm, the antenna efficiency can be improved by approximately 20%. However, the antenna efficiency in a band of 800 MHz to 900 MHz may be decreased by approximately 5% to 10%. In this regard, the antenna having a length L that is smaller than a width W of the loop antenna 1101 may be referred to as the first type antenna. The antenna having a length L that is longer than the width W of the loop antenna 1101 may be referred to as the second type antenna.

In this regard, the first type antenna and the second type antenna may be both arranged in the vehicle 500. When a first sub-band of the low band (LB) is assigned, the processor 1400 of the vehicle TCU may perform control in such a manner that a signal is transmitted and received through the second type antenna. In contrast, when a second sub-band of the low band (LB) is assigned, the processor 1400 of the vehicle TCU may perform control in such a manner that a signal is transmitted and received through the first type antenna. At this point, the second sub-band of the low band (LB) may be a broader frequency band than the first sub-band thereof. As an example, when a band of 700 MHz or less is assigned, a signal may be transmitted and received through the second type antenna having a length that is larger by L than the width W of the loop antenna 1101. In contrast, a band of more than 700 MHz is assigned, a signal may be transmitted and received through the first type antenna that is larger by L than the width W of the loop antenna 1101.

Figure 22A:
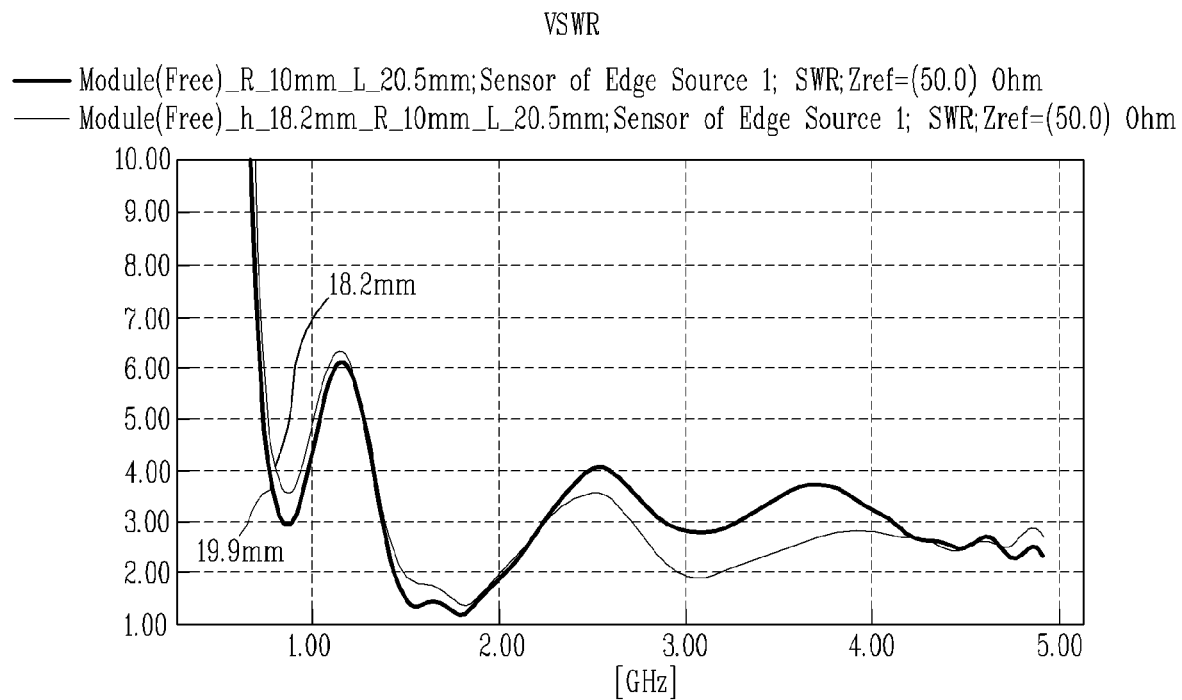
FIGS. 22A and 22B are graphs showing the antenna VSWR characteristic and the antenna efficiency characteristic, respectively, that vary with a change in a height of the coupling feed portion.
Figure 22B:
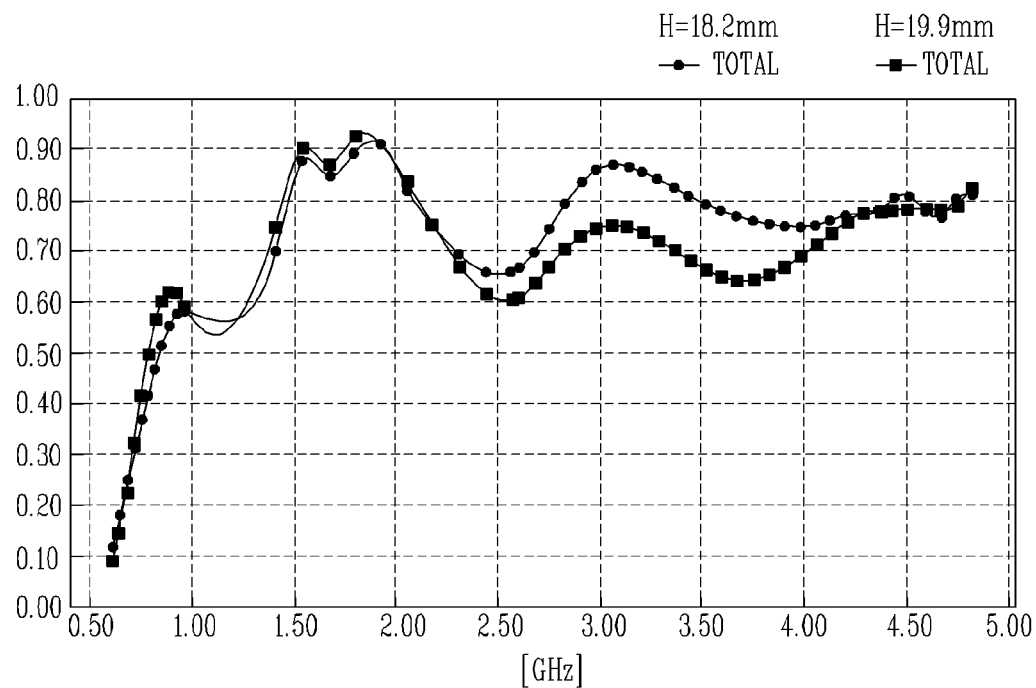

An electrical characteristic of the loop antenna 1101 may be changed by adjusting a height H and a radius R of the coupling feed portion 1110-2 in the loop antenna 1101 that is disclosed in the present disclosure. In this regard, FIGS. 22A and 22B show the antenna VSWR characteristic and the antenna efficiency characteristic, respectively, that vary with a change in a height of the coupling feed portion. With reference to FIGS. 18A, 18B, and 22A, when a height H of the coupling feed portion 1110-2 is changed from 18.2 mm to 19.9 mm, the antenna VSWR characteristic is improved in the low band (LB). However, although the height H of the coupling feed portion 1110-2 is changed from 18.2 mm to 19.9 mm, the bandwidth characteristic is not significantly changed in the low band (LB). When the height H of the coupling feed portion 1110-2 is changed from 18.2 mm to 19.9 mm, the antenna VSWR characteristic somewhat deteriorates in the mid band (MB) and the high band (HB).

With reference to FIGS. 18A, 18B, and 22B, when the height H of the coupling feed portion 1110-2 is changed from 18.2 mm to 19.9 mm, the antenna efficiency characteristic is improved in the low band (LB). When the height H of the coupling feed portion 1110-2 is changed from 18.2 mm to 19.9 mm, the antenna efficiency characteristic is somewhat decreased in the mid band (MD) and the high band (HB).

When the height H of the coupling feed portion 1110-2 is changed from 18.2 mm to 19.9 mm in the loop antenna 1101, the VSWR characteristic and the antenna efficiency characteristic of the loop antenna 1101 each somewhat vary from one band to another. Therefore, the height H of the coupling feed portion 1110-2 in the loop antenna 1101 that is disclosed in the present disclosure may be set to fall within a range of 18.2 mm to 19.9 mm. In this regard, the antenna in which the height H of the coupling feed portion 1110-2 is approximately 18.2 mm may be referred to as the first type antenna. The antenna in which the height H of the coupling feed portion 1110-2 is approximately 19.9 mm may be referred to as the second type antenna.

In this regard, the first type antenna and the second type antenna may be both arranged in the vehicle 500. When the low band (LB) is assigned, the processor 1400 of the vehicle TCU may perform control in such a manner that a signal is transmitted and received through the second type antenna. In contrast, when the mid band (MB), the high band (HB), or the 5G Sub-6-band is assigned, the processor 1400 of the vehicle TCU may perform control in such a manner that a signal is transmitted and received through the first type antenna.

Figure 23A:
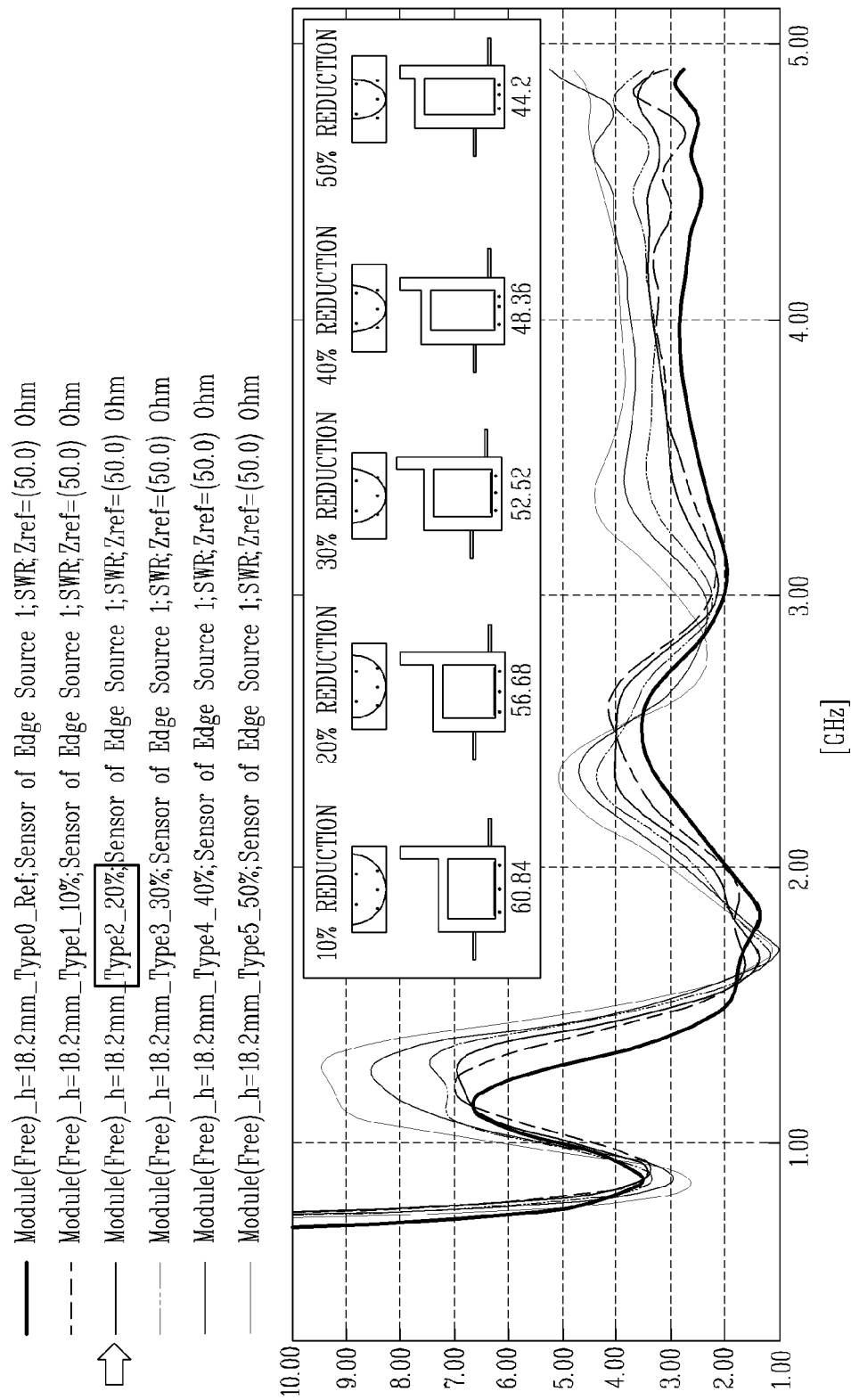
FIG. 23A is a graph showing the antenna VSWR characteristic that changes when a width of the loop antenna is decreased by a predetermined ratio.
Figure 23B:
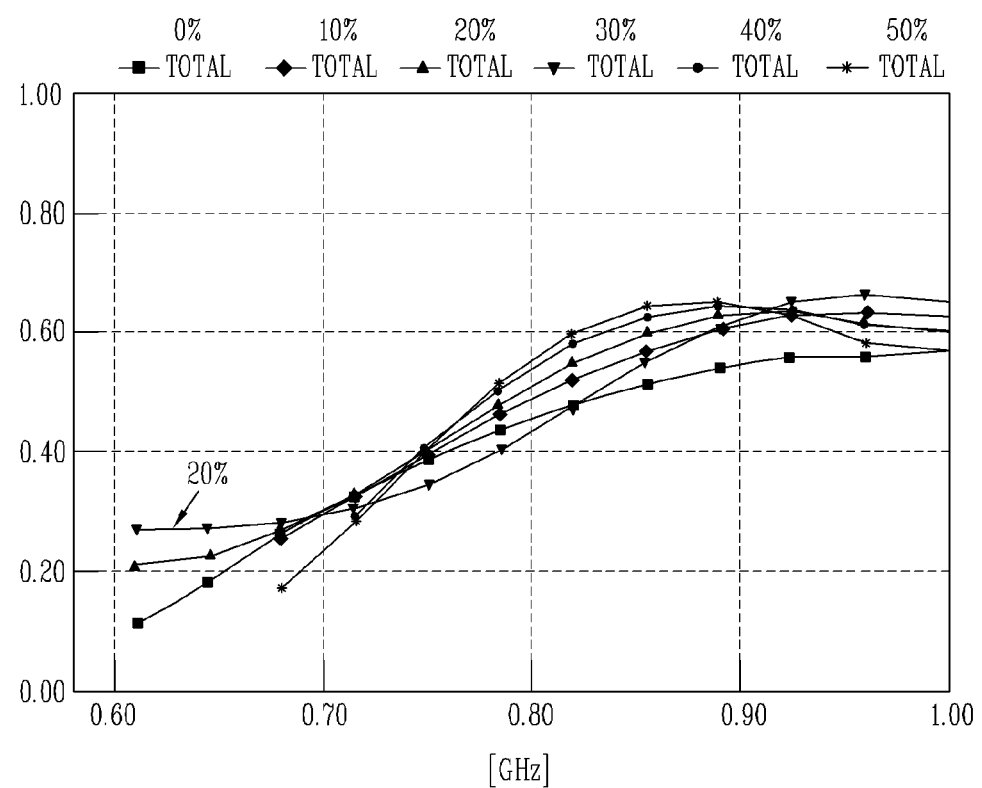
FIG. 23B is a graph showing the antenna efficiency in the low band (LB) that changes when the width of the loop antenna is decreased by the predetermined ratio.

The antenna performance is described below that changes while a width W of the loop antenna 1101 that is disclosed in the present disclosure is decreased by a predetermined ratio. In this regard, FIG. 23A shows the antenna VSWR characteristic that changes when the width W of the loop antenna 1101 is decreased by the predetermined ratio. FIG. 23B shows the antenna efficiency in the low band (LB) that changes when the width W of the loop antenna 1101 is decreased by the predetermined ratio.

With reference to FIGS. 18A, 18B, and 23A, the width W of the loop antenna 1101 may be decreased by approximately 10%. In this regard, the width W of the loop antenna 1101 may be decreased from 65 mm to 60.84 mm, 56.68 mm, 52.52 mm, 48.36 mm, and 44.2 mm. As the width W of the loop antenna 1101 is decreased, an area of the coupling feed portion 1110-2 may be decremented by 10%. The antenna VSWR characteristic that varies with a decrease in the width W of the loop antenna 1101 is as illustrated in FIG. 22A. With reference to FIG. 22A, an antenna corresponding to Type 2 has the most excellent VSSR characteristic in the low band (LB). A type 2 antenna corresponding to Type 2 is most advantageous when considering the VSWR characteristic in the low band (LB) in terms of antennas minimization. At this point, the type 2 antenna is the loop antenna 1101 of which the width W is decreased from 65 mm to approximately 56.68 mm.

With reference to FIGS. 18A, 18B, and 23B, the type 2 antenna has the highest antenna efficiency characteristic in the low band (LB). In this regard, the width W of the loop antenna 1101, as illustrated in FIG. 23A, may be decreased from 65 mm to 60.84 mm, 56.68 mm, 52.52 mm, 48.36 mm, and 44.2 mm. The loop antenna 1101, when having a width W of 56.68 (20% feeder area reduction) in the low band (LB) of 700 of MHz or less, has the highest antenna efficiency. Therefore, the width W of the loop antenna 1101 that is disclosed in the present disclosure may be set to fall within a range of 65.0 mm to 56.68 mm. In this regard, the loop antenna 1101, disclosed in the present disclosure, that has a width W of approximately 65.0 mm may be referred to as the first type antenna. The loop antenna 1101 that has a width W of approximately 56.68 mm may be referred to as the second type antenna. In this case, the widths W of the loop antennas 1101 in the first and second type antennas are not limited to the above-mentioned values. In order to improve the antenna efficiency in the low band (LB), an arbitrary loop antenna structure in which the width W of the loop antenna 1101 is decreased may be referred to as the second type antenna.

In this regard, the first type antenna and the second type antenna may be both arranged in the vehicle 500. When the first sub-band of the low band (LB) is assigned, the processor 1400 of the vehicle TCU may perform control in such a manner that a signal is transmitted and received through the second type antenna. In contrast, when the second sub-band of the low band (LB) is assigned, the processor 1400 of the vehicle TCU may perform control in such a manner that a signal is transmitted and received through the first type antenna. At this point, the second sub-band of the low band (LB) may be a broader frequency band than the first sub-band thereof. As an example, when a band of 700 MHz or less is assigned, a signal may be transmitted and received through the second type antenna in which the width W of the loop antenna 1101 is decreased. In contrast, when a band of more than 700 MHz is assigned, a signal may be transmitted and received through the first type antenna in which the loop antenna 1101 of the width W is increased.

Figure 24A:
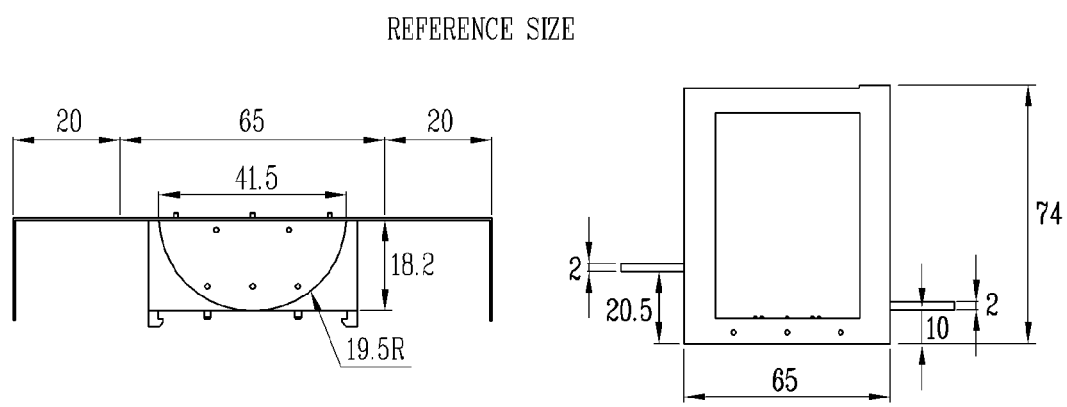
FIG. 24A is a view illustrating a loop antenna structure in which a width of a short-circuit metal pattern is changed.
Figure 24A:
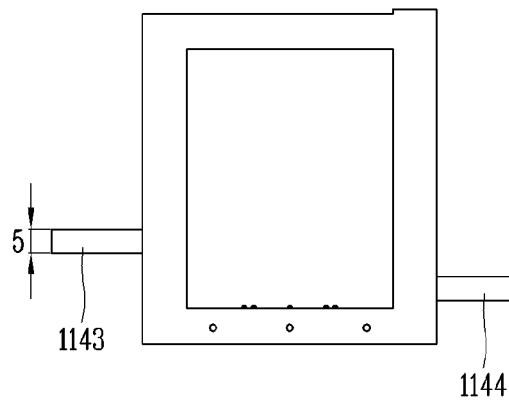
Figure 24A:
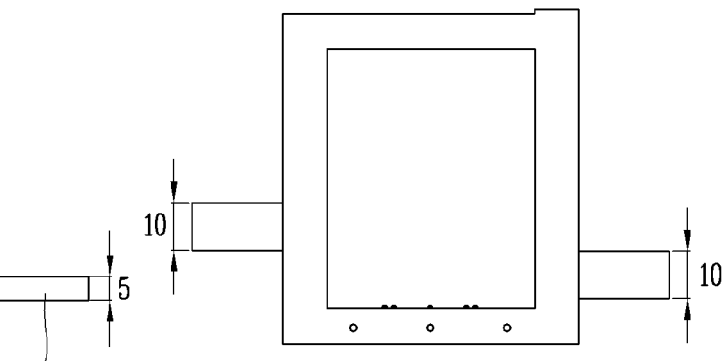
Figure 24B:
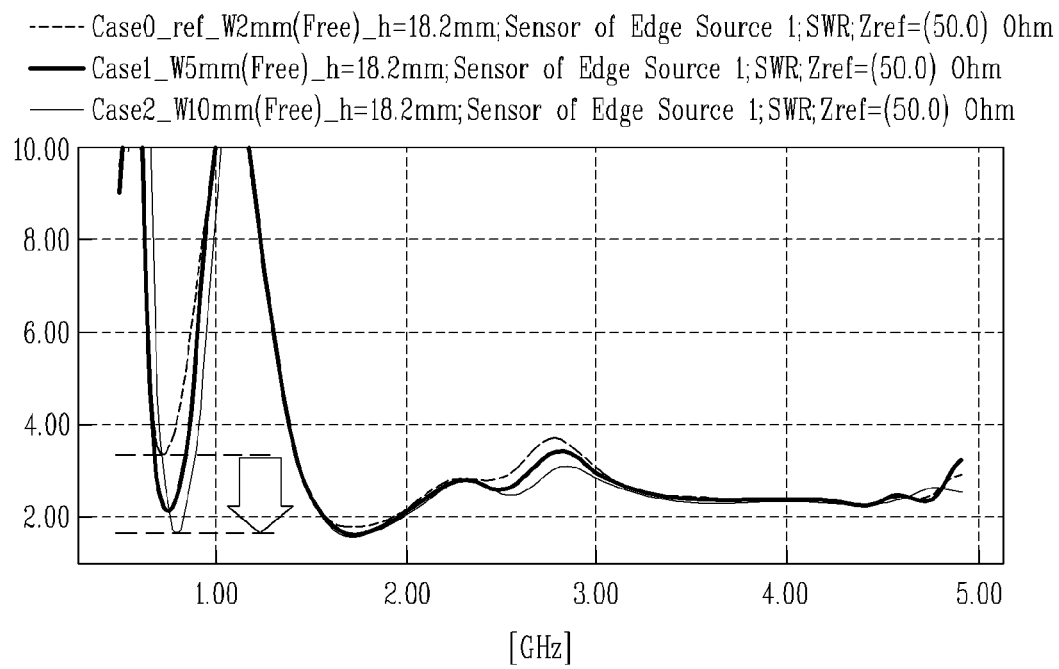
FIG. 24B is a graph showing the antenna VSWR characteristic that varies with the change in the width of the short-circuit metal pattern.
Figure 24C:
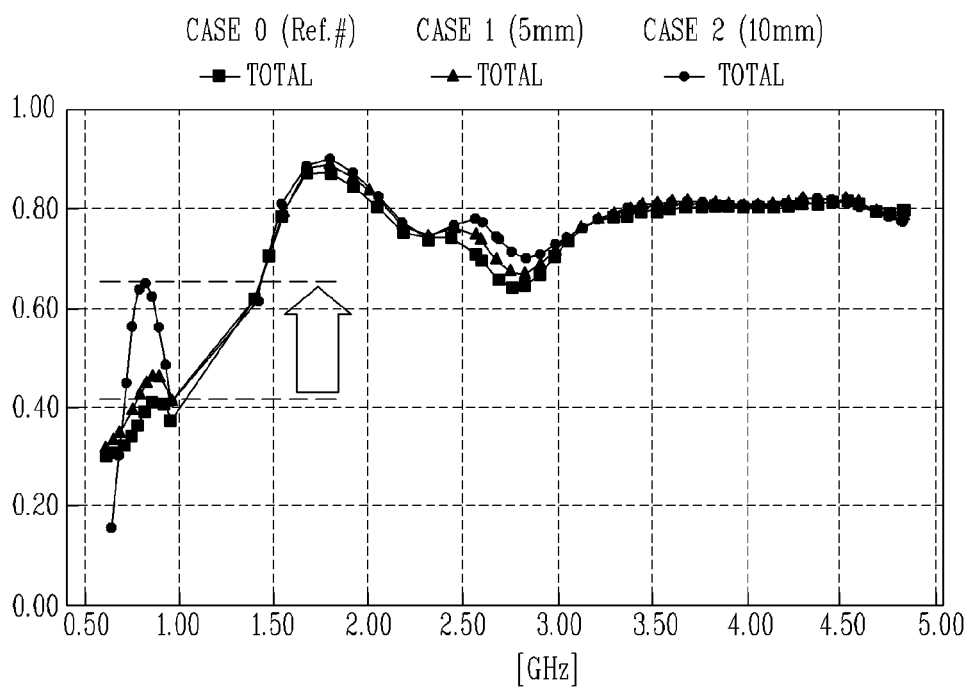
FIG. 24C is a graph showing the antenna efficiency characteristic that varies with the change in the width of the short-circuit metal pattern.

The antenna characteristic of the loop antenna 1101 that is disclosed in the present disclosure may be optimized by adjusting a width of a short-circuit metal pattern that is connected to the first and second short-circuit metal portions 1141 and 1142. In this regard, FIG. 24A illustrates a loop antenna structure in which the width of the short-circuit metal pattern is changed. FIG. 24B shows the antenna VSWR characteristic that varies with the change in the width of the short-circuit metal pattern. FIG. 24C shows the antenna efficiency characteristic that varies with the change in the width of the short-circuit metal pattern.

With reference to FIGS. 18A, 18B, and 24A, the widths of the short-circuit metal patterns 1143 and 1144 of the loop pattern 1101 are variable to 2 mm, 5 mm, or 10 mm.

With reference to FIG. 24B, when the width of the short-circuit metal pattern is changed from 2 mm to 10 mm, a value of an antenna VSWR in the low band (LB) is decreased from 3 or greater to 2 or smaller. Accordingly, the antenna VSWR characteristic is improved. With reference to FIG. 24C, when the width of the short-circuit metal pattern is changed from 2 mm to 10 mm, a value of the antenna efficiency in the low band (LB) is increased from 40% or less to approximately 65%. Accordingly, the antenna efficiency characteristic is improved. In this regard, the antenna VSWR characteristic and a gain characteristic in the low band (LB) can be improved without the change in the bandwidth characteristic by increasing the widths of the short-circuit metal patterns 1143 and the 1144 of the loop antenna 1101. However, when the widths of the short-circuit metal patterns 1143 and 1144 are increased by more than 10 mm, an electric field component in the width direction may be increased, and thus a resonance frequency may be changed. As an example, when the widths of the short-circuit metal patterns 1143 and 1144 are increased by more than 10 mm, an effective length of the antenna may be increased, and thus the resonance frequency may be decreased.

Likewise, the technical features mentioned above also apply to the antenna VSWR characteristic and the gain characteristic in terms of the metal pattern of the loop antenna 1101 and in the low band (LB). Therefore, when the width of the metal pattern of the loop antenna 1101 is increased from 2 mm to 10 mm, the antenna VSWR characteristics and the gain characteristic can be improved in the low band (LB). However, when the width of the loop antenna 1101 is increased by more than 10 mm, the electric field component in the width direction may be increased, and thus the resonance frequency may be changed. As an example, when the width of the metal pattern of the loop antenna 1101 is increased by more than 10 mm, the effective length of the antenna may be increased, and thus the resonance frequency may be decreased.

Figure 25A:
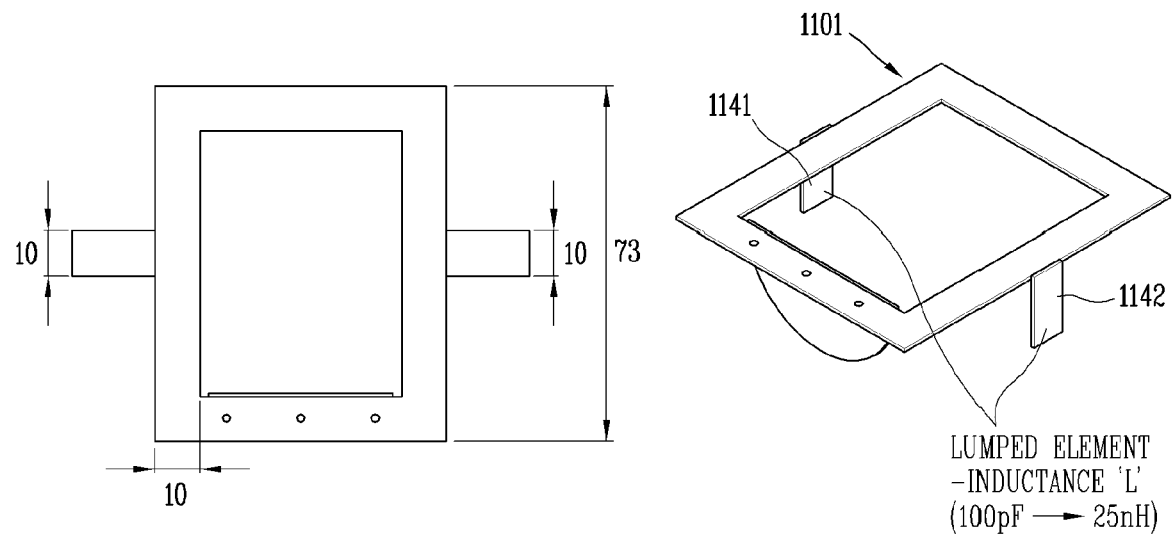
FIG. 25A is a view illustrating a configuration in which end portions of the first and second short-circuit portions are connected to the ground through a matching circuit made up of an inductor and a capacitor.
Figure 25A:
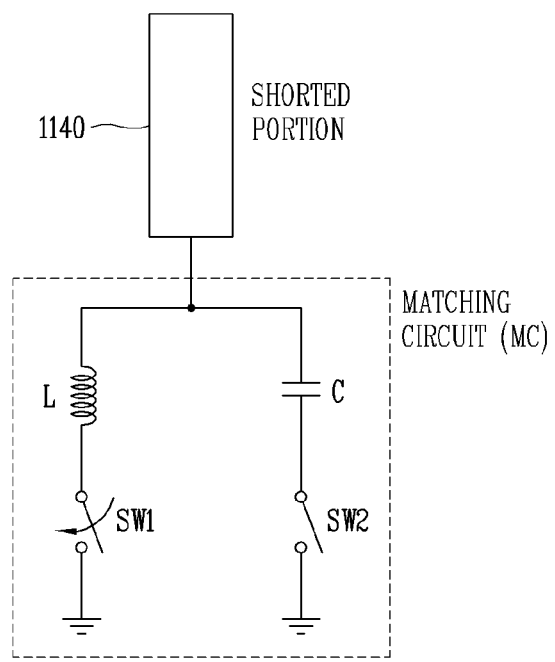
Figure 25B:
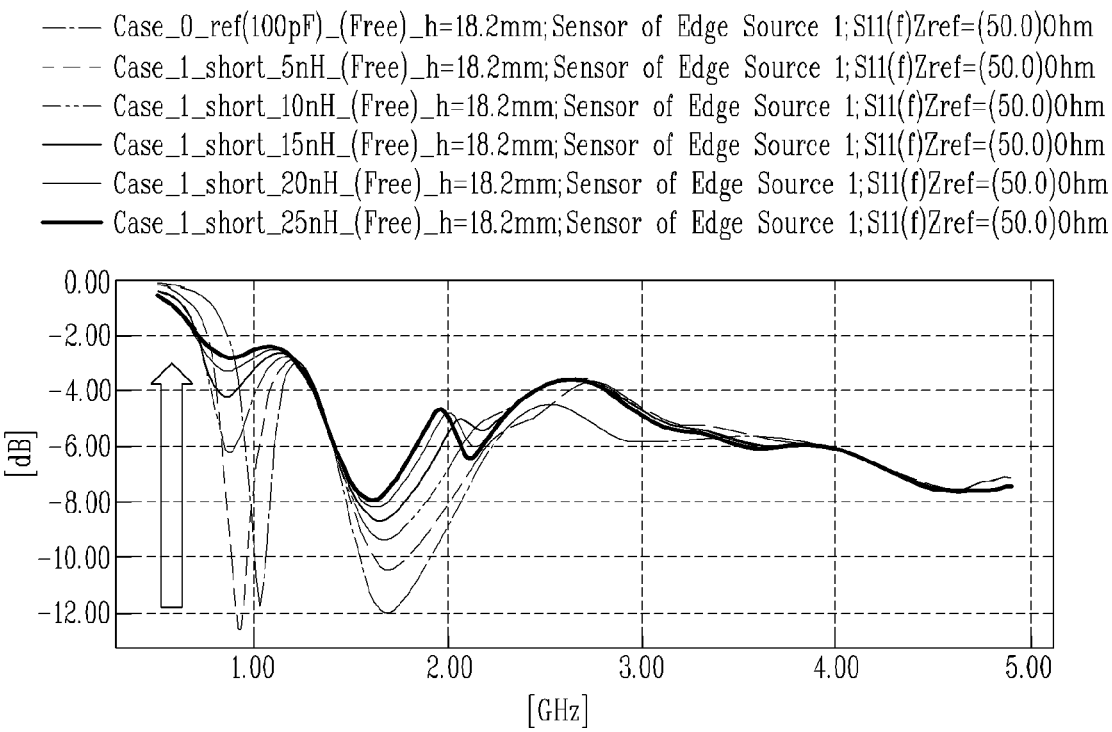
FIG. 25B is a view illustrating a value of an antenna VSWR that varies with a change in a capacitance or inductance value.
Figure 25C:
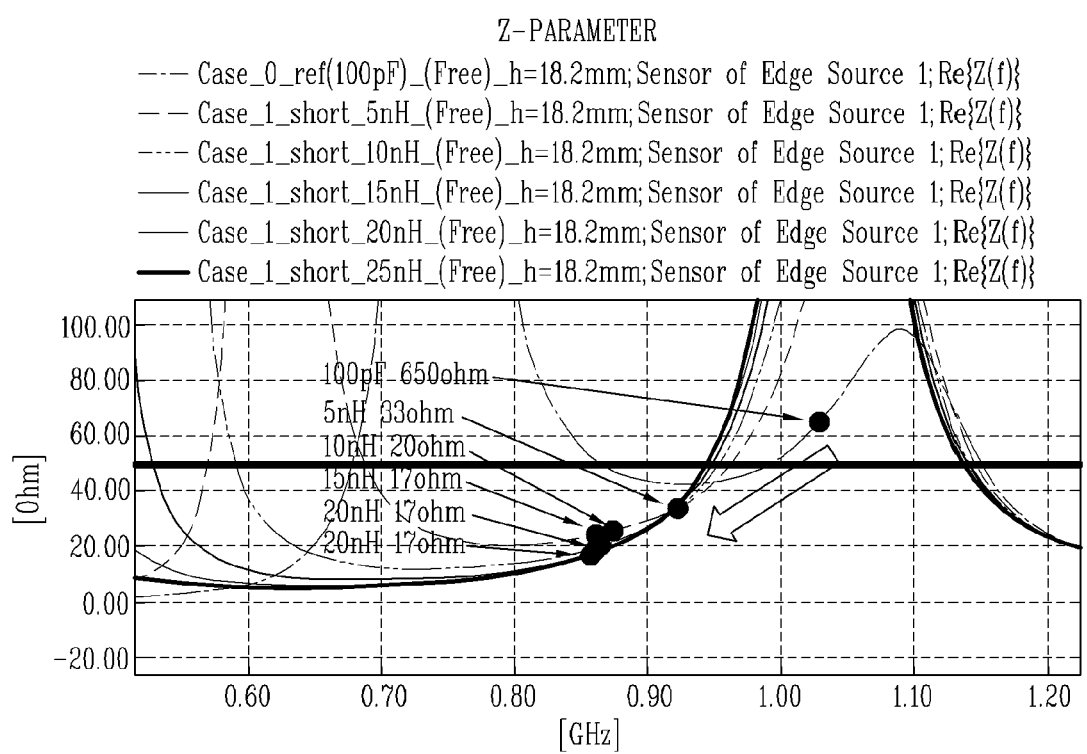
FIG. 25C is a view illustrating an antenna impedance characteristic that varies with the change in the capacitance or inductance value.

The first and second short-circuit portions 1141 and 1142 of the loop antenna 1101 that is disclosed in the present disclosure may be connected to the ground through a matching circuit made up of an inductor and a capacitor. In this regard, FIG. 25A illustrates a structure of the loop antenna 1101 and a configuration in which end portions of the first and second short-circuit portions 1141 and 1142 are connected to the ground through the matching circuit made up of the inductor and the capacitor. FIG. 25B illustrates the value of the antenna VSWR that varies with a change in a capacitance or inductance value. FIG. 25C is a view illustrating an antenna impedance characteristic that varies with the change in the capacitance or inductance value.

With reference to FIGS. 18A, 18B, and 25B, the end portions of the first short-circuit portion 1141 and the second short-circuit portion 1142 may be connected to the ground region GND of the circuit board 1010 through a matching circuit MC made up of an inductor L and a capacitor C. In this regard, the matching circuit MC may be controlled in such a manner that the ground region GND is connected to the inductor L or the capacitor C. As an example, a capacitance value may be 100 pF in the matching circuit MC made up of the inductor L and the capacitor C. As an example, an inductance value may be one of 5 nH, 10 nH, 15 nH, 20 nH, and 25 nH in the matching circuit MC made up of the inductor L and the capacitor C. In this regard, the impedance matching through the matching circuit MC made up of the inductor L and the capacitor C is not limited only to the loop antenna structure having the metal pattern. Therefore, the impedance matching through the matching circuit MC made up of the inductor L and the capacitor C may also be performed in the antenna system made up of the heat sink in FIGS. 5A to 16B.

With reference to FIG. 25B, in a case where the capacitance value is 100 pF, the resonance frequency may be set to 1 GHz or more, and thus the characteristic of the loop antenna 1101 in the low band (LB) may deteriorate. When the inductance value is changed to 5 nH or 10 nH, the resonance frequency may be changed to a narrower band of 1 GHz or less, and thus the characteristic of the loop antenna 1101 in the low band (LB) can be improved.

With reference to FIG. 25C, as the inductance value is increased to 15 nH, 20 nH, and 25 nH, the impedance value is decreased to 50 ohm or less. Accordingly, as illustrated in FIG. 25B, the inductance value is increased to 15 nH, 20 nH, and 25 nH, the value of the antenna VSWR at the resonance frequency is increased.

Therefore, in the antenna system that is disclosed in the present disclosure, the antenna bandwidth characteristic may be optimized through the matching circuit MC made up of a variable inductor L and a variable capacitor C. In addition, the antenna bandwidth characteristic may be optimized through the matching circuit MC made up of the inductor L or the capacitor C and through switches SW1 and SW2. As an example, when the switch W2 connected to the capacitor C is in a turned-on state, the loop antenna 1101 may operate as the first type antenna that operates in the first sub-band of the low band (LB). When the switch W1 connected to the inductor L is in a turned-on state, the antenna may operate as the second type antenna that operates in the second sub-band of the low band (LB).

In this regard, the first type antenna and the second type antenna may be both arranged in the vehicle 500. When the first sub-band of the low band (LB) is assigned, the processor 1400 of the vehicle TCU may perform control in such a manner that a signal is transmitted and received through the first type antenna. In contrast, when the second sub-band of the low band (LB) is assigned, the processor 1400 of the vehicle TCU may perform control in such a manner that a signal is transmitted and received through the second type antenna. At this point, the second sub-band of the low band (LB) may be a broader frequency band than the first sub-band thereof.

Figure 26A:
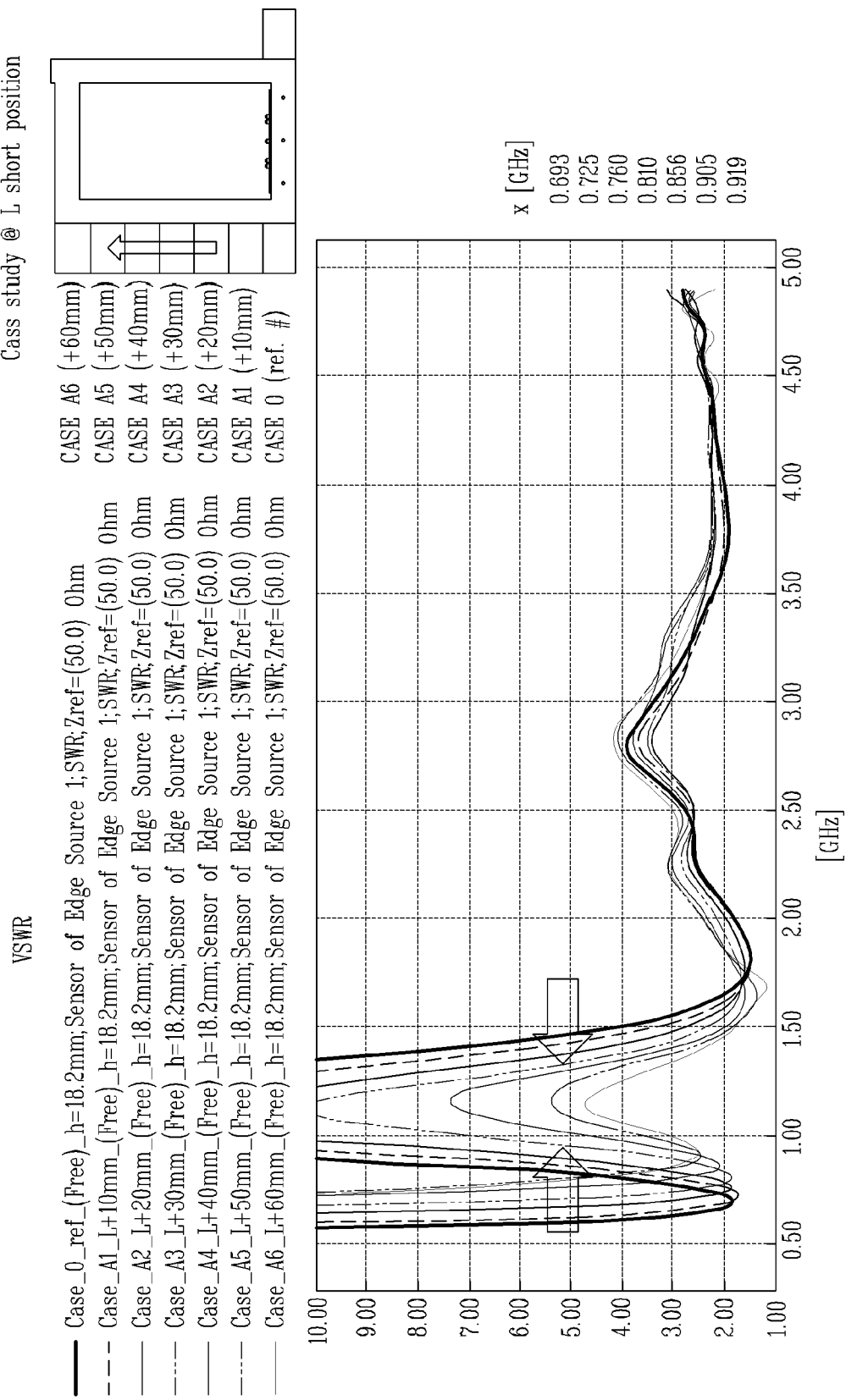
FIG. 26A is a graph showing that a resonance frequency is changed in a case where a left-side short-circuit metal pattern is positioned to be spaced a predetermined distance away from the coupling feed portion.

In the antenna that is disclosed in the present disclosure, the resonance frequency may be adjusted by adjusting a position of the short-circuit metal pattern. In this regard, FIG. 26A shows that the resonance frequency is changed in a case where a left-side short-circuit metal pattern is positioned to be spaced a predetermined distance away from the coupling feed portion. FIG. 26B shows that the resonance frequency is changed in a case where a right-side short-circuit metal pattern is positioned to be spaced a predetermined distance away from the coupling feed portion.

With reference to FIG. 26A, as in Cases 1 to 6, when the position of the left-side short-circuit metal pattern 1143 is offset, the resonance frequency may be shifted from the low band (LB) to an upper band. As an example, the short-circuit metal pattern 1143 may be arranged in such a manner that the position thereof is offset by an increment of 10 mm from the metal pattern in which the coupling feed portion is arranged. When the position of the short-circuit metal pattern 1143 is offset by an increment of 10 mm, a frequency in the low band (LB) is shifted to an upper band by an increment of 40 MHz to 50 MHz.

With reference to FIG. 26B, as in Cases 1 to 6, when the position of the right-side short-circuit metal pattern 1144 is offset, the resonance frequency may be shifted from the low band (LB) to an upper band. As an example, the short-circuit metal pattern 1144 may be arranged in such a manner that the position thereof is offset by an increment of 10 mm from the metal pattern in which the coupling feed potion is arranged. When the position of the short-circuit metal pattern 1144 is offset by an increment of 10 mm, a frequency in the low band (LB) is shifted to an upper band by an increment of approximately 20 MHz to 50 MHz.

Regarding the positions at which the short-circuit metal patterns 1143 and 1144 are arranged, as illustrated in Case 4 in FIG. 20, in order to shift the resonance frequency in the low band (LB) to an upper band, the first and second short-circuit portions 1141 and 1142 may be arranged in such a manner that the positions thereof are offset from the coupling feed portion 1110-2. In contrast, in order to shift the resonance in the low band (LB) to a lower band, the first and second short-circuit portions 1141 and 1142 may be arranged in such a manner that the positions thereof are adjacent to the coupling feed portion 1110-2. As an example, the short-circuit metal pattern 1144 may be arranged in such a manner that the position thereof is not offset from the metal pattern in which the coupling feed portion 1110-2.

It would be understandable to a person of ordinary skill in the art that various modifications and alterations are possibly made to the embodiments of the antenna system within the scope of the technical idea of the present disclosure. Therefore, it should be understood that these various modifications and alterations fall within the scope of the present disclosure that are defined in the following claims.

Figure 27:
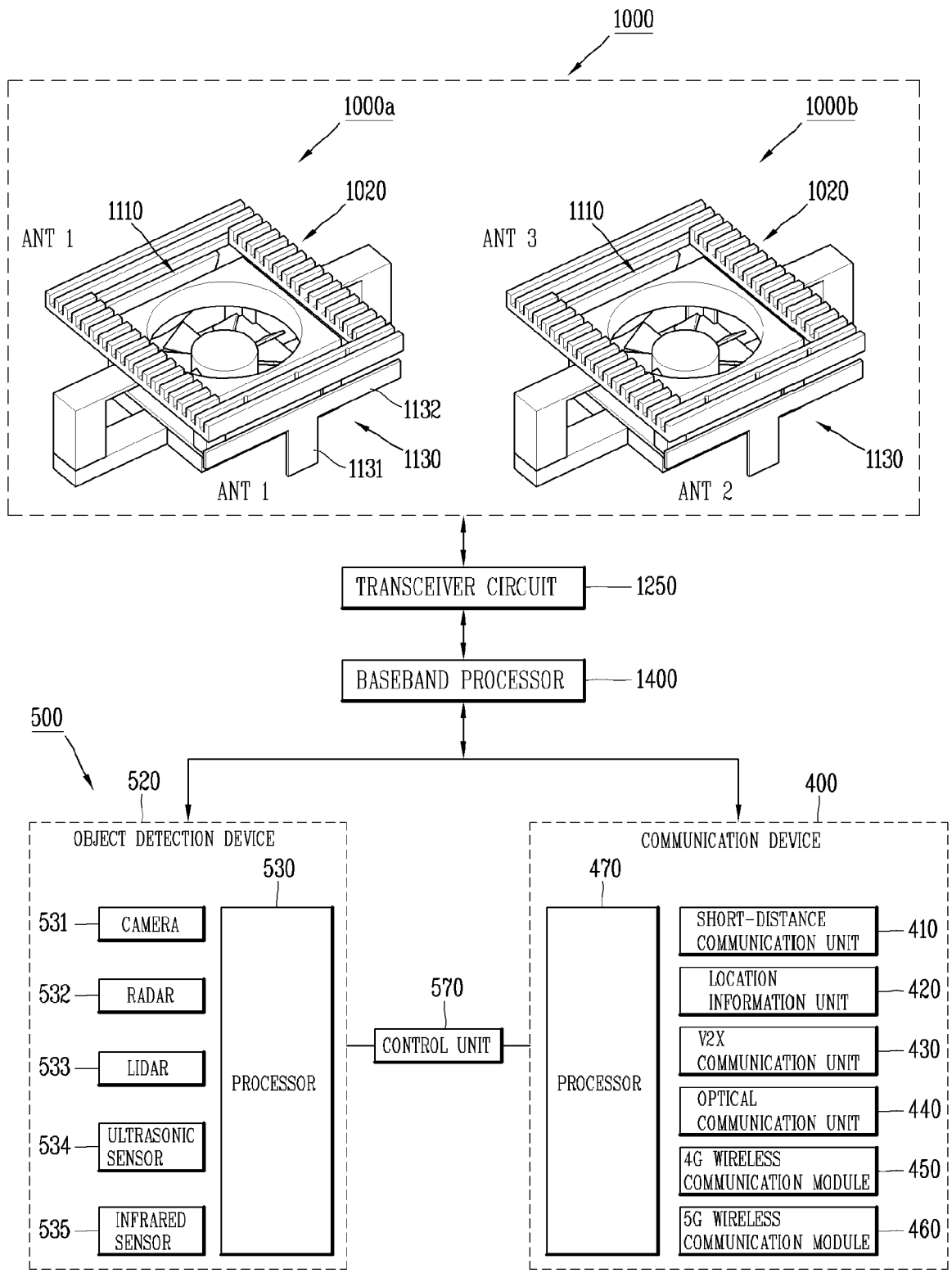
FIG. 27 is a view illustrating a configuration an antenna system according to an embodiment of the present disclosure and a configuration of a vehicle in which the antenna system is mounted.

FIG. 27 illustrates a configuration of an antenna system according to an embodiment of the present disclosure and a configuration of a vehicle in which the antenna system is mounted. With reference to FIG. 27, the broadband antenna system 1000 is mounted in the vehicle, and the broadband antenna system 1000 may perform short-range communication, wireless communication, and V2X communication, and the like, independently or through the communication device 400. To this end, a baseband processor 1400 may perform control in such a manner that, through the antenna system 1000, a signal is received from a nearby vehicle, an RSU, a nearby object, and a base station or is transmitted to them.

Alternatively, the baseband processor 1400 may perform control such that, through the communication device 400, a signal is received from the nearby vehicle, the RSU, the nearby object, and the base station or is transmitted to them. At this point, information on the nearby object may be acquired through the object detection device 520, such as the camera 531, a radar 532, a lidar 533, and sensors 534 and 535 of the vehicle 500. Alternatively, the baseband processor 1400 may control the communication device 400 and the antenna system 1000 such that a signal is received from or transmitted to the nearby vehicle, the RSU, the nearby object, and the base station.

With reference to FIGS. 1A to 16B, and 27, the vehicle 500 that includes the antenna system 1000 may include a plurality of antennas 1100, the transceiver circuit 1250, and the baseband processor 1400. The vehicle 500 may further include the object detection device 520. In addition, the vehicle 500 may further include the communication device 400. In this case, the communication device 400 may be configured to perform wireless communication through the antenna unit.

In this regard, the vehicle 500 may include the antenna system 1000. The antenna system 1000 may be configured to include the circuit board 1010, the heat sink 1020, and the coupling feed portion 1110. The antenna system 1000 may further include the coupling ground portion 1120. In addition, the antenna system 1000 may be configured to include the coupling feed portion 1110 and the second coupling feed portion 1120. The antenna system 1000 may further include the transceiver circuit 1250 and the processor 1400.

The circuit board 1010 may be arranged on the metal frame on the roof of the vehicle 500 or on the metal frame inside the roof frame, and various electronic components may be arranged on the circuit board 1010. The heat sink 1020 may include the aperture region over the circuit board 1010 and may be configured to be fixed to the circuit board 1010, with the fixation portion 1025 in between. At this point, the fixation portion 1025 may be configured to connect the heat sink 1020 and the lower heat sink 1030 to each other.

The coupling feed portion 1110 may be configured to be electrically connected to the circuit board 1010 and to radiate a signal to the aperture region in the heat sink 1020. In this regard, the ground region GND may be arranged on the front surface of the circuit board 1010. The region of the circuit board 1010 that is connected to the coupling feed portion 1110 may be formed as the slot region SR from which the ground pattern is removed.

The second coupling feed portion 1130 may be arranged to be coupled with the second conductive member facing the conductive member of the heat sink 1020 on which the coupling feed portion 1110 is arranged. With the coupling feed portion 1110 and the second coupling feed portion 1130, the antenna system 1000 may operate as the first antenna ANT1 and the second antenna ANT2. Therefore, Multi-Input Multi-Output (MIMO) may be performed through the antenna system 1000 corresponding to one antenna unit.

The transceiver circuit 1250 may be operatively combined with the coupling feed portion 1110. The processor 1400 may be operatively combined with the transceiver circuit 1250. The processor 1400 may be a baseband processor corresponding to a modem, but is not limited thereto. The processor 1400 may be an arbitrary processor that controls the transceiver circuit 1250. The antenna system 1000 may operate, as a single antenna, by the coupling feed portion 1110 and the coupling ground portion 1120.

The transceiver circuit 1250 may be operatively combined with the coupling feed portion 1110 and may be configured to control the signal that is transferred to the coupling feed portion 1110 through the feeding pattern. The transceiver circuit 1250 may include the front end module (FEM), such as the electric power amplifier or the reception amplifier. As another example, the front end module (FEM) may be arranged between the transceiver circuit 1250 and the antenna, separately from the transceiver circuit 1250. The transceiver circuit 1250 may control a magnitude and/or a phase of a signal that is transferred to the coupling feed portion 1110, by adjusting the gain or the input or output electric power of the electric power amplifier or the reception amplifier. At this point, as described above, the feeding pattern may be arranged on the rear surface of the circuit board 1010, but is not limited thereto.

The processor 1400 may be operatively combined with the transceiver circuit 1250 and may be configured to control the transceiver circuit 1250. The processor 1400 may control the magnitude and/or the phase of the signal that is transferred to the coupling feed portion 1110, by controlling the transceiver circuit 1250. The processor 1400 may be configured to communicate with at least one of the nearby vehicle, the road side unit (RSU), and the base station through the transceiver circuit 1250.

In a case where, for autonomous driving or the like, there is a need to simultaneously receive or transmit information from and to various entities, such as the nearby vehicle, the RSU, and the base station, the information may be received or transmitted through Multi-Input Multi-Output (MIMO). Therefore, the vehicle 500 may simultaneously receive different information from the various entities and thus can improve its communication capacity. Accordingly, in the vehicle 500, the communication capacity can be improved through the MIMO operation without increasing a bandwidth.

Alternatively, the vehicle 500 may simultaneously receive the same information from the various entities. Thus, the vehicle 500 can improve reliability of the information on the surroundings of the vehicle 500 and may decrease latency. Accordingly, Ultra-reliable Low Latency Communication (URLLC) is possible in the vehicle 500. The vehicle 500 may operate as a URLLC UE. To this end, the base station that performs scheduling may preferentially allocate a time slot to the vehicle 500 that operates as the URLLC UE. To this end, puncturing may be performed on one portion of a specific time-frequency resource already allocated to a different UE.

A plurality of the antenna systems that are disclosed in the present disclosure may be included. Thus, Multi-Input Multi-Output (MIMO) may be improved, or Multi-Input Multi-Output (MIMO) capacity may be increased. As an example, the antenna system 1000 in FIG. 27 may include a first antenna system 1000a and a second antenna system 1000b. In this regard, the first antenna system 1000a and the second antenna system 1000b may be configured to be separated from each other or may be optimally arranged inside one heat sink 1020. In a case where the first antenna system 1000a and the second antenna system 1000b are arranged to be separated from each other, they may be arranged in the same region or in different regions. The first antenna system 1000a and the second antenna system 1000b may be both arranged inside the roof frame. Alternatively, the first antenna system 1000a and the second antenna system 1000b may be both arranged on top of the roof of the vehicle 500. Alternatively, one of the first antenna system 1000a and the second antenna system 1000b may be arranged inside the roof frame, and the other may be arranged on top of the roof of the vehicle 500.

The antenna system that is disclosed in the present disclosure is not limited thereto, and one antenna system may operate as one antenna. The antenna system 1000 is hereinafter described below on the assumption that one system includes a plurality of antennas. The first antenna system 1000a may be configured to include the first antenna ANT1 and the second antenna ANT2. The second antenna system 1000b may be configured to include a third antenna ANT3 and a fourth antenna ANT4.

The plurality of antennas (the antennas ANT1 to ANT4) inside the antenna system 1000 may operate in all bands, that is, the low band (LB), the mid band (MB), and the high band (HB). At this point, the low band (LB) may be referred to as a first (frequency) band, and the mid band (MB) and the high band (HB) may be referred to as a second (frequency) band. As another example, in a case where the antenna system 1000 operates in the mid band (MB) and the high band (HB), the mid band (MB) may be referred to as the first (frequency), and the high band (HB) may be referred to as the second (frequency) band. In the case of the LTE reframing, the 5G Sub-6 band may be the same as an LTE band. In a case where the 5G NR system operates in a different band than the LTE communication system, it may operate in the high band (HB) or a band broader than the high band (HB). The 5G Sub-6 band that is the high band (HB) or a band broader than the high band (HB) may also be referred to as the second (frequency) band.

The baseband processor 1400 may perform Multi-Input Multi-Output (MIMO) through two or more of the plurality of antennas (the antennas ANT1 to ANT4) in the first frequency band. In addition, the baseband processor 1400 may perform Multi-Input Multi-Output (MIMO) through two or more of the plurality of antennas (the antennas ANT1 to ANT4) in the second frequency band. In this regard, Multi-Input Multi-Output (MIMO) may be performed using antenna elements that are spaced a predetermined distance apart and are arranged in a state of being rotated by a predetermined angle. This can improve isolation between the first and second signals within the same band.

The baseband processor 1400 may control the transceiver circuit 1250 to receive the second signal in the second band while receiving the first signal in the first band through one of the first antenna ANT1 to the fourth antenna ANT4. In this case, there is provided the advantage that the carrier aggregation (CA) can be performed through one antenna.

Alternatively, the baseband processor 1400 may control the transceiver circuit 1250 to receive the second signal in the second band through one of the third antenna ANT3 and the fourth antenna ANT4 while receiving the first signal in the first band through one of the first antenna ANT1 and the second antenna ANT2. In this case, there is provided the advantage that each of the antennas can be designed to optimally operate in a corresponding band.

Therefore, the baseband processor 1400 may perform the carrier aggregation (CA) in a band that results from combining the first frequency band and the second frequency band. Accordingly, according to the present disclosure, there is provided the advantage that, in a case where a large amount of data needs to be received for autonomous driving or the like, reception in a broad band is possible through the carrier aggregation (CA).

Accordingly, the vehicle 500 may perform communication in an Enhanced Mobile Broad Band (eMBB) and may operate as an eMBB UE. To this end, the base station that performs the scheduling may allocate a broadband frequency resource to the vehicle 500 that operates as the eMBB UE. To this end, the carrier aggregation (CA) may be performed on frequency bands that are available, except on a frequency source already allocated on a different UE.

Regarding a frequency band, the low band (LB), the mid band (MB), and the high band (FIB) may be referred to as the first band, the second band, and the third band, respectively.

The antenna system 1000 may include the coupling feed portion 1110 and the coupling ground portion 1120. In this regard, one antenna system may operate as one antenna. With the coupling feed portion 1110 and the coupling ground portion 1120, the antenna system 1000 may operate as a single antenna in the first band, the second band, and the third band that correspond to the low band (LB), the mid band (MB), and the high band (HB), respectively. In this regard, the processor 1400 may determine a resource domain allocated through Physical Downlink Control Channel (PDCCH). On the basis of the allocated resource domain, the processor 1400 may control the transceiver circuit 1250 to perform the carrier aggregation (CA) in two or more of the first to third bands.

The antenna system 1000 may include the coupling feed portion 1110 and the second coupling feed portion 1120. In this regard, one antenna system may operate as the first and second antennas. The processor 1400 may control the transceiver circuit 1250 in such a manner that, with the coupling feed portion 1110 and the second coupling feed portion 112, the antenna system 1000 performs Multi-Input Multi-Output (MIMO) in the mid band (MD). Alternatively, the processor 1400 may control the transceiver circuit 1250 in such a manner that, with the coupling feed portion 1110 and the second coupling feed portion 1120, the antenna system 1000 performs Multi-Input Multi-Output (MIMO) in the high band (HB). Alternatively, the processor 1400 may control the transceiver circuit 1250 in such a manner that, with the coupling feed portion 1110 and the second coupling feed portion 1120, the antenna system 1000 performs Multi-Input Multi-Output (MIMO) while performing the carrier aggregation (CA) in the mid band (MB) and the high band (HB).

The processor 1400 may control the transceiver circuit 1250 in such a manner that, with the coupling feed portion 1110 and the second coupling feed portion 1120, the antenna system 1000 maintains a state of double connection to 4G LTE and 5G NR or performs a double connection operation. The state of the double connection to 4G LTE and 5G NR may be referred to as EN-DC.

The processor 1400 may perform Multi-Input Multi-Output (MIMO) in the EN-DC state through the first and fourth antennas ANT1 to ANT4. As an example, an EN-DC operation may be performed through the first antenna ANT1 and the second antenna ANT2, and Multi-Input Multi-Output (MIMO) may be performed through the third antenna ANT3 and the fourth antenna ANT4.

In this regard, when the EN-DC operation is performed using different bands between 4G and 5G communication systems, the EN-DC operation may be performed through the plurality of antennas inside one antenna system 1000. Accordingly, the level of interference between MIMO streams that use the same band may be lowered. In contrast, when the EN-DC operation is performed using the same band between the 4G and 5G communication systems, the EN-DC operation may be performed through a plurality of antennas inside another antenna system 1000. In this case, in order to lower the level of interference in the low band (LB), the MIMO operation through the plurality of antennas in the same antenna system 1000 may be performed in the mid band (MB) or a band broader than the mid band (MB).

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that these various modifications and alterations fall within the scope of the present disclosure that are defined in the following claims.

Figure 28:
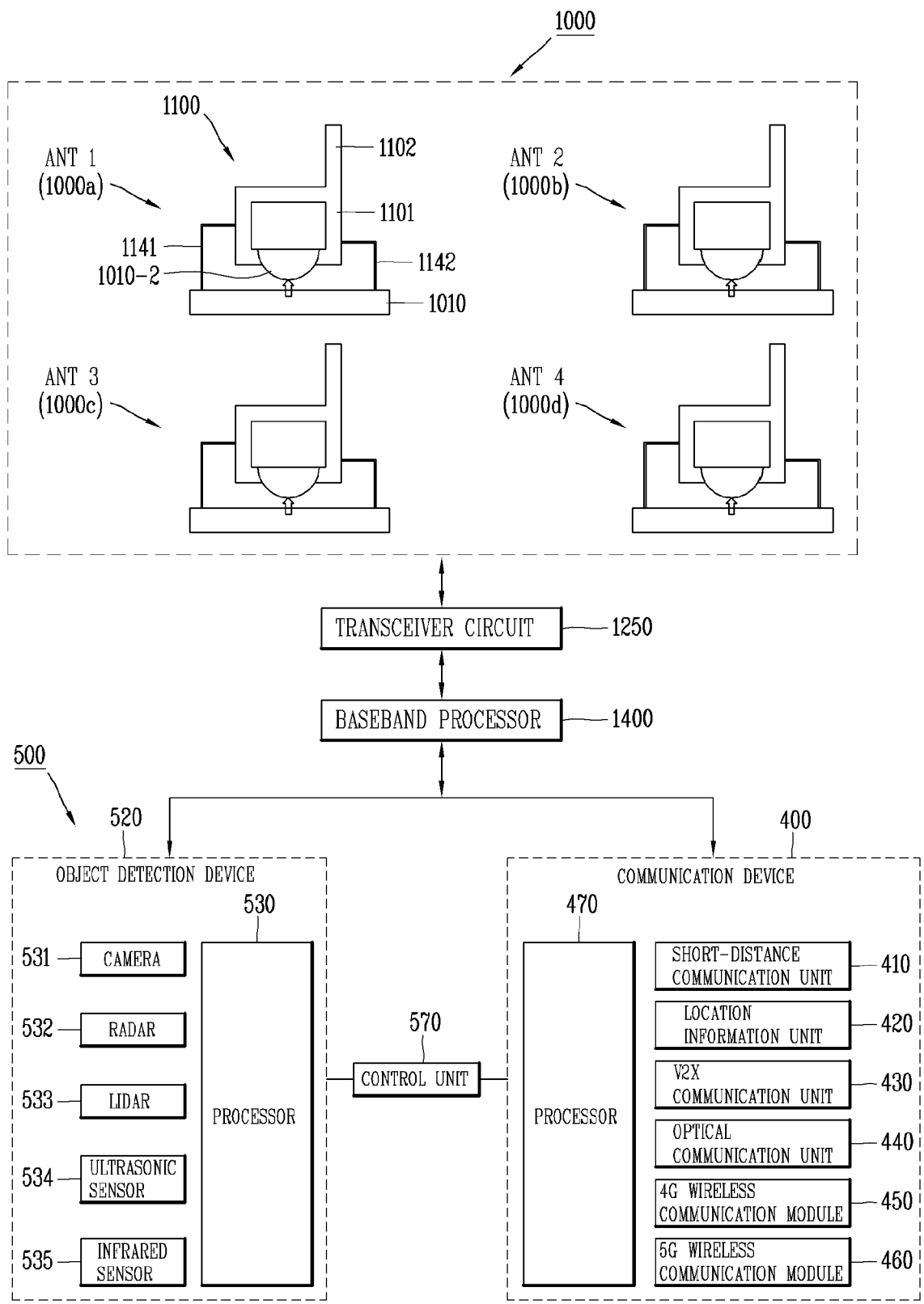
FIG. 28 illustrates a configuration of an antenna system according to another embodiment of the present disclosure and a configuration of a vehicle in which the antenna system is mounted.

FIG. 28 illustrates a configuration of an antenna system according to another embodiment of the present disclosure and a configuration of a vehicle in which the antenna system is mounted. With reference to FIG. 27, the broadband antenna system 1000 is mounted in the vehicle, and the broadband antenna system 1000 may perform short-range communication, wireless communication, and V2X communication, and the like, independently or through the communication device 400. To this end, the baseband processor 1400 may perform control such that a signal is received from or transmitted to the adjacent vehicle, the RSU, and the base station through the antenna system 1000.

Alternatively, the baseband processor 1400 may perform control such that a signal is received from or transmitted to the adjacent vehicle, the RSU, the adjacent object, and the base station through the communication device 400. At this point, the information on the nearby object may be acquired through the object detection device such as the camera 531, the radar 532, the LiDar 533, and the sensors 534 and 535 of the vehicle 500. Alternatively, the baseband processor 1400 may control the communication device 400 and the antenna system 1000 such that a signal is received from or transmitted to the adjacent vehicle, the RSU, the adjacent object, and the base station.

With reference to FIGS. 1 to 4B, 17A to 26, and 27, the vehicle 500 that includes the antenna system 1000 is possibly configured to include the plurality of antennas 1100, the transceiver circuit 1250, and the baseband processor 1400. The vehicle 500 may further include the object detection device 520. In addition, the vehicle 500 may further include the communication device 400. In this case, the communication device 400 may be configured to perform wireless communication through the antenna unit.

In this regard, the vehicle 500 may include the antenna system 1000. The antenna system 1000 may be configured to include the circuit board 1010, the antenna 1100, and the coupling feed portion 1110-2. The antenna system 1000 may further include the transceiver circuit 1250 and the processor 1400.

The circuit board 1010 may be arranged on the metal frame on the roof of the vehicle 500 or on the metal frame inside the roof frame, and various electronic components may be arranged on the circuit board 1010. The antenna 1100 may include an aperture region over the circuit board 1010 and may be configured to be fixed to the circuit board 1010 with the short-circuit portions 1141 and 1142 in between.

The coupling feed portion 1110-2 may be configured to be electrically connected to the circuit board 1010 and to radiate a signal to the aperture region in the antenna 1100. In this regard, the ground region GND may be arranged on the front surface of the circuit board 1010. A region of the circuit board 1010 that is connected to the coupling feed portion 1110-2 may be formed as a slot region SR from which the ground pattern is removed.

The antenna 1100 may be the loop antenna 1101 that is configured to include the loop-shaped metal pattern. The antenna 1100 may include the branch line pattern 1102 that results from at least one portion of the loop antenna 1101 extending. The branch line pattern 1102 may be connected to the second metal pattern facing the metal pattern of the loop antenna 1101 coupled to the coupling feed portion 1110-2. Another metal pattern may be connected, at both side surfaces, respectively, of the loop antenna 1101, to the ground region of the circuit board 1010, with the first short-circuit portion 1141 and the second short-circuit portion 1142 in between. This metal pattern corresponds to a metal pattern other than the metal pattern of the loop antenna 1101 to which a signal is transferred through the coupling feed portion 1110-2 and other than a metal pattern that faces the metal pattern of the loop antenna 1101.

The antenna that is formed with the coupling feed portion 1110-2, the first and second short-circuit portions 1141 and 1142, the aperture region in the loop antenna 1101, and the branch line 1102 may operate in the low band (LB), the mid band (MB), and the high band (HB).

The transceiver circuit 1250 may be operatively combined with the coupling feed portion 1110-2. The processor 1400 may be operatively combined with the transceiver circuit 1250. The processor 1400 may be a baseband processor corresponding to a modem, but is not limited thereto. The processor 1400 may be an arbitrary processor that controls the transceiver circuit 1250.

The transceiver circuit 1250 may be configured to control a signal that is transferred to the coupling feed portion 1110-2 in such a manner that a signal transferred through the coupling feed portion 1110-2 is radiated through the aperture region. That is, the transceiver circuit 1250 may be operatively combined with the coupling feed portion 1110 and may be configured to control the signal that is transferred to the coupling feed portion 1110 through the feeding pattern. The transceiver circuit 1250 may include the front end module (FEM), such as the electric power amplifier or the reception amplifier. As another example, the front end module (FEM) may be arranged between the transceiver circuit 1250 and the antenna, separately from the transceiver circuit 1250. The transceiver circuit 1250 may control a magnitude and/or a phase of a signal that is transferred to the coupling feed portion 1110, by adjusting a gain or an input or output electric power of the electric power amplifier or the reception amplifier. At this point, as described above, the feeding pattern may be arranged on the rear surface of the circuit board 1010, but is not limited thereto.

The processor 1400 may be operatively combined with the transceiver circuit 1250 and may be configured to control the transceiver circuit 1250. The processor 1400 may control the magnitude and/or the phase of the signal that is transferred to the coupling feed portion 1110, by controlling the transceiver circuit 1250. The processor 1400 may be configured to communicate with at least one of the nearby vehicle, the road side unit (RSU), and the base station through the transceiver circuit 1250.

In the case where, for autonomous driving, there is a need to simultaneously receive or transmit information from and to various entities, such as the nearby vehicle, the RSU, and the base station, the information may be received or transmitted through Multi-Input Multi-Output (MIMO). Therefore, the vehicle 500 may simultaneously receive different information from the various entities and thus can improve communication capacity. Accordingly, in the vehicle 500, the communication capacity can be improved through the MIMO operation without increasing a bandwidth.

Alternatively, the vehicle 500 may simultaneously receive the same information from the various entities. Thus, the vehicle 500 can improve reliability of the information on the surroundings of the vehicle 500 and may decrease latency. Accordingly, Ultra-reliable Low Latency Communication (URLLC) is possible in the vehicle 500. The vehicle 500 may operate as a URLLC UE. To this end, the base station that performs the scheduling may preferentially allocate the time slot to the vehicle 500 that operates as the URLLC UE. To this end, the puncturing may be performed on one portion of a specific time-frequency resource already allocated to a different UE.

A plurality of the antenna systems that are disclosed in the present disclosure may be included to perform Multi-Input Multi-Output (MIMO) or to increase the Multi-Input Multi-Output (MIMO) capacity. As an example, the antenna system 1000 in FIG. 28 may include the first antenna system 1000*a* to the fourth antenna system 1000*d*. In this regard, the first antenna system 1000*a* to the fourth antenna system 1000*d* may be configured to be separated from each other or may be arranged to be optimally positioned inside one loop antenna 1101. In a case where the first antenna system 1000*a* to the fourth antenna system 1000*d* are arranged to be separated from each other, they may be arranged in the same region or in different regions. The first antenna system 1000*a* to the fourth antenna system 1000*d* may be all arranged inside the roof frame. Alternatively, the first antenna system 1000*a* to the fourth antenna system 1000*d* may be all arranged on top of the roof of the vehicle 500. Alternatively, one or several of the first antenna system 1000*a* to the fourth antenna system 1000*d* may be arranged inside the roof frame, and the rest may be arranged on top of the roof of the vehicle 500.

The antenna system that is disclosed in the present disclosure is not limited thereto, and one antenna system may operate as one antenna. The antenna system 1000 is hereinafter described below on the assumption that one antenna system includes one antenna. The first antenna system 1000*a*, the second antenna system 1000*b*, the third antenna system 1000*c*, and the fourth antenna system 1000*d* may be configured to include the first antenna ANT1, the second antenna ANT2, the third antenna ANT3, and the fourth antenna ANT4, respectively. In this regard, the loop antenna-based antenna system is possibly realized within a limited space in a PCB, such as a circuit board, and therefore, one antenna loop antenna may be realized as a single antenna. A plurality of loop antennas may be arranged in the limited space in the PCB, and thus Multi-Input Multi-Output (MIMO) may be performed.

The plurality of antennas (the antennas ANT1 to ANT4) inside the antenna system 1000 may operate in all bands, that is, the low band (LB), the mid band (MB), and the high band (HB). At this point, the low band (LB) may be referred to as the first (frequency) band, and the mid band (MB) and the high band (HB) may be referred to as the second (frequency) band. As another example, in the case where the antenna system 1000 operates in the mid band (MB) and the high band (HB), the mid band (MB) may be referred to as the first (frequency), and the high band (HB) may be referred to as the second (frequency) band. In the case of the LTE re-framing, the 5G Sub-6 band may be the same as the LTE band. In the case where the 5G NR system operates in a different band than the LTE communication system, it may operate in the high band (HB) or a band broader than the high band (HB). The 5G Sub-6 band that is the high band (HB) or a band broader than the high band (HB) may also be referred to as the second (frequency) band.

The baseband processor 1400 may perform multi-Input Multi-Output (MIMO) through two or more of the plurality of antennas (the antennas ANT1 to ANT4) in the first frequency band. In addition, the baseband processor 1400 may perform multi-Input Multi-Output (MIMO) through two or more of the plurality of antennas (the antennas ANT1 to ANT4) in the second frequency band. In this regard, Multi-Input Multi-Output (MIMO) may be performed using antenna elements that are spaced a predetermined distance apart and are arranged in a state of being rotated by a predetermined angle. Accordingly, the degree to which the first signal and the second signal are separated from each other in the same band can be improved.

The baseband processor 1400 may control the transceiver circuit 1250 to receive the second signal in the second band through one of the first antenna ANT1 to the fourth antenna ANT4 while receiving the first signal in the first band. In this case, there is provided the advantage that the carrier aggregation (CA) can be performed through one antenna.

Alternatively, the baseband processor 1400 may control the transceiver circuit 1250 to receive the second signal in the second band through one of the third antenna ANT3 and the fourth antenna ANT4 while receiving the first signal in the first band through one of the first antenna ANT1 and the second antenna ANT2. In this case, there is provided the advantage that each of the antennas can be designed to be optimally operative in a corresponding band.

Therefore, the baseband processor 1400 may perform the carrier aggregation (CA) in a band that results from combining the first frequency band and the second frequency band. Accordingly, according to the present disclosure, there is provided the advantage that, in the case where a large amount of data needs to be received for autonomous driving or the like, reception in a broad band is possible through the carrier aggregation (CA).

Accordingly, the vehicle 500 may perform communication in the Enhanced Mobile Broad Band (eMBB) and may operate as an eMBB UE. To this end, the base station that performs the scheduling may allocate the broadband frequency resource to the vehicle 500 that operates as the eMBB UE. To this end, the carrier aggregation (CA) may be performed on frequency bands that are available, except on a frequency source already allocated on a different UE.

Regarding the frequency band, the low band (LB), the mid band (MB), and the high band (HB) may be referred to as the first band, the second band, and the third band, respectively.

The antenna system 1000 may include the coupling feed portion 1110 and the coupling ground portion 1120. In this regard, one antenna system may operate as one antenna. With the coupling feed portion 1110 and the coupling ground portion 1120, the antenna system 1000 may operate as a single antenna in the first band, the second band, and the third band that correspond to the low band (LB), the mid band (MB), and the high band (HB), respectively. In this regard, the processor 1400 may determine a resource domain allocated through Physical Downlink Control Channel (PDCCH). The processor 1400 may control the transceiver circuit 1250 to perform the carrier aggregation (CA) in two or more of the first to third bands using the allocated resource domain.

The antenna system 1000 may include the coupling feed portion 1110 and the second coupling feed portion 1120. In this regard, one antenna system may operate as the first and second antennas. The processor 1400 may control the transceiver circuit 1250 in such a manner that, with the coupling feed portion 1110 and the second coupling feed portion 1120, the antenna system 1000 performs Multi-Input Multi-Output (MIMO) in the mid band (MD). Alternatively, the processor 1400 may control the transceiver circuit 1250 in such a manner that, with the coupling feed portion 1110 and the second coupling feed portion 1120, the antenna system 1000 performs Multi-Input Multi-Output (MIMO) in the high band (HB). Alternatively, the processor 1400 may control the transceiver circuit 1250 in such a manner that, with the coupling feed portion 1110 and the second coupling feed portion 1120, the antenna system 1000 performs Multi-Input Multi-Output (MIMO) while performing the carrier aggregation (CA) in the mid band (MB) and the high band (HB).

The processor 1400 may control the transceiver circuit 1250 in such a manner that, with the coupling feed portion 1110 and the second coupling feed portion 1120, the antenna system 1000 maintains the state of double connection to 4G LTE and 5G NR or performs the double connection operation. The state of the double connection to 4G LTE and 5G NR may be referred to as EN-DC.

The processor 1400 may perform multi-Input Multi-Output (MIMO) in the EN-DC state through the first and fourth antennas ANT1 to ANT4. As an example, the EN-DC operation may be performed through the first antenna ANT1 and the second antenna ANT2, and Multi-Input Multi-Output (MIMO) may be performed through the third antenna ANT3 and the fourth antenna ANT4.

In this regard, when the EN-DC operation is performed using different bands between 4G and 5G communication systems, the EN-DC operation may be performed through the plurality of antennas inside one antenna system 1000. Accordingly, the level of interference between the MIMO streams that use the same band may be lowered. In contrast, when the EN-DC operation is performed using the same band between the 4G and 5G communication systems, the EN-DC operation may be performed through a plurality of antennas inside another antenna system 1000. In this case, in order to lower the level of interference in the low band (LB), the MIMO operation through the plurality of antennas in the same antenna system 1000 may be performed in the mid band (MB) or a band broader than the mid band (MB).

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

The antenna system for vehicle-mounting according to the present disclosure and the vehicle in which the antenna system is mounted are described above. A wireless communication system that includes the antenna system for vehicle-mounting, the vehicle in which the antenna system is mounted, and the base station will be described below. In this regard, FIG. 29 is a block diagram illustrating the wireless communication system to which methods proposed in the present disclosure are applicable.

Figure 29:
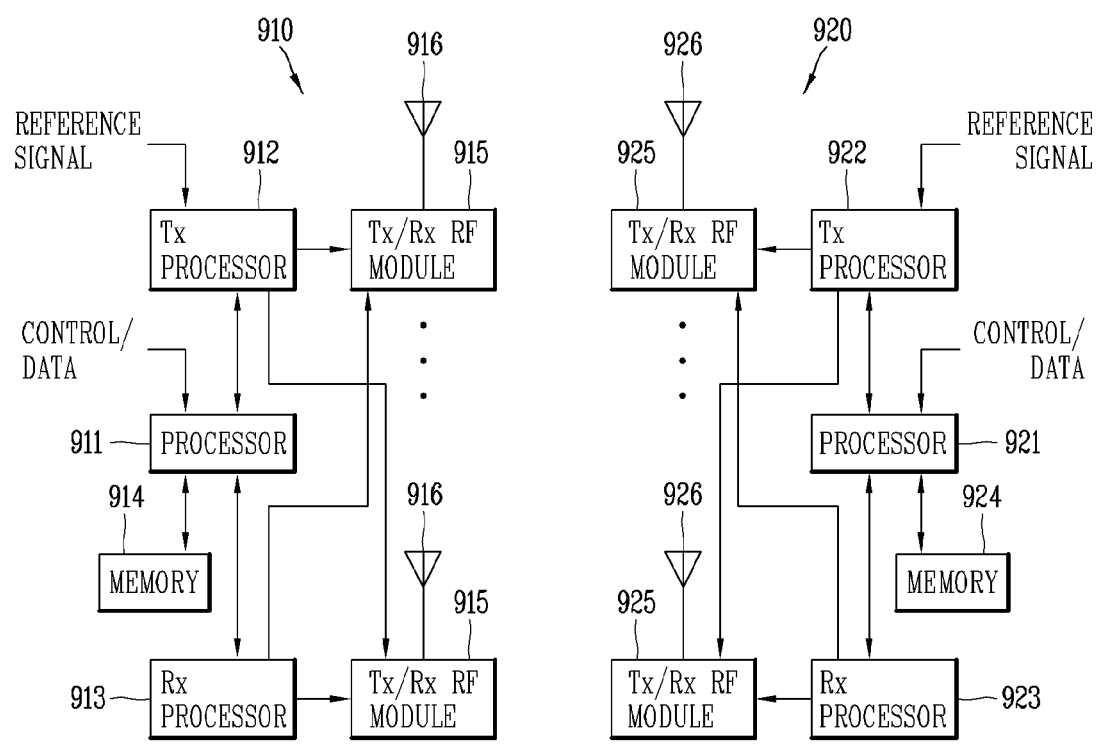
FIG. 29 is a block diagram illustrating the wireless communication system to which methods proposed in the present disclosure are applicable.

With reference to FIG. 29, the wireless communication system includes a first communication device 910 and/or a second communication device 920. The term 'A and/or B' may be interpreted as having the same meaning as 'at least one of A and B'. The first communication device may denote a base station, and the second communication device may denote a terminal (or the first communication device may refer to a terminal, and the second communication device may refer to a base station).

The base station (BS) may be interchangeably used with a term, such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be interchangeably used with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device includes a processor 911, a memory 914, one or more Tx/Rx radio frequency (RF) modules 915, a Tx processor 912, and a Rx processor 913, and an antenna 916. The second communication device includes a processor 921, a memory 924, one or more Tx/Rx radio frequency (RF) modules 925, a Tx processor 922, and a Rx processor 923, and an antenna 926. The processors 911 and 921 realize the functions, the processes, and/or the methods that are described above. More specifically, in DL (communication from the first communication device to the second communication device), a high-level layer packet from a core network is provided to the processor 911. The processor realizes a function of an L2 layer. In DL, the processor assigns the task of multiplexing between a logical channel and a transport channel and the task of radio resource allocation to the second communication device 920 and is in charge of signaling to the second communication device. The Tx processor 912 realizes various signal processing functions for L1 layer (that is, a physical layer). The signal processing function is to facilitate forward error correction (FEC) in the second communication device and includes coding and interleaving. A coded and modulated symbol is divided into parallel streams. Each of the streams is mapped to an OFDM subcarrier wave, is multiplexed with a reference signal (RS) in a time and/or frequency domain, and is combined therewith through the use of the Inverse Fast Fourier Transform (IFFT). Thus, a physical channel over which a time-domain OFDMA symbol stream is carried is generated. The OFDM stream may be spatially precoded to generate multiple spatial streams. The spatial streams may be provided to different antennas 916 through individual Tx/Rx modules (or transceiver) 915, respectively. The Tx/Rx RF modules may modulate RF carrier waves for transmission, using spatial streams, respectively. The second communication device may receive a signal through the antenna 926 of each Tx/Rx module (or transceiver) 925. The Tx/Rx RF modules demodulate the information modulated onto an RF carrier, and thus provides the resulting information to the Rx processor 923. The RX the processor 923 realizes various signal processing functions for Layer 1. The RX the processor may perform spatial processing on information in order to demodulate an arbitrary spatial stream destined for the second communication device. A plurality of spatial streams, when destined for the second communication device, may be combined by a plurality of Rx processors, into a single OFDMA symbol stream. The RX processor transforms the OFDMA symbol stream from a time domain to a frequency domain through the use of the Fast Fourier Transform (FFT). A frequency domain signal includes an individual OFDMA symbol stream on a subcarrier for each of the OFDM signals. Symbols on each subcarrier and a reference signal may be recovered and demodulated by determining the most probable signal placement points transmitted by the first communication device. These soft decisions may be based on channel estimation values. The soft decisions are decoded and deinterleaved in order to demodulate data and a control signal that are originally transmitted over the physical channel by the first communication device. The data and the control signal are provided to the processor 921.

UL (communication from the second communication device to the first communication device) may be processed in the first communication device 910 in a similar manner to that described with respect to the receiver function in the second communication device 920. The Tx/Rx modules 925 receive signals through the antennas 926, respectively. The Tx/Rx modules 925 provide a RF carrier wave and information to the Rx processor 923. The processor 921 may operate in conjunction with the memory 924 in which a program code and data are stored. The memory may be referred to as a computer-readable medium.

In a case where the first communication device is the vehicle, the second communication device is not limited to the base station. In this regard, with reference to FIG. 2A, the second communication device may be another vehicle, and the V2V communication may be performed between the first communication device and the second communication device. The second communication device may be a pedestrian, and the V2P communication may be performed between the first communication device and the second communication device. In addition, the second communication device may be a road side unit (RSU), and the V2I communication may be performed between the first communication device and the second communication device. In addition, the second communication device may be an application server, and the V2N communication may be performed between the first communication device and the second communication device.

In this regard, even when the second communication device is another vehicle, pedestrian, RSU, or application server, the base station may allocate resources for communication between the first communication device and the second communication device. Therefore, a communication device that is configured to allocate the source for communication between the first communication device and the second communication device may be referred to as a third communication device. A sequence of communication procedures, described above, may also be executed among the first to third communication devices.

The antenna system mounted in the vehicle and the vehicle in which the antenna system is mounted have been described above. Hereinafter, technical effects of an antenna system mounted in a vehicle and a vehicle equipped with the antenna system will be described.

According to the present disclosure, there antenna performance can be improved while the height of the antenna system can be kept at or below a predetermined level.

In addition, a low band (LB) antenna and other antennas can be integrated into one antenna module and thus various communication systems can be supported.

According to the present disclosure, there is provided the advantage that the heat sink is made to operate as the loop antenna and thus that a structure of the antenna that operates in a broad band can be employed.

In addition, according to the present disclosure, there is provided the advantage that the antenna system is optimized using different antennas in the low band (LB) and a band other than the low band (LB) and thus that the antenna system can be arranged inside the roof frame of the vehicle to have an optimal configuration and performance.

In addition, according to the present disclosure, there is the advantage that Multi-Input Multi-Output (MIMO) and a diversity operation can be performed in the antenna system mounted in the vehicle using a multiplicity of antennas in a specific band.

In addition, according to the present disclosure, there is provided the advantage that various structures of a low-profile antenna that operates in a broad band can be employed, as a planar antenna structure, by optimizing the coupling feed portion, the short-circuit portion, and the branch line pattern.

Further scope of applicability of the present disclosure will become apparent from the foregoing detailed description. It should be understood, however, that the detailed description and specific examples, such as the preferred implementation of the present disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna system for vehicle-mounting, the antenna system comprising:
   a circuit board;
   a heat sink having a plurality of conductive members and an aperture region over the circuit board and configured to be fixed to the circuit board, with a fixation portion in between, wherein the plurality of conductive members includes a first conductive member and a second conductive member facing the first conductive member and the heat sink are operated as a loop antenna to radiate a signal;
   a heat dissipation fan arranged inside the aperture region between the first conductive member and the second conductive member; and
   a coupling feed portion connected to the circuit board, arranged under the first conductive member of the heat sink, and configured to transfer the signal to the aperture region between the first conductive member and the second conductive member.

2. The antenna system of claim 1, wherein the coupling feed portion is configured as a metal patch arranged on at least one surface of a dielectric carrier vertically connected to the circuit board.

3. The antenna system of claim 2, wherein the coupling feed portion comprises:
   a first radiation path arranged on a front surface of the dielectric carrier; and
   a second radiation path arranged on a side surface of the dielectric carrier and vertically connected to the first radiation path.

4. The antenna system of claim 3, wherein the first radiation patch is arranged, in the shape of a semi-circle, the front surface of the dielectric carrier, and the second radiation patch is arranged, in the shape of a rectangle, on the side surface of the dielectric carrier.

5. The antenna system of claim 3, wherein the second radiation patch arranged on the side surface of the dielectric carrier is fastened, by a screw, to one of conductive members of the heat sink.

6. The antenna system of claim 1, further comprising a coupling ground portion arranged under the second conductive member, spaced a predetermined distance away from second conductive member and arranged to be coupled with the second conductive member facing the first conductive member of the heat sink,
wherein the coupling ground portion comprises:
a vertical connection portion vertically connected to the circuit board; and
a horizontal extension portion formed in a manner that extends in one direction and the other direction from the vertical connection portion.

7. The antenna system of claim 6, further comprising:
a transceiver circuit operatively combined with the coupling feed portion; and
a processor operatively combined with a transceiver circuit, wherein the coupling feed portion and the coupling ground portion enable the antenna system to operate as a single antenna.

8. The antenna system of claim 7, wherein the horizontal extension portion of the coupling ground portion is arranged under the second conductive member in a manner that is spaced a predetermined distance away from the second conductive member.

9. The antenna system of claim 7, wherein the coupling feed portion and the coupling ground portion enable the antenna system to operate, as the single antenna, in a first band, a second band, and a third band that correspond to a low band (LB), a mid band (MB), and a high band (HB), respectively, and
wherein the processor determines a resource domain allocated through Physical Downlink Control Channel (PDCCH) and controls the transceiver circuit on the basis of the allocated resource domain to perform carrier aggregation in two or more of the first to third bands.

10. The antenna system of claim 1, further comprising:
a second coupling feed portion arranged to be coupled with a second conductive member facing a conductive member of the heat sink on which the coupling feed portion is arranged;
a transceiver circuit operatively combined with the coupling feed portion and the second coupling feed portion; and
a processor operatively combined with the transceiver circuit,
wherein the processor controls the transceiver circuit in such a manner that the coupling feed portion and the second coupling feed portion enable the antenna system to perform Multi-Input Multi-Output (MIMO) in a mid band (MB).

11. The antenna system of claim 10, further comprising:
a lower heat sink arranged to be brought into the circuit board and configured to absorb heat that is generated in the circuit board.

12. The antenna system of claim 11, wherein the lower heat sink comprises:
a plate portion formed in the shape of a plate and configured in such a manner that a heat dissipation fan is arranged thereon; and
an extension portion extending toward one side or the other side and configured to be fastened to a vertical fastening portion of the heat sink,
wherein the vertical fastening portion and the extension portion are electrically connected to a ground region formed on a front surface of the circuit board, and thus, an antenna that is formed with the coupling feed portion, a coupling ground portion, and the aperture region in the heat sink is configured to operate in a broad band.

13. The antenna system of claim 1, wherein a ground region is arranged on a front surface of the circuit board, and a region of the circuit board that is connected to the coupling feed portion is formed as a slot region from which a ground pattern is removed.

14. The antenna system of claim 10, wherein a ground region is arranged on a front surface of the circuit board, and a first region of the circuit board that is connected to the coupling feed portion and a second region thereof that is connected to the second coupling feed portion are formed as slot regions, respectively, from which a ground patten is removed.

15. The antenna system of claim 14, further comprising:
a transceiver circuit operatively combined with the coupling feed portion and configured to control a signal that is transferred to the coupling feed portion through a feeding pattern,
wherein the feeding pattern that is electrically connected to the coupling feed portion is arranged on a rear surface of the circuit board.

16. The antenna system of claim 15, further comprising:
a processor operatively combined with the transceiver circuit and configured to control the transceiver circuit, wherein the processor computes a fan rotation speed of a dissipation fan that is arranged inside the aperture region in the heat sink, or an amount of electric power consumed by the transceiver circuit.

17. The antenna system of claim 16, wherein, when the fan rotation speed of the dissipation fan is at or above a first threshold and quality of a signal received through the antenna is at or above a second threshold, the processor controls the transceiver circuit to decrease a magnitude of a signal that is applied to the coupling feed portion.

18. A vehicle in which an antenna system is mounted, comprising:
a circuit board arranged on a metal frame arranged on a roof of the vehicle or inside a roof frame;
a heat sink having a plurality of conductive members and an aperture region over the circuit board and configured to be fixed to the circuit board with a fixation portion in between, wherein the plurality of conductive members includes a first conductive member and a second conductive member opposing to the first conductive member and the heat sink are operated as a loop antenna to radiate a signal;
a heat dissipation fan arranged inside the aperture region between the first conductive member and the second conductive member;
a coupling feed portion connected to the circuit board arranged under the first conductive member of the heat sink, and configured to transfer the signal to the aperture region between the first conductive member and the second conductive member;
a transceiver circuit controlling a signal transferred through the coupling feed portion to be radiated through the aperture region in the heat sink; and
a processor configured to communicate with at least one of a nearby vehicle, a road side unit (RSU), and a base station through the transceiver circuit.

19. The vehicle of claim 18, wherein the antenna system further comprises a coupling ground portion arranged under the second conductive member, spaced a predetermined distance away from second conductive member and arranged to be coupled with the second conductive member facing the first conductive member of the heat sink on which the coupling feed portion is arranged,
- wherein the coupling ground portion comprises:
  - a vertical connection portion vertically connected to the circuit board; and
  - a horizontal extension portion formed in a manner that extends in one direction and the other direction from the vertical connection portion, and
- wherein the coupling feed portion and the coupling ground portion enable the antenna system to operate, as a single antenna, in a first band, a second band, and a third band that correspond to a low band (LB), a mid band (MB), and a high band (HB), respectively.

20. The vehicle of claim 19, further comprising:
- a second coupling feed portion arranged to be coupled with a second conductive member facing a conductive member of the heat sink on which the coupling feed portion is arranged,
- wherein the processor determines a resource domain allocated through Physical Downlink Control Channel (PDCCH), controls the transceiver circuit on the basis of the allocated resource domain to perform carrier aggregation in two or more of the first to third bands and controls the transceiver circuit in such a manner that the coupling feed portion and the second coupling feed portion enable the antenna system to perform Multi-Input Multi-Output (MIMO) in a mid band (MB).

* * * * *